(12) United States Patent
Lindblad et al.

(10) Patent No.: US 9,030,828 B2
(45) Date of Patent: May 12, 2015

(54) TABLET STORAGE DEVICE

(71) Applicant: Ergotron, Inc., St. Paul, MN (US)

(72) Inventors: Shaun C. Lindblad, Lino Lakes, MN (US); Joe Funk, Rosemount, MN (US); William D. Tischer, St. Paul, MN (US); Matthew D. Purrington, Cottage Grove, MN (US); Peter Segar, Burnsville, MN (US); Diane L. Richardson, Ham Lake, MN (US); David J. Prince, St. Paul, MN (US)

(73) Assignee: Ergotron, Inc., St. Paul, MN (US)

( * ) Notice: Subject to any disclaimer, the term of this patent is extended or adjusted under 35 U.S.C. 154(b) by 151 days.

(21) Appl. No.: 13/650,572

(22) Filed: Oct. 12, 2012

(65) Prior Publication Data

US 2013/0279109 A1    Oct. 24, 2013

Related U.S. Application Data

(60) Provisional application No. 61/547,257, filed on Oct. 14, 2011, provisional application No. 61/553,620, filed on Oct. 31, 2011, provisional application No. 61/590,032, filed on Jan. 24, 2012.

(51) Int. Cl.
*H05K 5/00*    (2006.01)
*H05K 7/00*    (2006.01)
*G06F 1/16*    (2006.01)
(Continued)

(52) U.S. Cl.
CPC ............ *G06F 1/1637* (2013.01); *G06F 1/1607* (2013.01); *G06F 1/1632* (2013.01)

(58) Field of Classification Search
USPC ............... 361/679.4, 679.41, 679.42, 679.43, 361/679.44, 724, 725, 726, 727, 679.3, 361/679.56; 312/221.1, 221.2, 221.3, 312/223.1, 223.2, 223.3
See application file for complete search history.

(56) References Cited

U.S. PATENT DOCUMENTS

| 4,683,424 A | 7/1987 | Cutright et al. |
| 4,720,048 A | 1/1988 | Maroney et al. |

(Continued)

FOREIGN PATENT DOCUMENTS

| EP | 0997399 A2 | 5/2000 |
| EP | 2045689 A2 | 4/2009 |

(Continued)

OTHER PUBLICATIONS

International Search Report and Written Opinion, dated Feb. 19, 2013 for PCT Application No. PCT/US2012/060049, 11 pages.

(Continued)

*Primary Examiner* — Anthony Haughton
(74) *Attorney, Agent, or Firm* — Schwegman Lundberg & Woessner, P.A.

(57) ABSTRACT

A tablet storage device includes a frame having a plurality of slots, at least one of which is adapted to hold a tablet. A docking station can be disposed in at least one slot. In some cases the docking station is configured to align a tablet as the tablet is positioned in the slot such that a corresponding port in the tablet aligns with, and connects to, a connector. The frame also has a surface to attach the device to a vertical surface and can have a door that can be moved from an open to a closed position and adapted to retain at least one tablet held within at least one slot when the door is closed. A power supply system and/or a network connection system can be provided with the tablet storage device.

17 Claims, 60 Drawing Sheets

(51) Int. Cl.
*A47B 81/00* (2006.01)
*A47B 97/00* (2006.01)

(56) References Cited

U.S. PATENT DOCUMENTS

| | | | |
|---|---|---|---|
| 4,922,721 A | 5/1990 | Robertson et al. | |
| 5,301,346 A | 4/1994 | Notarianni et al. | |
| 5,457,745 A | 10/1995 | Wang | |
| 5,513,066 A | 4/1996 | Berman | |
| 5,528,453 A | 6/1996 | Berman et al. | |
| 5,621,890 A | 4/1997 | Notarianni | |
| 6,008,621 A | 12/1999 | Madison | |
| 6,189,849 B1 | 2/2001 | Sweere et al. | |
| 6,218,796 B1 | 4/2001 | Kozlowski | |
| D450,903 S | 11/2001 | Wacker et al. | |
| 6,336,691 B1 | 1/2002 | Maroney et al. | |
| 6,434,512 B1 | 8/2002 | Discenzo | |
| 6,480,391 B1 | 11/2002 | Monson et al. | |
| 6,783,105 B2 | 8/2004 | Oddsen, Jr. | |
| 6,796,844 B1 | 9/2004 | Edwards, III | |
| 7,055,833 B2 | 6/2006 | Wixted | |
| 7,130,190 B1 | 10/2006 | Baker | |
| 7,160,113 B2 | 1/2007 | McConnell et al. | |
| 7,238,042 B2 | 7/2007 | Chen et al. | |
| 7,252,277 B2 | 8/2007 | Sweere et al. | |
| 7,325,891 B1 * | 2/2008 | Kinsley et al. | 312/257.1 |
| 7,537,190 B2 | 5/2009 | Fan | |
| 7,551,458 B2 | 6/2009 | Carnevali | |
| 7,595,995 B2 * | 9/2009 | Hock | 361/727 |
| 7,643,291 B2 | 1/2010 | Mallia | |
| 7,800,914 B2 | 9/2010 | Dully | |
| 7,845,608 B1 | 12/2010 | Chen et al. | |
| 7,887,014 B2 | 2/2011 | Lindblad et al. | |
| 7,984,886 B2 | 7/2011 | Lin | |
| 8,047,383 B2 | 11/2011 | Hendrix et al. | |
| 8,066,242 B2 | 11/2011 | Potter et al. | |
| 8,074,951 B2 | 12/2011 | Carnevali | |
| 8,240,628 B2 | 8/2012 | Huang | |
| 8,243,455 B1 | 8/2012 | Raymond | |
| 8,320,110 B2 | 11/2012 | Chen | |
| 8,469,325 B2 | 6/2013 | Yu | |
| 8,503,182 B2 * | 8/2013 | Petrick et al. | 361/727 |
| 8,752,848 B2 | 6/2014 | Petrick et al. | |
| 2003/0021091 A1 | 1/2003 | Robbins et al. | |
| 2003/0111245 A1 | 6/2003 | Haggerty | |
| 2003/0141687 A1 | 7/2003 | Wixted et al. | |
| 2003/0222848 A1 | 12/2003 | Solomon et al. | |
| 2003/0227753 A1 | 12/2003 | Wrycraft | |
| 2004/0058704 A1 | 3/2004 | Peiker | |
| 2004/0139571 A1 | 7/2004 | Chang et al. | |
| 2004/0240167 A1 | 12/2004 | Ledbetter et al. | |
| 2004/0257753 A1 | 12/2004 | Rossini | |
| 2005/0110461 A1 * | 5/2005 | McConnell et al. | 320/116 |
| 2006/0274495 A1 | 12/2006 | Nakamura et al. | |
| 2007/0002533 A1 | 1/2007 | Kogan et al. | |
| 2007/0049071 A1 | 3/2007 | Jackson et al. | |
| 2007/0058344 A1 | 3/2007 | Baker | |
| 2007/0084978 A1 | 4/2007 | Martin et al. | |
| 2007/0168593 A1 | 7/2007 | Montag et al. | |
| 2007/0259554 A1 | 11/2007 | Lindblad | |
| 2008/0106870 A1 * | 5/2008 | Dully | 361/724 |
| 2009/0016008 A1 | 1/2009 | Hock | |
| 2009/0096336 A1 | 4/2009 | Petrick et al. | |
| 2009/0146911 A1 | 6/2009 | Kang | |
| 2009/0240370 A1 | 9/2009 | Nichols | |
| 2009/0267772 A1 | 10/2009 | Dehnadi | |
| 2009/0270727 A1 | 10/2009 | Zhao et al. | |
| 2010/0176254 A1 | 7/2010 | Sweere et al. | |
| 2011/0193524 A1 | 8/2011 | Hazzard et al. | |
| 2011/0240830 A1 | 10/2011 | Alemozafar et al. | |
| 2011/0264927 A1 | 10/2011 | Dearborn et al. | |
| 2011/0266930 A1 | 11/2011 | Petrick | |
| 2011/0267782 A1 | 11/2011 | Petrick | |
| 2011/0309591 A1 * | 12/2011 | Petrick et al. | 280/47.35 |
| 2012/0087074 A1 | 4/2012 | Chen | |
| 2012/0119040 A1 | 5/2012 | Ergun | |
| 2012/0173033 A1 | 7/2012 | Tischer | |
| 2012/0187056 A1 | 7/2012 | Hazzard | |
| 2012/0223676 A1 | 9/2012 | Petrick et al. | |
| 2013/0092805 A1 | 4/2013 | Funk et al. | |
| 2013/0092811 A1 | 4/2013 | Funk et al. | |
| 2013/0200584 A1 | 8/2013 | Guasta et al. | |
| 2013/0277520 A1 | 10/2013 | Funk et al. | |
| 2013/0277930 A1 | 10/2013 | Ergun et al. | |
| 2013/0279106 A1 | 10/2013 | Ergun et al. | |

FOREIGN PATENT DOCUMENTS

| | | |
|---|---|---|
| WO | 0177799 A1 | 10/2001 |
| WO | 2011017757 A1 | 2/2011 |
| WO | WO-2013056025 A1 | 4/2013 |
| WO | WO-2013056029 | 4/2013 |

OTHER PUBLICATIONS

International Search Report and Written Opinion, dated Jan. 30, 2013 for PCT Application No. PCT/US2012/060042, 10 pages.
International Search Report and Written Opinion, dated Apr. 15, 2011 for PCT Application No. PCT/US2011/024534, 10 pages.
U.S. Appl. No. 13/025,782 Office Action mailed Oct. 9, 2012, 12 pgs.
"U.S. Appl. No. 13/650,616, Non Final Office Action mailed Jan. 28, 2014", 15 pgs.
"U.S. Appl. No. 13/650,616, Response filed Jun. 24, 2014 to Restriction Requirement mailed Apr. 29, 2014", 5 pgs.
"U.S. Appl. No. 13/650,616, Restriction Requirement mailed Apr. 29, 2014", 6 pgs.
"U.S. Appl. No. 13/650,631, Non Final Office Action mailed Oct. 9, 2013", 11 pgs.
"U.S. Appl. No. 13/650,631, Notice of Allowance mailed May 21, 2014", 8 pgs.
"U.S. Appl. No. 13/650,631, Response filed Feb. 7, 2014 to Non Final Office Action mailed Oct. 9, 2013", 11 pgs.
"U.S. Appl. No. 13/650,631, Response filed Sep. 26, 2013 to Restriction Requirement mailed Aug. 29, 2013", 2 pgs.
"U.S. Appl. No. 13/650,631, Restriction Requirement mailed Aug. 29, 2013", 6 pgs.
"U.S. Appl. No. 13/650,702, Response filed Apr. 10, 2014 to Restriction Requirement mailed Feb. 12, 2014", 12 pgs.
"U.S. Appl. No. 13/650,702, Response filed Jul. 28, 2014 to Restriction Requirement mailed Jun. 26, 2014", 12 pgs.
"U.S. Appl. No. 13/650,702, Restriction Requirement mailed Feb. 12, 2014", 10 pgs.
"U.S. Appl. No. 13/650,702, Restriction Requirement mailed Jun. 26, 2014", 10 pgs.
"U.S. Appl. No. 13/651,066, Non Final Office Action mailed Jul. 15, 2014", 11 pgs.
"U.S. Appl. No. 13/651,066, Response filed Jun. 24, 2014 to Restriction Requirement mailed May 27, 2014", 7 pgs.
"U.S. Appl. No. 13/651,066, Restriction Requirement mailed May 27, 2014", 6 pgs.
"Ergotron® WorkFit C-Mod", Product Sheet (c) 2009 Ergotron, Inc., (Aug. 10, 2009), 2 pgs.
"International Application Serial No. PCT/US2012/059922, International Preliminary Report on Patentability mailed Apr. 24, 2014", 6 pgs.
"International Application Serial No. PCT/US2012/059922, International Search Report mailed Feb. 4, 2013", 3 pgs.
"International Application Serial No. PCT/US2012/059922, Written Opinion mailed Feb. 4, 2013", 5 pgs.
"International Application Serial No. PCT/US2012/059926, International Preliminary Report on Patentability mailed Apr. 24, 2014", 7 pgs.
"International Application Serial No. PCT/US2012/059926, International Search Report mailed Feb. 8, 2013", 3 pgs.
"International Application Serial No. PCT/US2012/059926, Written Opinion mailed Feb. 8, 2013", 6 gs.

(56) References Cited

OTHER PUBLICATIONS

"International Application Serial No. PCT/US2012/060053, International Preliminary Report on Patentability mailed Apr. 24, 2014", 7 pgs.
"International Application Serial No. PCT/US2012/060053, International Search Report mailed Feb. 25, 2013", 4 pgs.
"International Application Serial No. PCT/US2012/060053, Written Opinion mailed Feb. 25, 2013", 5 pgs.
"International Application Serial No. PCT/US2012/060056, International Preliminary Report on Patentability mailed Apr. 24, 2014", 7 pgs.
"International Application Serial No. PCT/US2012/060056, International Search Report mailed Feb. 22, 2013", 3 pgs.
"International Application Serial No. PCT/US2012/060056, Written Opinion mailed Feb. 22, 2013", 5 pgs.
"U.S. Appl. No. 13/650,736, Non Final Office Action mailed Nov. 28, 2014", 20 pgs.

\* cited by examiner

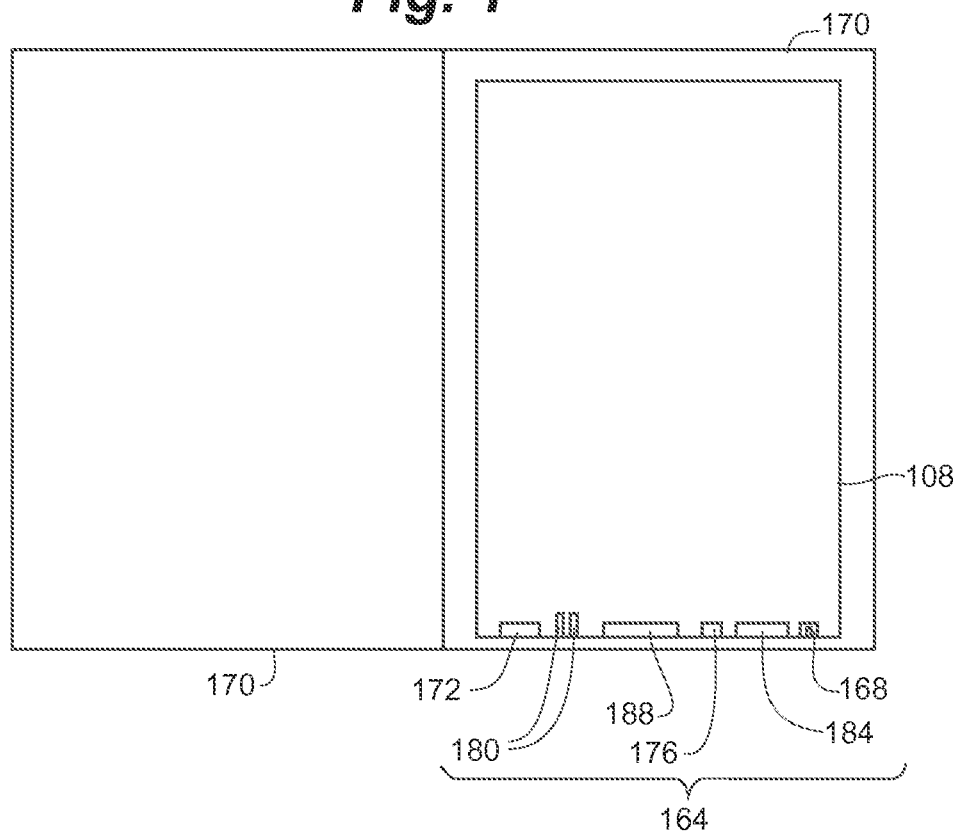
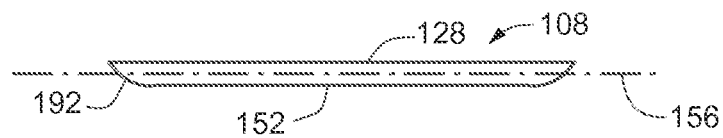

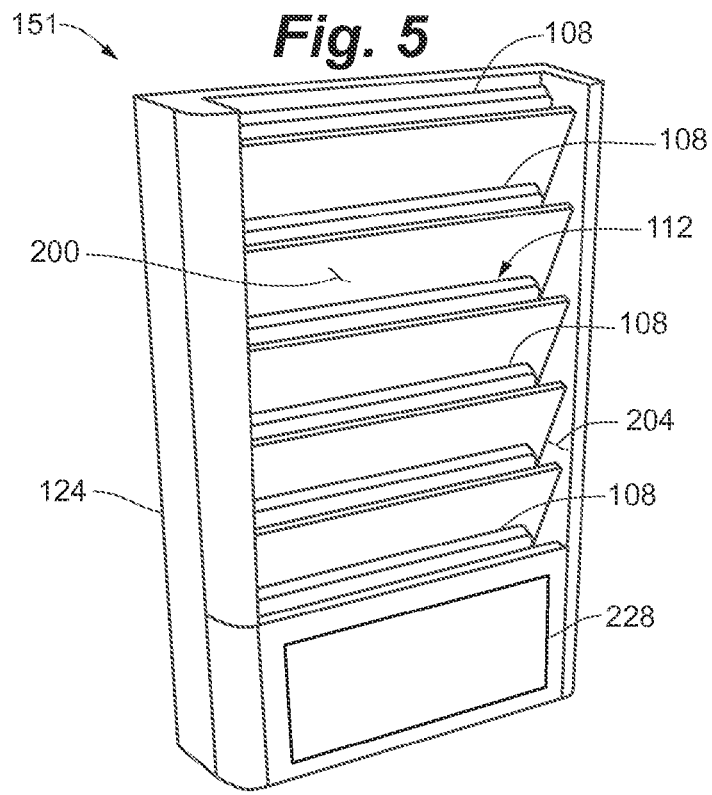
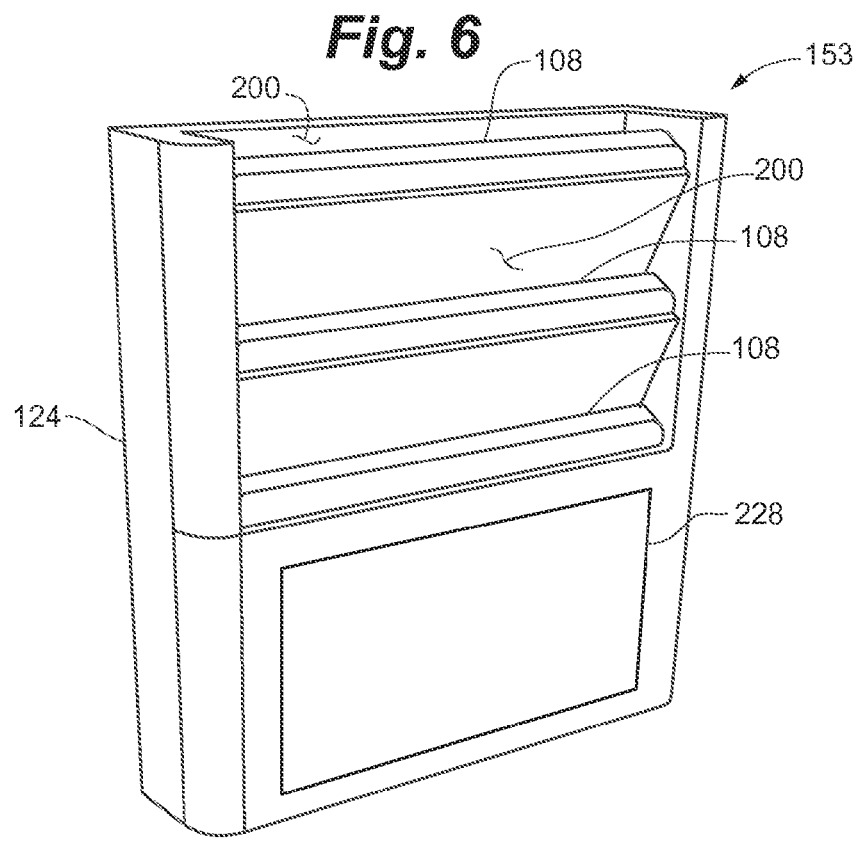

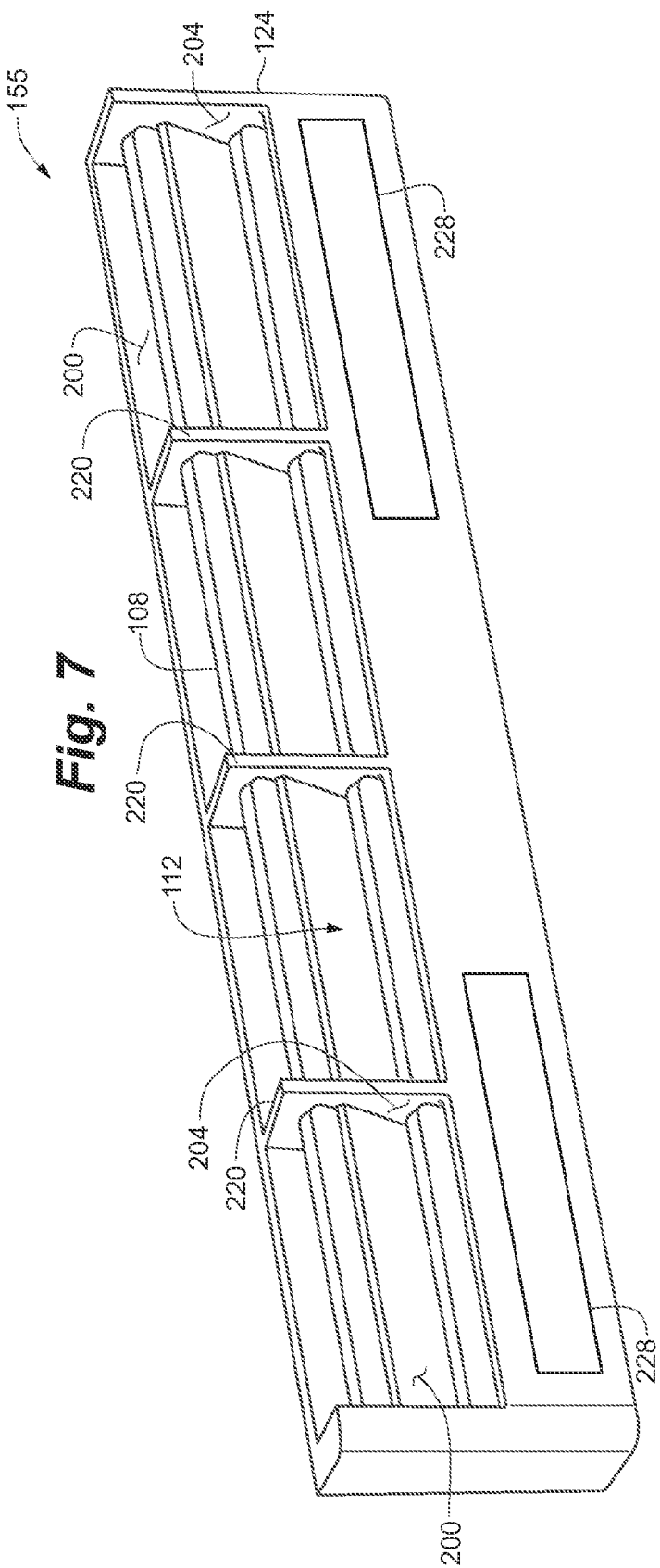

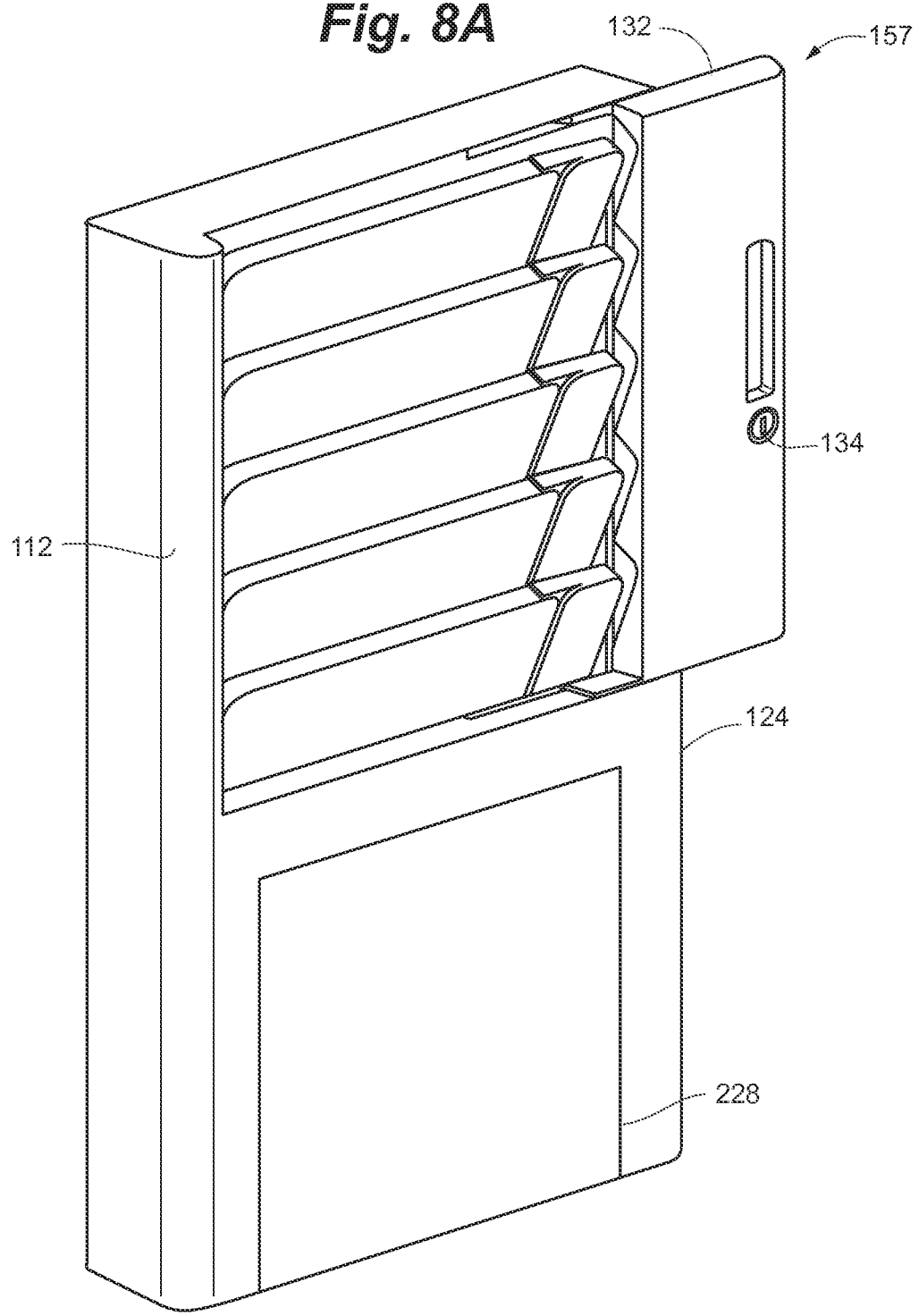

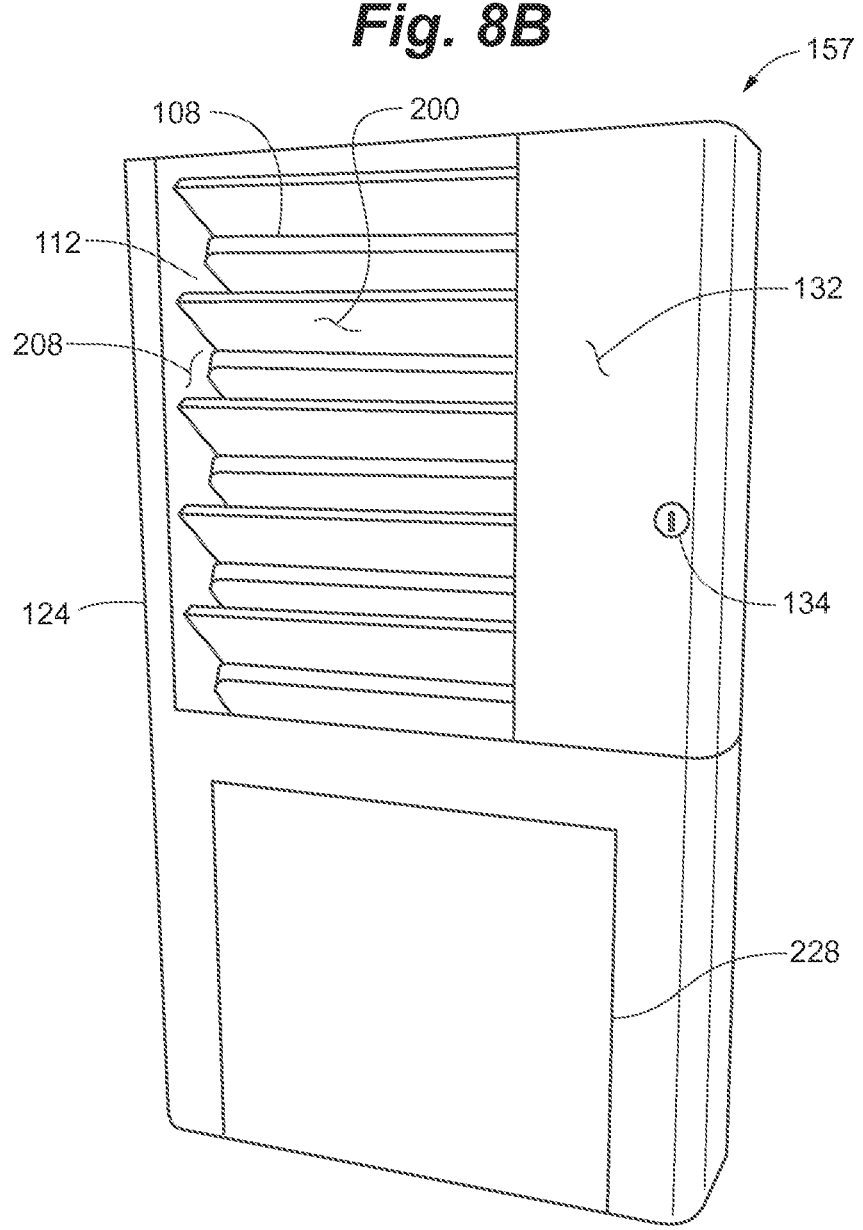

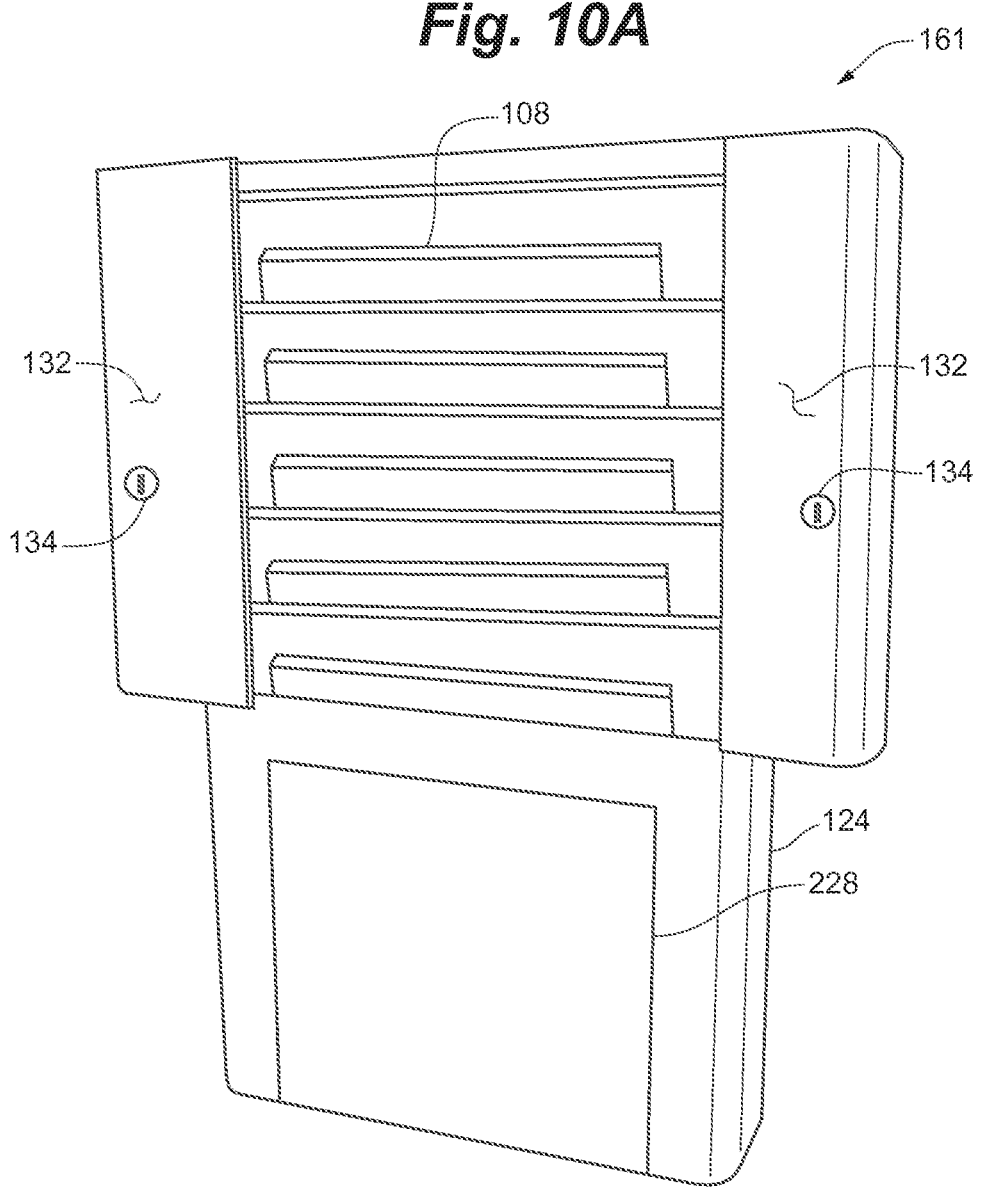

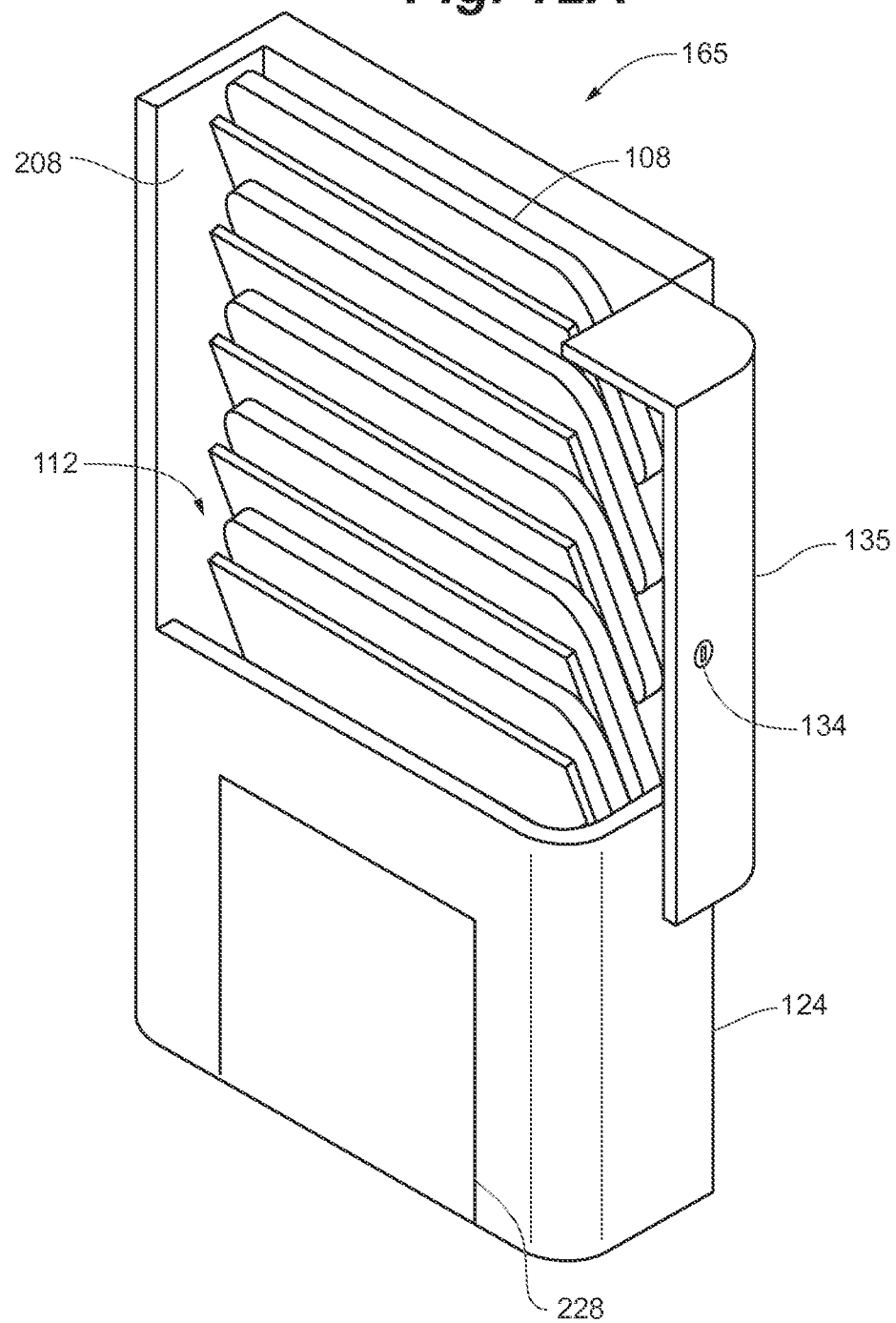

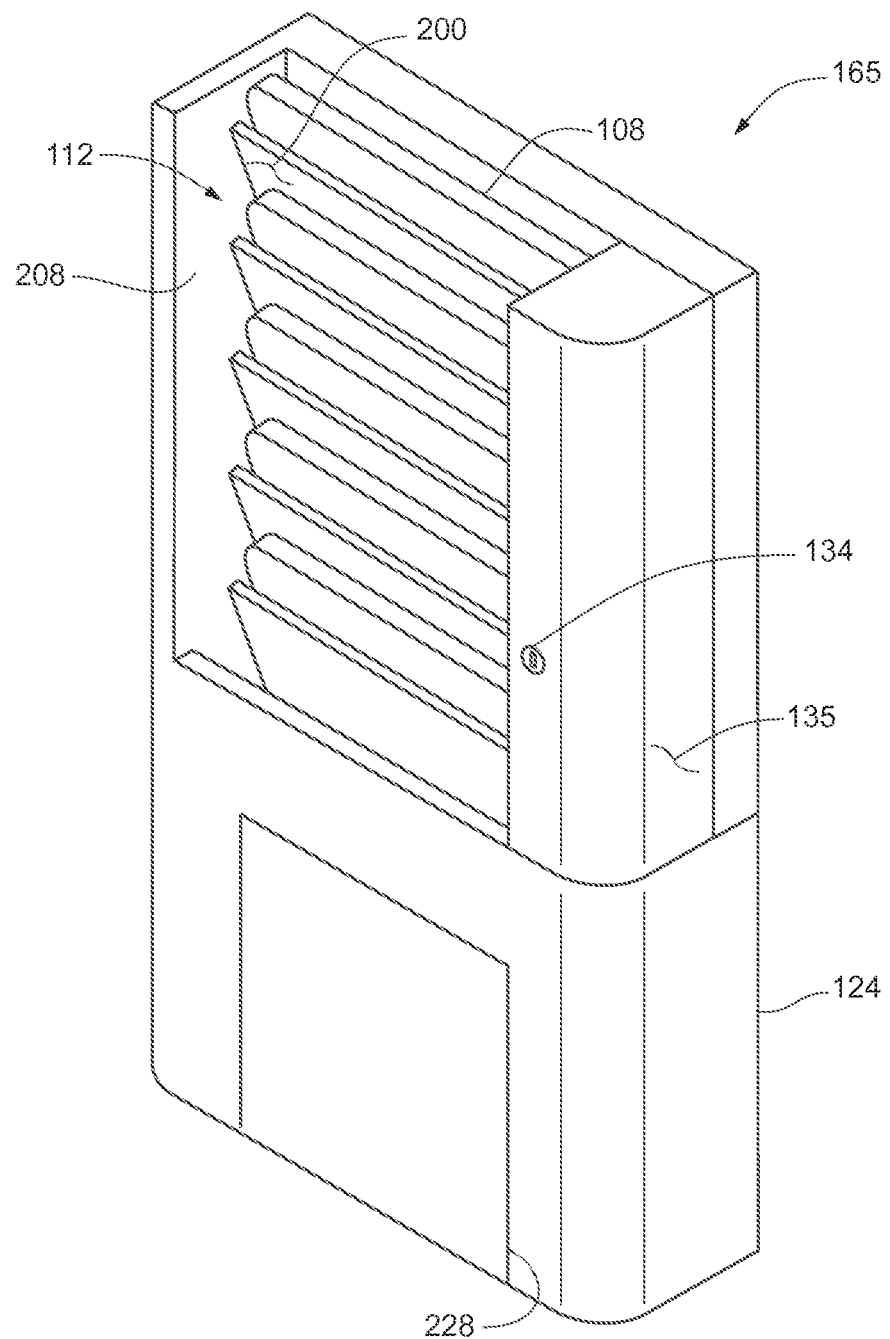

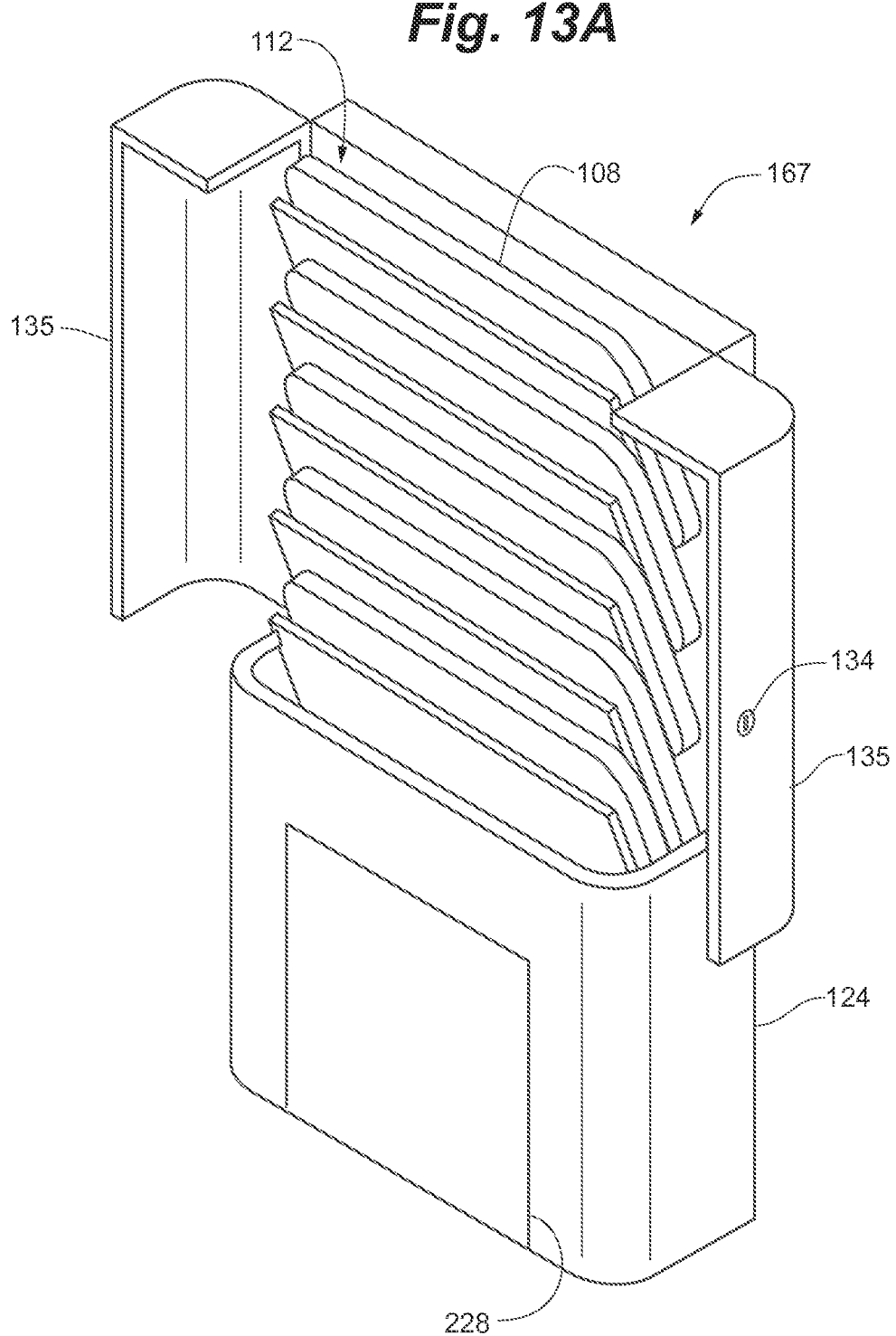

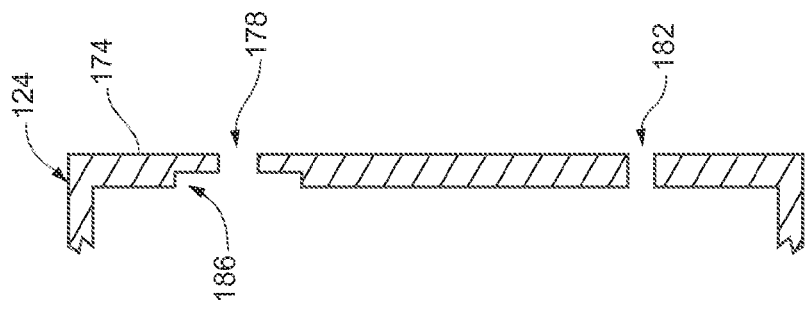
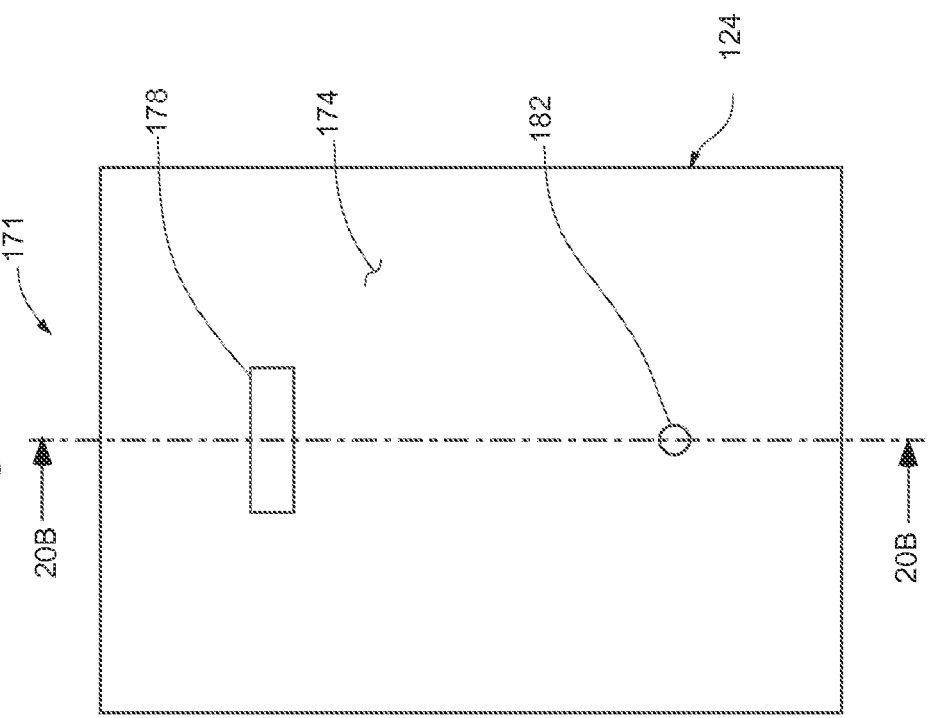

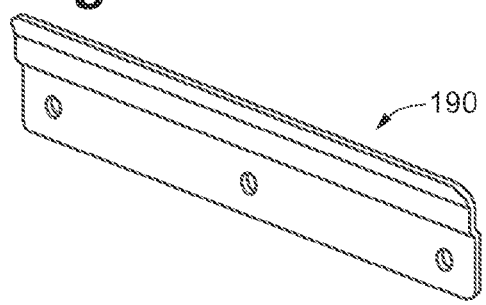
Fig. 21A
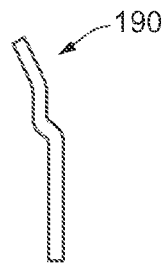
Fig. 21B
Fig. 21C
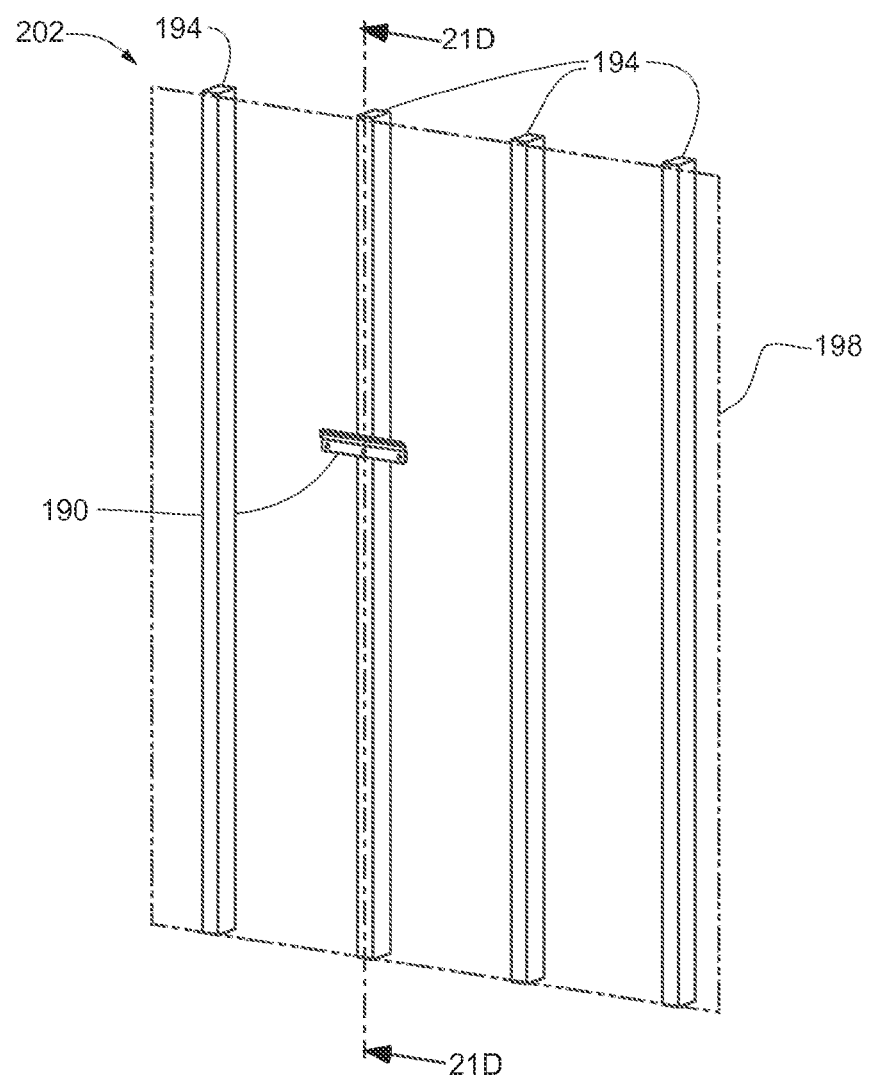

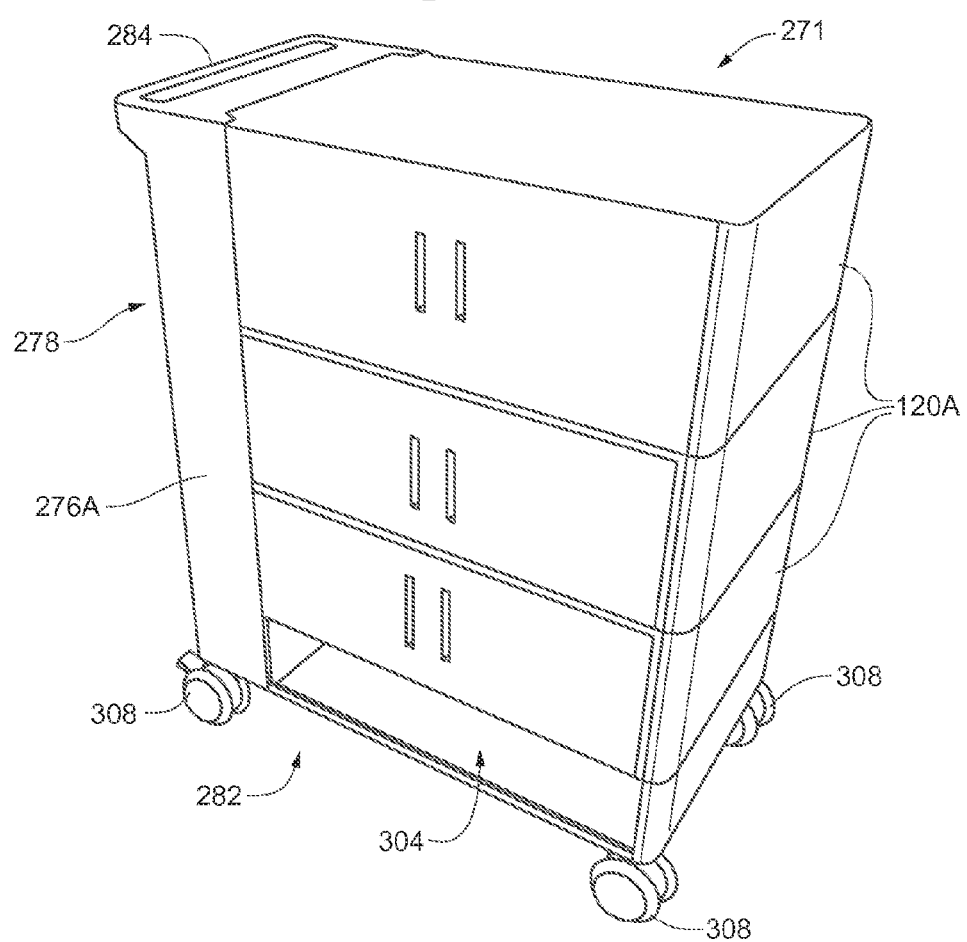

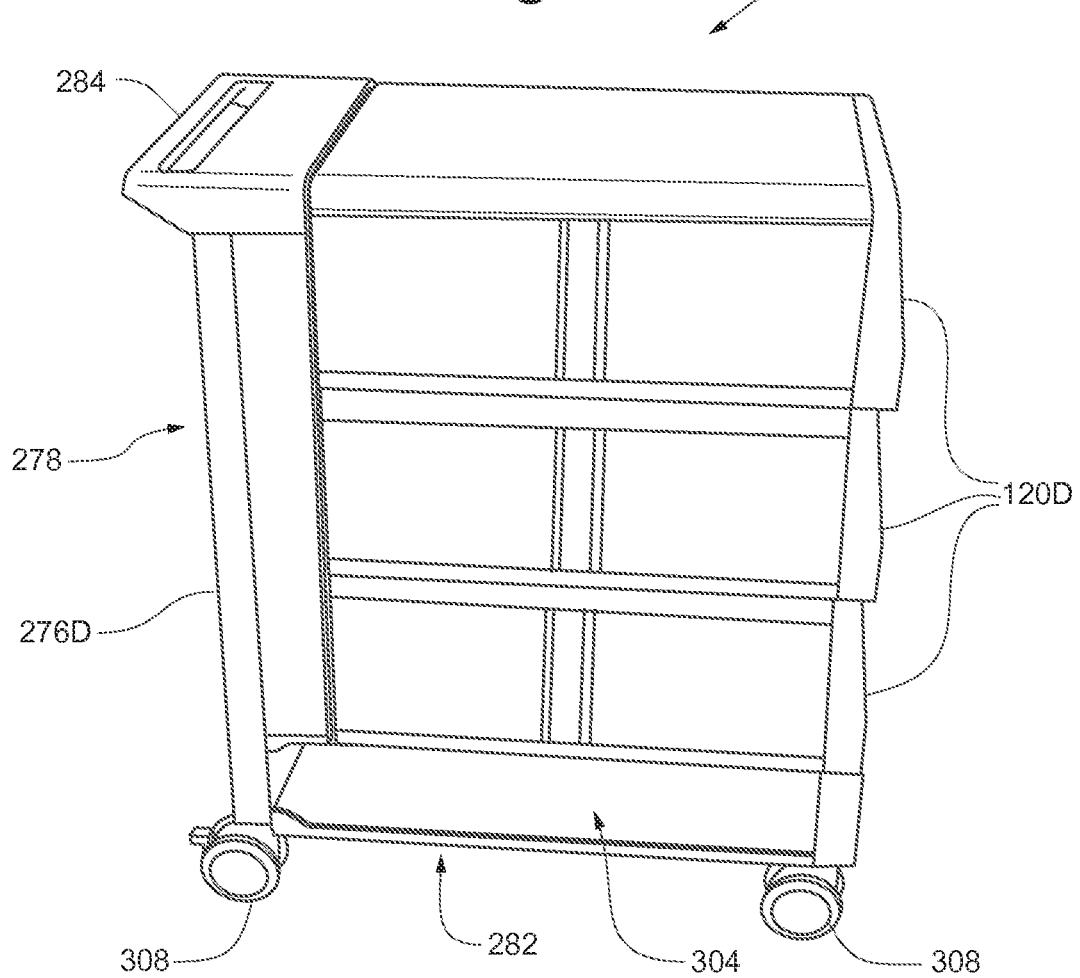

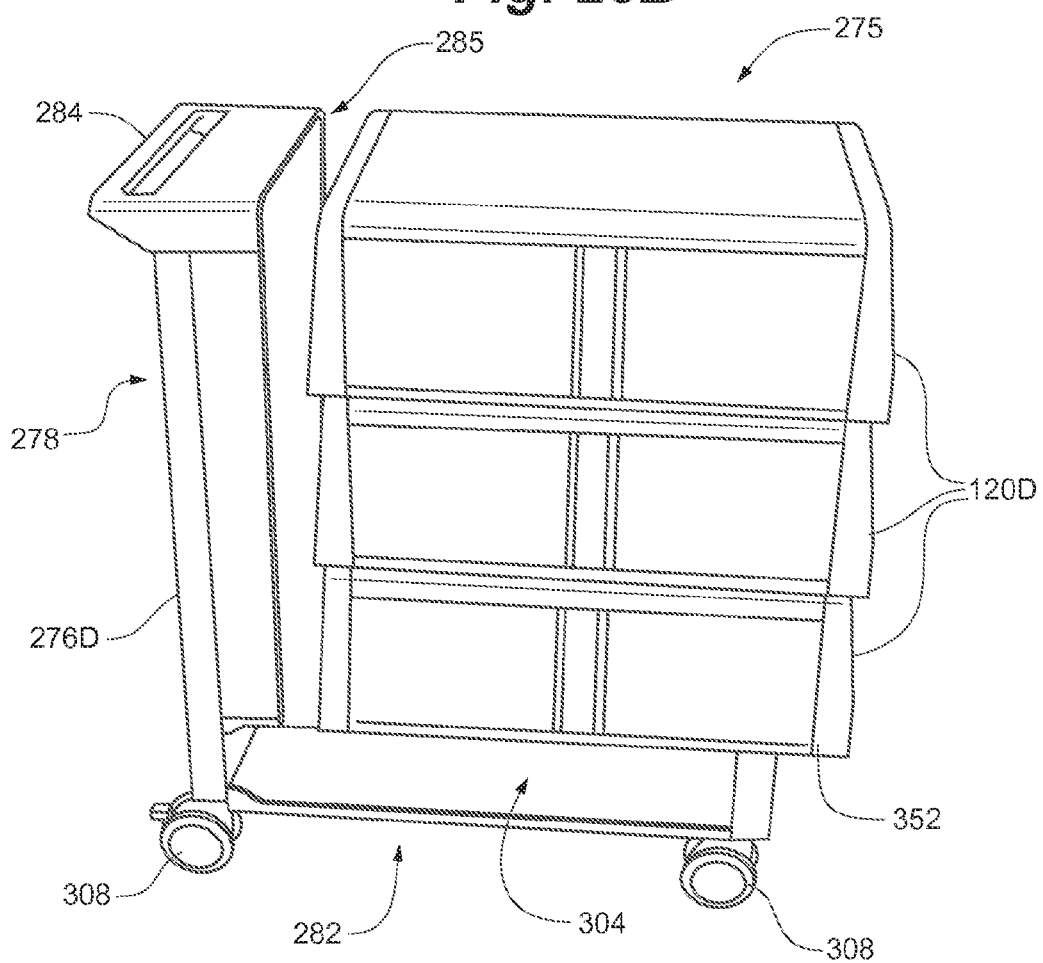

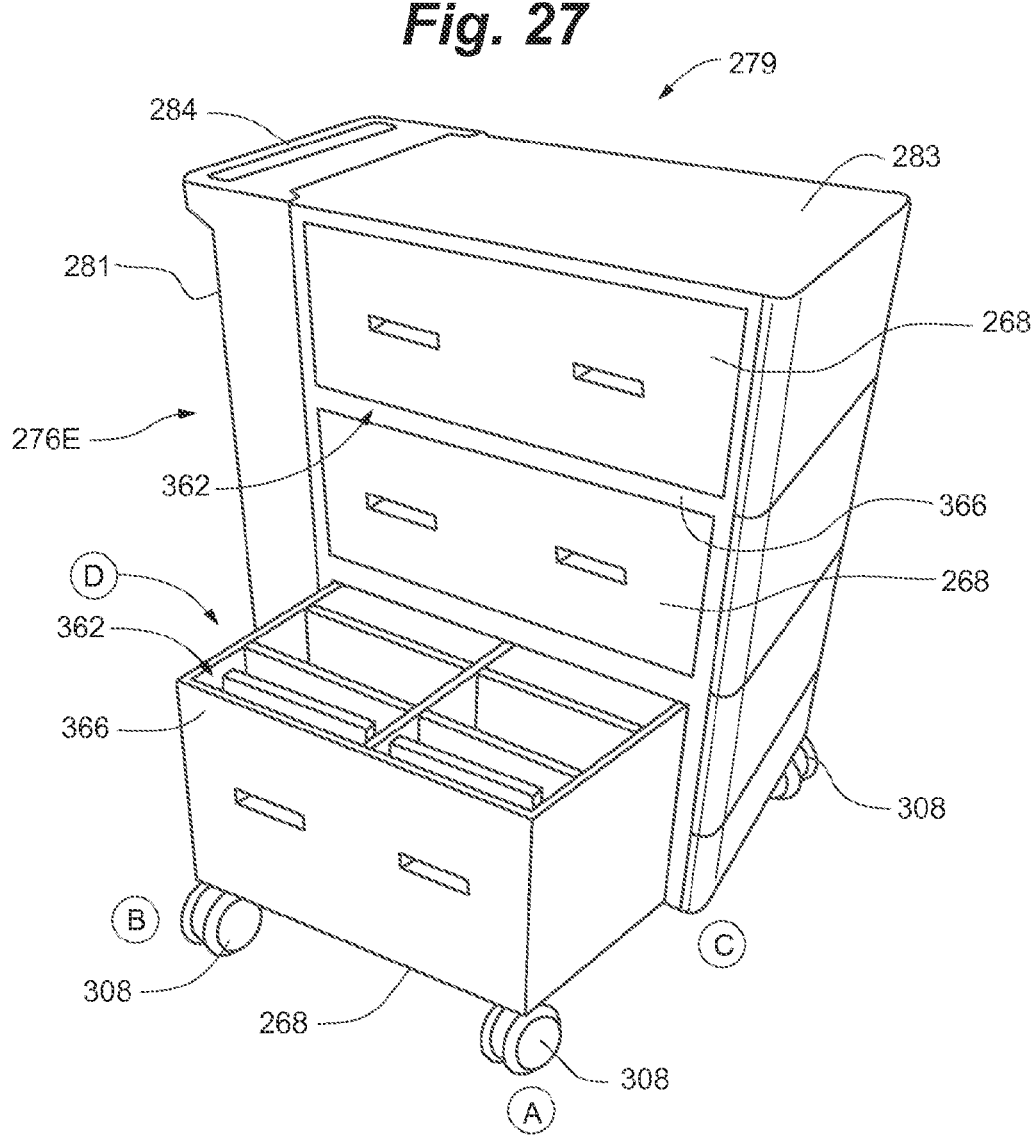

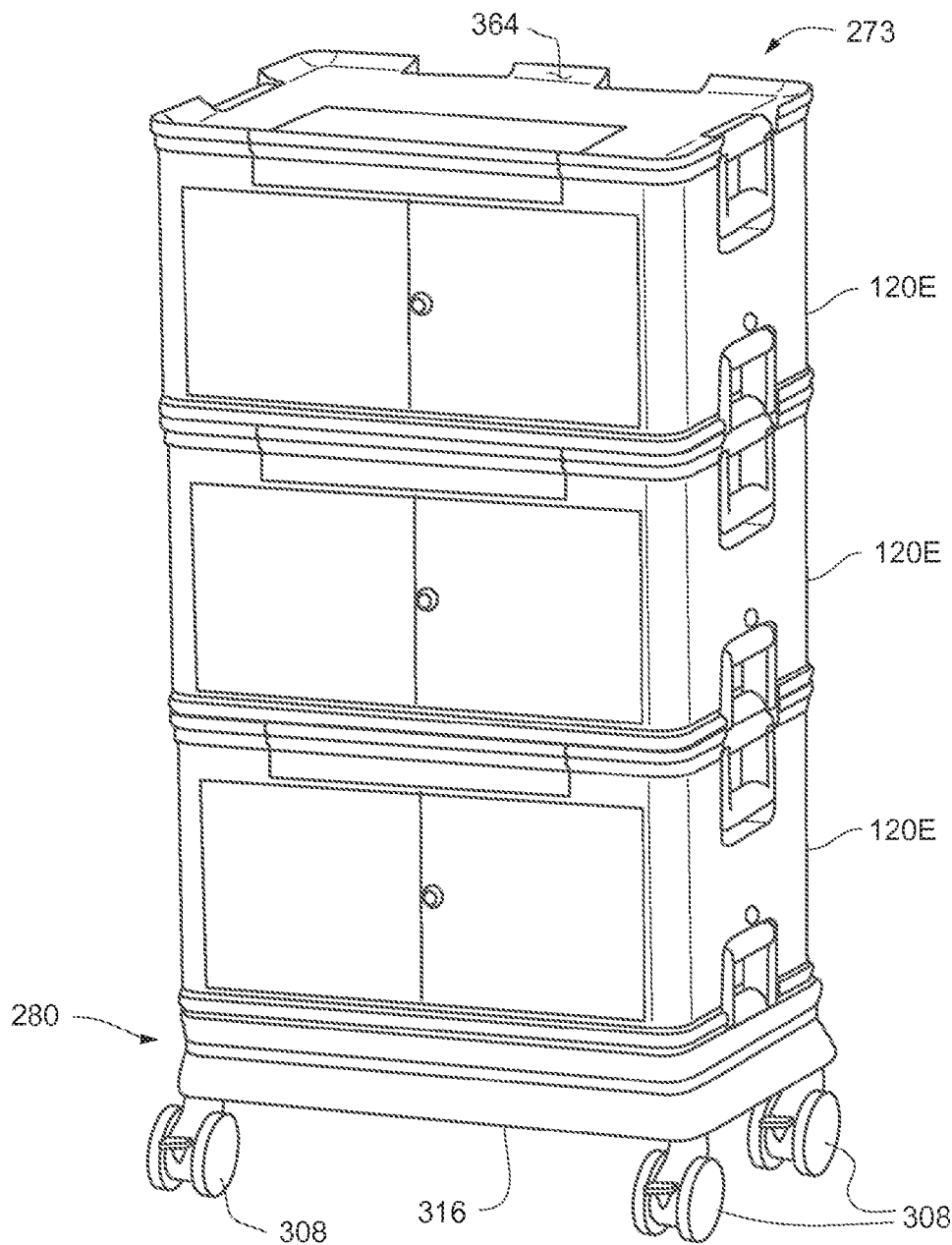

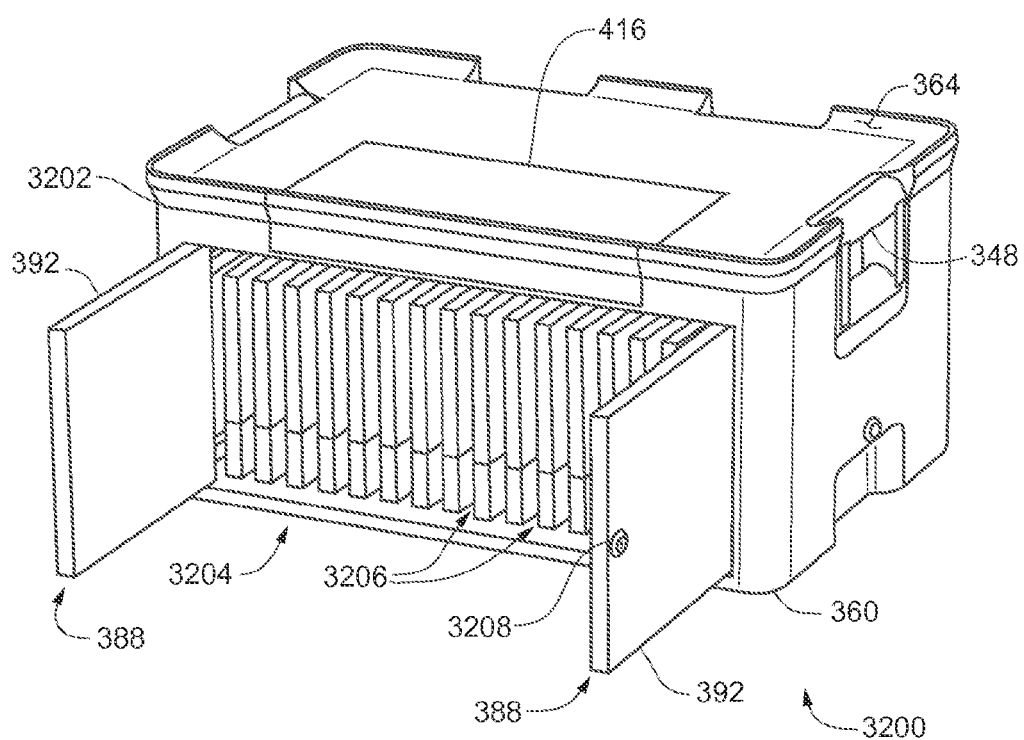

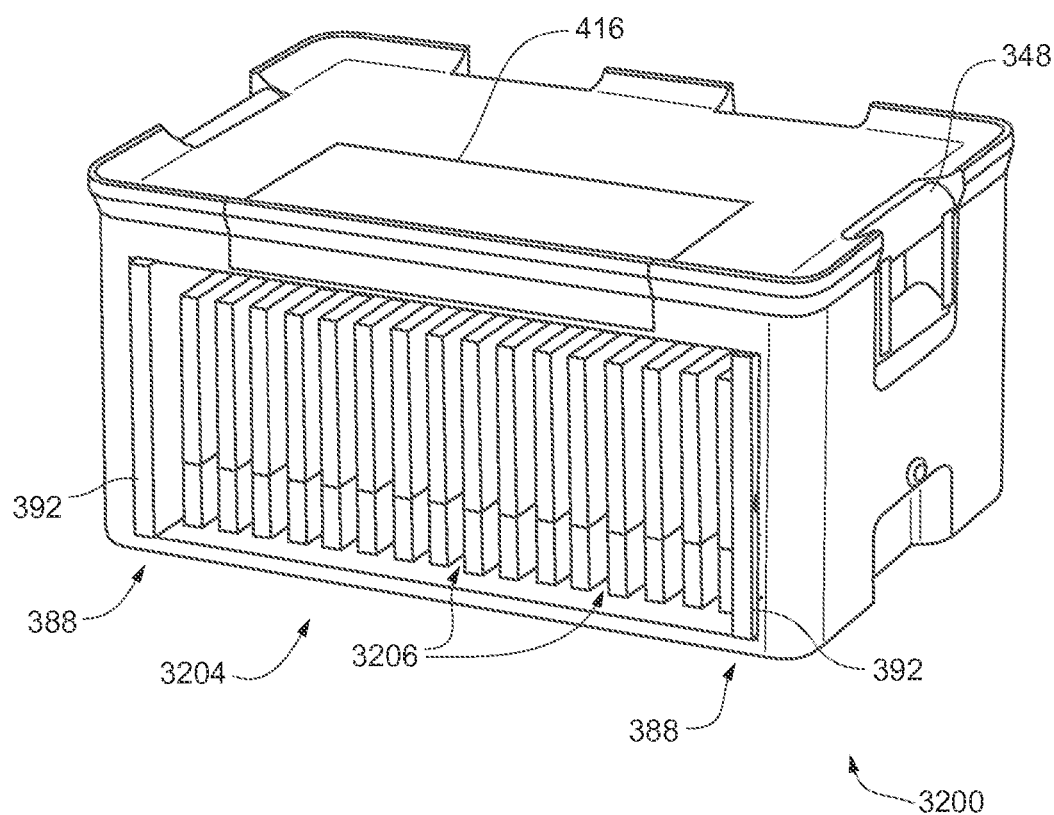

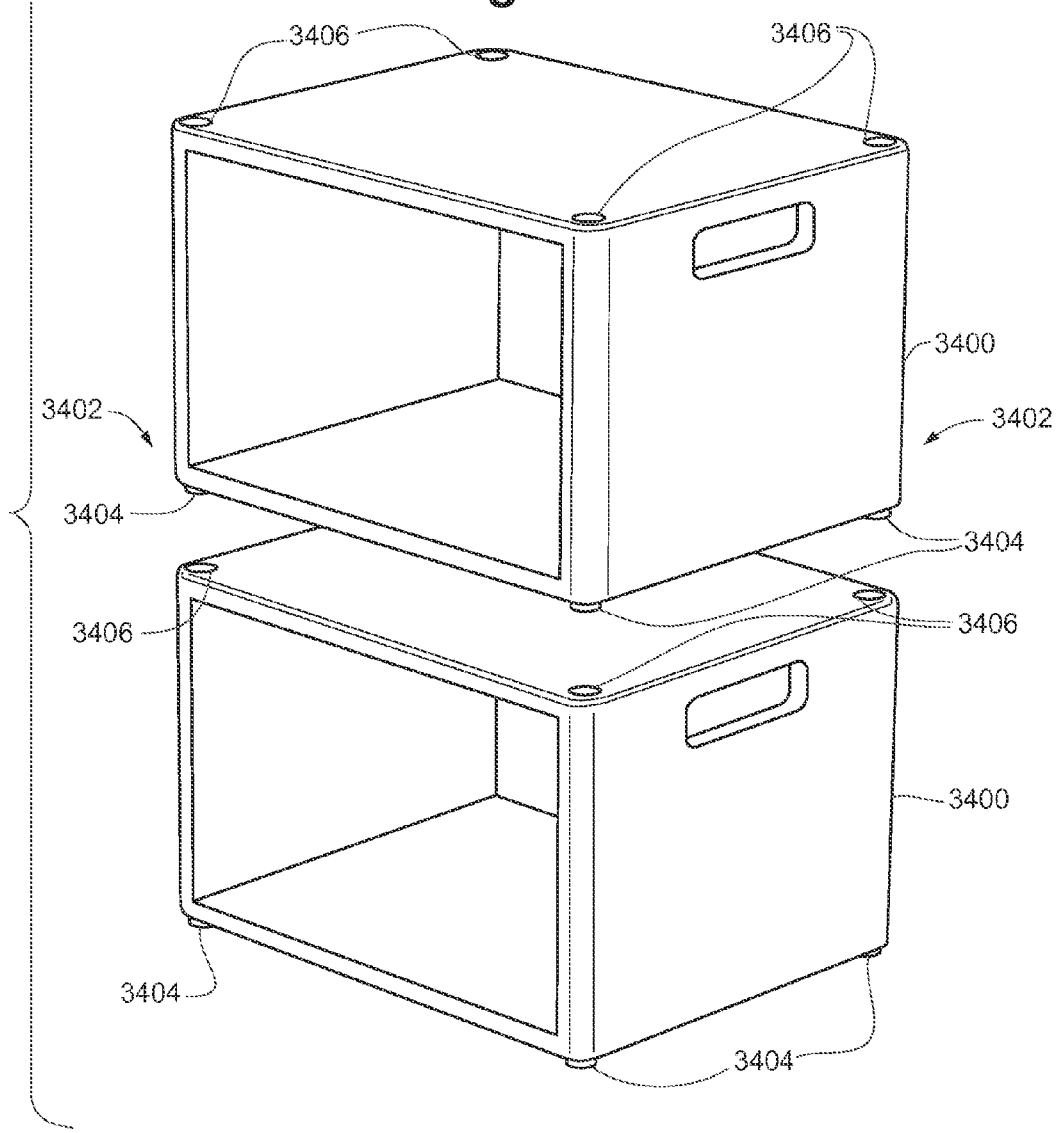

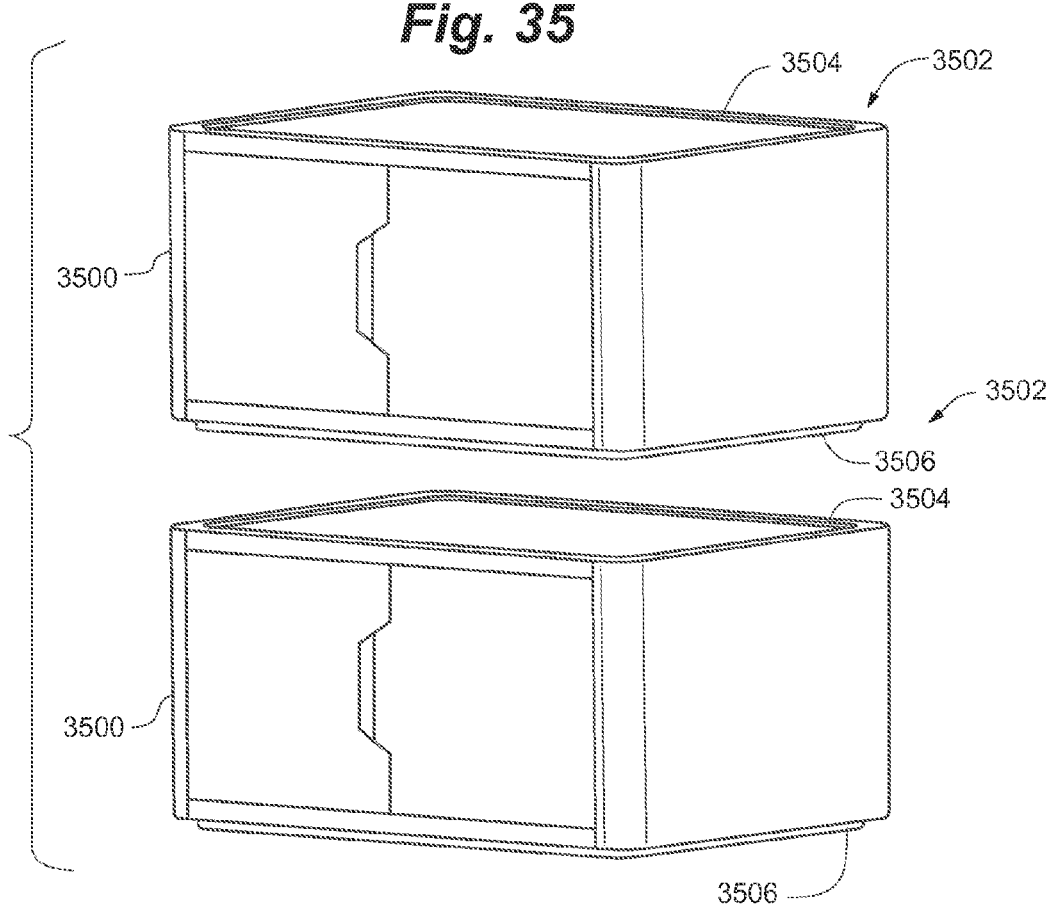

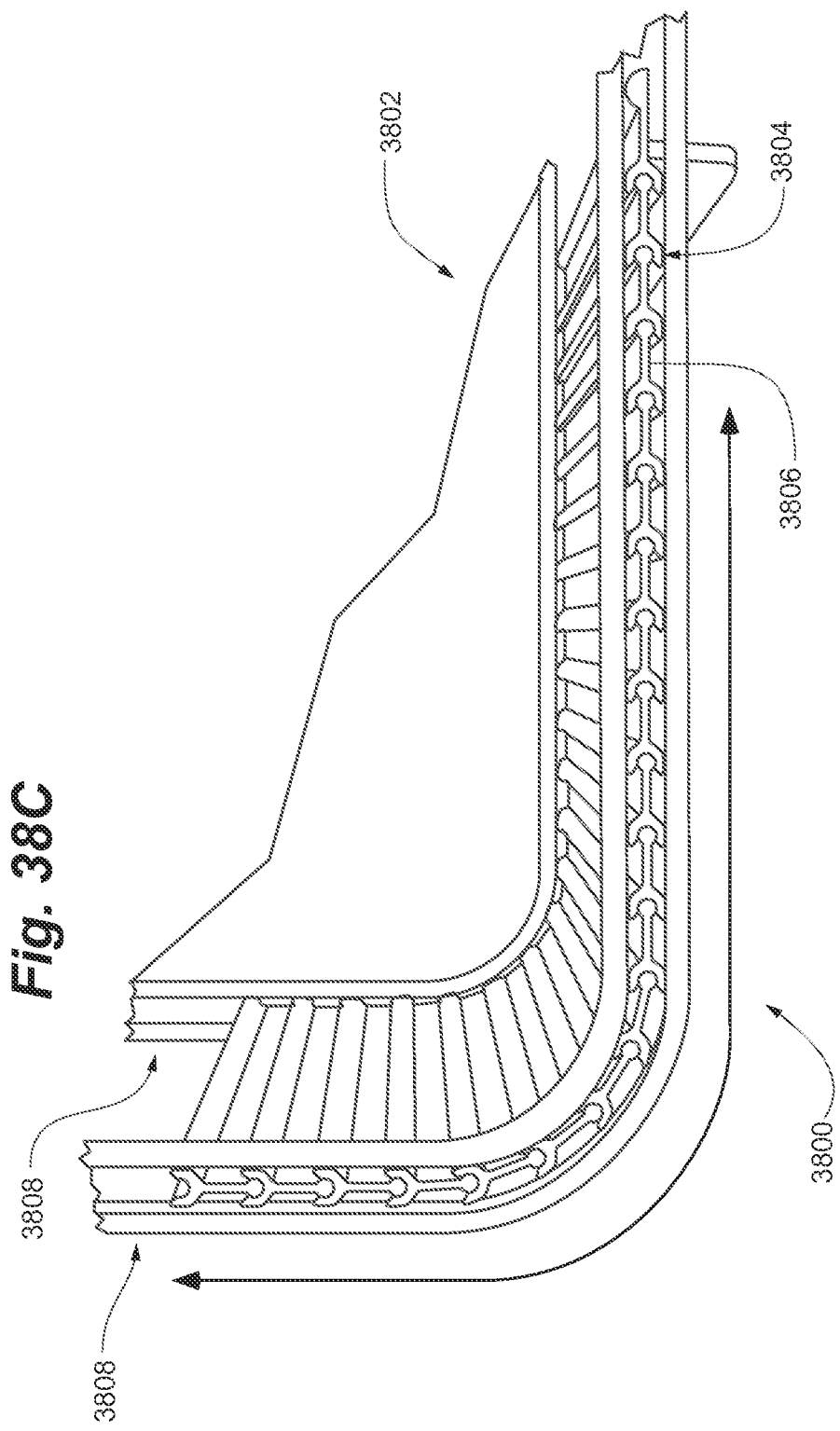

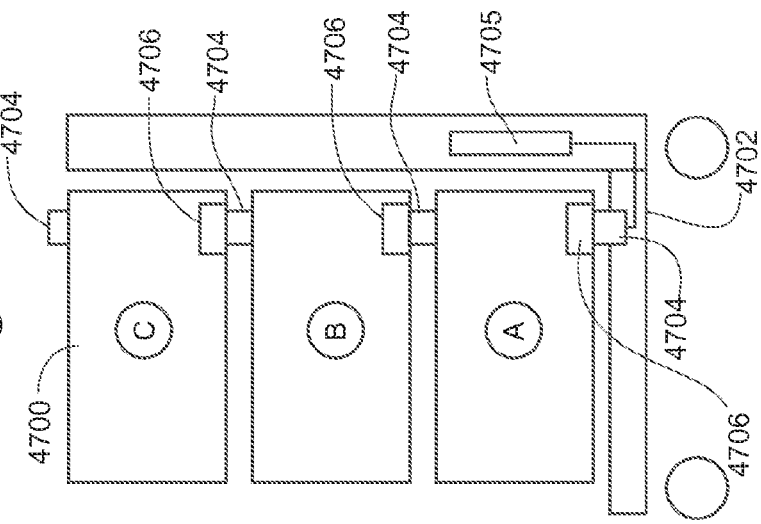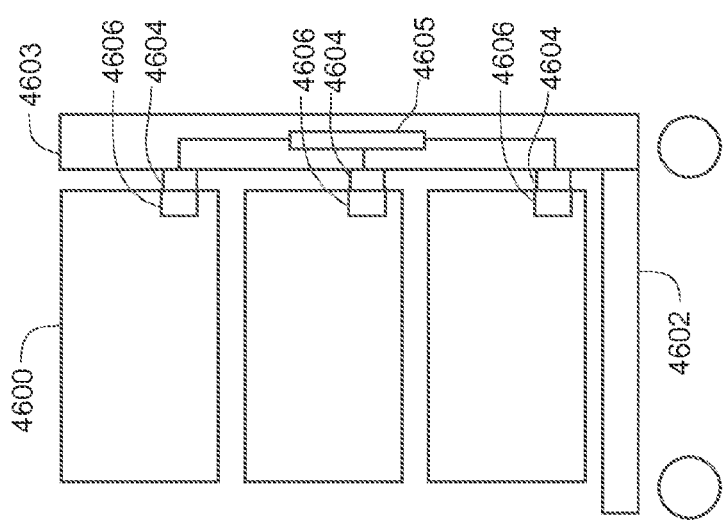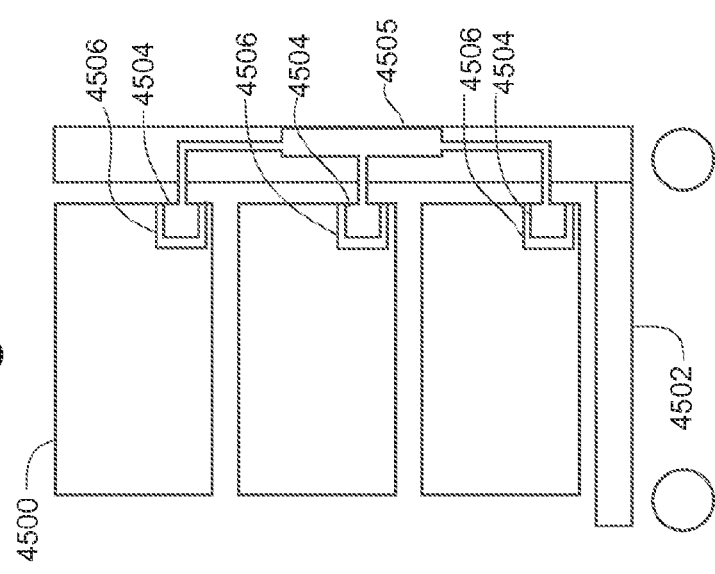

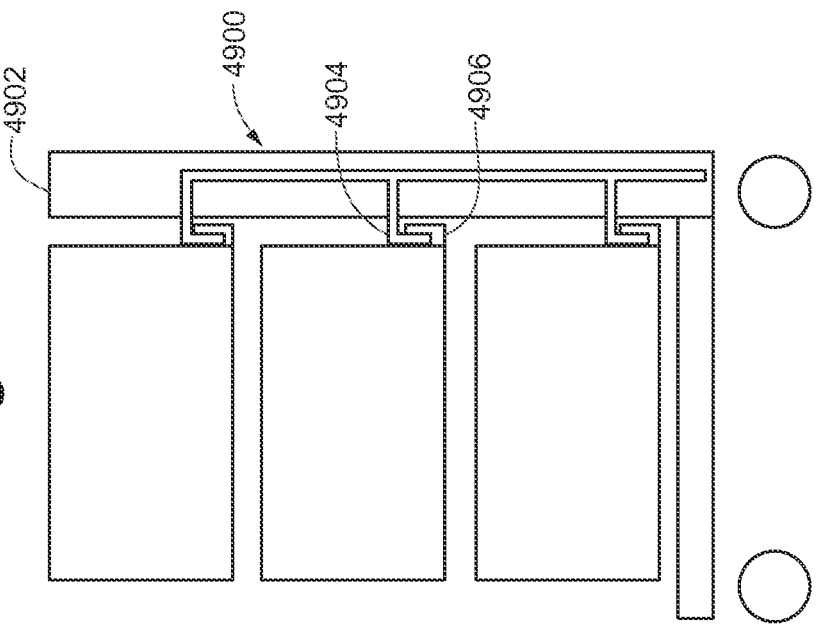
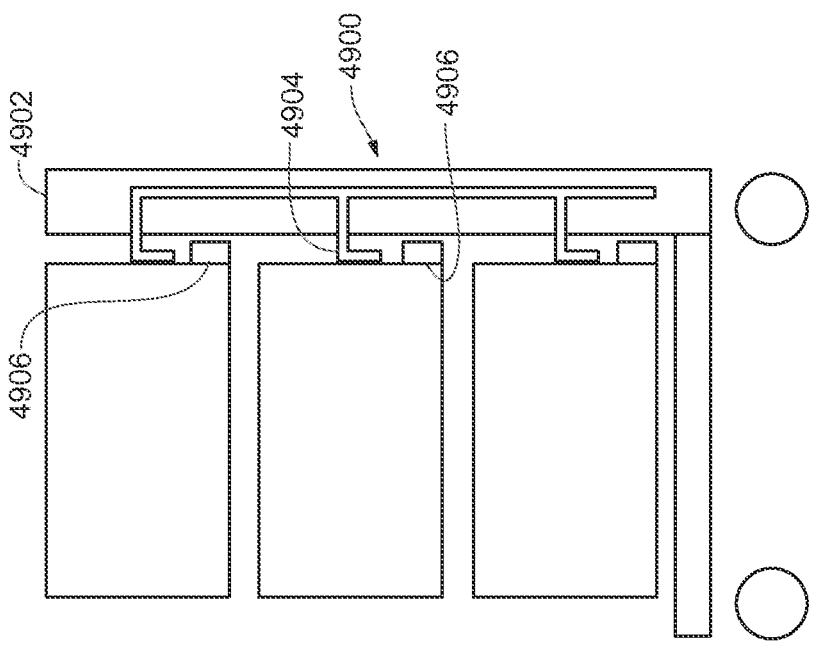

TABLET STORAGE DEVICE

RELATED APPLICATIONS

This application claims the benefit of U.S. Provisional Application Ser. Nos. 61/547,257, 61/553,620, and 61/590,032, all three of which are entitled Tablet Mounting Systems and Methods, filed Oct. 14, 2011, Oct. 31, 2011, and Jan. 24, 2012, respectively, the contents of each of which are hereby incorporated by reference.

FIELD

This disclosure generally relates to systems, devices, and methods for storing and networking mobile computing devices, such as tablet computing devices.

BACKGROUND

Tablet computing devices, sometimes referred to as tablets, or as tablet computers, are generally planar, lightweight devices that include a touch-screen display. Examples include the Apple iPad, Kindle Fire, Motorola Xoom, Samsung Galaxy, Blackberry Playbook, LG Optimus Pad, Dell Streak, HP TouchPad, HTC Flyer, and Viewsonic ViewPad. Generally, tablets have a rectangular form factor that may be considered smaller than a traditional laptop or desktop computer monitor but larger than a smaller electronic device such as a smartphone. For example, in some cases tablets may be about 20 CM to about 30 CM in length, about 10 CM to about 20 CM in height, and about 1 CM in thickness or less, with a weight of between about 400 grams and about 1 KG. Tablets also generally have a display panel (e.g. LCD or TFT) with a screen size of between about 15 CM and about 25 CM, and may include a variety of other features such as front and/or rear camera(s), wire or cable connector(s) (e.g., proprietary, HDMI, USB, audio, charging/power, etc.), and wireless network connections (e.g., 3G/4G, Wi-Fi). Tablets may also currently have between about 500 MB and about 1 GB of RAM and between about 16 GB and about 64 GB of storage memory.

A typical tablet 108 is depicted in FIGS. 1-2 with an optional fold-over cover 170. As shown, tablet 108 can have any number of tablet ports 164, which can include a power port 168, a USB port 172, a network port 176, in and out audio ports 180, a video port 184 and a proprietary port 188. Of course, not every tablet will have all the tablet ports 164 listed; a tablet may have additional ports, more than one of the same port, or a tablet may have a proprietary port 188 that provides combined connective functionality which may be equivalent to one or more of the listed ports. Likewise, tablets may not have all the tablet ports 164 located on a single edge of the tablet.

Given that tablets are generally rectangularly shaped, tablets are thus typically symmetrical when viewed front-on, as shown in FIG. 1. When viewed end on, as shown in FIG. 2, some tablets are not symmetrically shaped about a center line 156. In the example shown, the front face 128 is slightly wider than the back plate 152, which results in the asymmetrical feature 192. Tablets can also have many other asymmetrical features, which may also distinguish the front face 128 from the back plate 152 of a tablet when viewed end on, as shown in FIG. 2. Such asymmetrical features can be in the form of one or more edges that are beveled, one or more edges that have a larger radius than other edges, or any other asymmetrical feature to distinguish the front from the back when the tablet is viewed end on.

Tablet users often choose to cover their tablets with a tablet cover 170, as depicted in FIG. 1. As can be appreciated, tablet covers can protect tablets from dust, abrasions, scratches and the like, however, tablet covers also can change the overall outside linear dimensions of a tablet. In addition, as tablets can have asymmetrical features, the addition of a cover can render such an asymmetrical feature unsuitable or unusable for distinguishing the front face from the back plate of a tablet.

SUMMARY

Embodiments of tablet storage devices described herein generally provide devices and systems for storing tablets and related electronic devices. According to one embodiment, a tablet storage device can include a frame, a power supply system and a network connection system. The frame has a surface to attach to a vertical surface for supporting the frame on the vertical surface. The frame also has a plurality of slots. At least one of the slots is adapted to hold a tablet, and thus the frame is adapted to hold at least one tablet. The power supply system is configured to charge the at least one tablet and the network connection system is configured to provide a network connection to the at least one tablet.

In another embodiment, a tablet storage device includes a frame adapted to hold at least one tablet, a power supply system to charge the at least one tablet, and a network connection system to provide a network connection to the at least one tablet. The frame can have a surface to attach to a vertical surface. The frame can have a plurality of slots with at least one of the slots adapted to hold a tablet such that the frame is adapted to hold at least one tablet. The frame can also have at least one door that can be moved from an open position to a closed position. The door can be adapted to retain at least one tablet held within at least one slot when the door is in the closed position. The door can be further adapted to permit a portion of at least one held tablet to be visible to a user when the door is in the closed position.

Some embodiments may optionally provide none, some, or all of the following advantages, features, and/or options, though other advantages, features, and/or options not listed here may also be provided. In some cases the plurality of slots can be arranged in a plurality of rows and at least two columns. The frame can have at least one door that can be moved from an open position to a closed position. The door can be adapted to retain each tablet held within a row of slots when the door is in the closed position. A docking station can be disposed in at least one slot, and the docking station can be configured to align a tablet as the tablet is positioned in the slot such that a corresponding port in the tablet aligns with, and connects to, the connector.

In some cases at least one slot can be further adapted to hold a small electronic device. At least one door can be further adapted to retain the small electronic device within a slot when the door is in the closed position. The frame can have a planar surface that is adapted to be mounted to an upright planar surface. The frame can have a surface that is adapted to be mounted to a horizontal surface. At least one slot can have a notched portion to facilitate positioning and removal of a tablet. At least one slot can have a surface that is at an angle relative to a vertical plane. The angle can be substantially between 10 and 35 degrees. The frame can have a front compartment positioned under the slots, and the front compartment can permit access to components of the network connection system and components of the power supply system. At least one door can be adapted to be locked.

In some cases, a first docking station can have a connector configured to align with and connect to a first tablet as the tablet is positioned in the first docking station. The slot can be further adapted such that the first docking station can be replaced by a second docking station, where the second docking station can be adapted for use with a second tablet that is not compatible with the first docking station. In some cases storage slots can optionally have connectors for connecting to the tablets. The tablet storage device can have a network connection system that can be adapted to provide a network connection for each tablet that is connected to one of the connectors. The network connection system can include a wireless transmitter.

These and various other features and advantages will be apparent from a reading of the following detailed description.

BRIEF DESCRIPTION OF THE DRAWINGS

The following drawings are illustrative of particular embodiments of the invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

FIG. 1 is a front view of a tablet and a tablet cover.

FIG. 2 is an end view of the tablet of FIG. 1.

FIG. 5 is a front perspective view of a tablet storage rack in accordance with an embodiment.

FIG. 6 is a front perspective view of a tablet storage rack in accordance with an embodiment.

FIG. 7 is a front perspective view of a tablet storage rack in accordance with an embodiment.

FIG. 8A is a front perspective view of a tablet storage rack with a door in an open position in accordance with an embodiment.

FIG. 8B is a front perspective view of the tablet storage rack of FIG. 8A with the door in a closed position in accordance with an embodiment.

FIG. 10A is a front perspective view of a tablet storage rack with two doors in an open position in accordance with an embodiment.

FIG. 12A is a front perspective view of a tablet storage rack with a door in an open position in accordance with an embodiment.

FIG. 12B is a front perspective view of the tablet storage rack of FIG. 12A with the door in a closed position in accordance with an embodiment.

FIG. 13A is a front perspective view of a tablet storage rack with two doors in an open position in accordance with an embodiment.

FIG. 20A is a back elevation view of a tablet storage rack in accordance with an embodiment.

FIG. 20B is a partial cross-sectional view of the tablet storage rack of FIG. 20A in accordance with an embodiment.

FIG. 21A is a perspective view of a tablet storage rack bracket in accordance with an embodiment.

FIG. 21B is an end view of the bracket of FIG. 21A in accordance with an embodiment.

FIG. 21C is a perspective view of the bracket of FIG. 21A mounted to a wall in accordance with an embodiment.

FIG. 22 is a front perspective view of a tablet cart in accordance with an embodiment.

FIG. 25A is a front perspective view of a tablet cart in accordance with an embodiment.

FIG. 25B is a front perspective view of the tablet cart of FIG. 25A with multiple storage modules spaced away from a vertical portion of the tablet cart in accordance with an embodiment.

FIG. 27 is a front perspective view of a tablet cart in accordance with an embodiment.

FIG. 28 is a front perspective view of a tablet cart in accordance with an embodiment.

FIGS. 32A-33B are front perspective views of a storage module in various configurations in accordance with an embodiment.

FIG. 34 is a front perspective view of two storage modules in accordance with an embodiment.

FIG. 35 is a front perspective view of two storage modules in accordance with an embodiment.

FIG. 38C is a top view of the storage module of FIG. 38A in accordance with an embodiment.

FIGS. 45-47 are schematic views of connector arrangements for a tablet storage cart in accordance with some embodiments.

FIGS. 49A-49B are schematic views of a locking arrangement for a tablet cart in accordance with an embodiment.

DETAILED DESCRIPTION

Figure 3A:
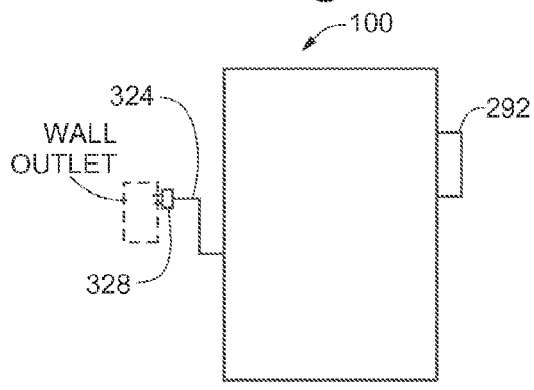
FIG. 3A is an electrical block diagram in accordance with an embodiment.

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Embodiments described herein provide systems, devices, and methods for storing and/or transporting and/or charging and/or networking one or more tablet computing devices. As discussed above, tablet computing devices are well known and are also referred to herein as tablets. In general, a tablet is a mobile computer, typically integrated into a flat touch screen and primarily operated by touching the screen, often including an onscreen virtual keyboard, rather than using a physical keyboard. The form factor of a tablet offers a more mobile way to interact with a computer. Typically, tablets have a battery that needs to be periodically charged, software that may need to be periodically updated or maintained, and data that may need to be backed up from, or transferred to the tablet.

Some embodiments provide a tablet storage device in the form of a tablet caddy for storing, transporting, charging, and/or networking one or more tablets. Tablet caddies and other tablet storage devices, can be provided with various physical configurations and features, as will be appreciated from this detailed description. As will be discussed in detail below with reference to FIGS. 5-14, in some embodiments, a tablet caddy includes a tablet storage rack adapted to hold a plurality of tablets in a corresponding plurality of slots. Such embodiments can be considered generally stationary, as they are generally adapted to be supported by a stationary surface provided by a wall, a column, a post, a desk, a counter, a floor, or any other desirable support surface. For example, a frame for a tablet storage rack may include a surface adapted to be in apposition to or attached to a vertical surface. In other embodiments, a tablet caddy can include a tablet cart adapted to hold a plurality of tablets in a corresponding plurality of slots, as will be further described below with reference to FIGS. 22-51D. These embodiments can be considered to be generally mobile, as they are generally adapted to facilitate movement of the stored tablets.

Regardless of a particular physical configuration, in some cases a tablet caddy can include a power supply system for charging a plurality of tablets when stored. FIGS. 3A-3D illustrate embodiments of some possible power supply systems that can be included in any of the generally stationary or generally mobile tablet caddy embodiments discussed herein. The power supply system is useful for charging the tablet batteries, and can also be used to power network connectivity equipment such as a wireless access point or a wired router, which are discussed below. In some cases, the power supply system is located internally to the caddy and not easily accessible to users.

In some embodiments, the power supply system can include a power cable 324, and a wall plug 328 that extend from a caddy 100 to a wall outlet, as depicted in the block diagram of FIG. 3A. Such embodiments of the power supply system can be included in any of the generally stationary or generally mobile tablet caddy embodiments discussed herein.

Figure 3C:
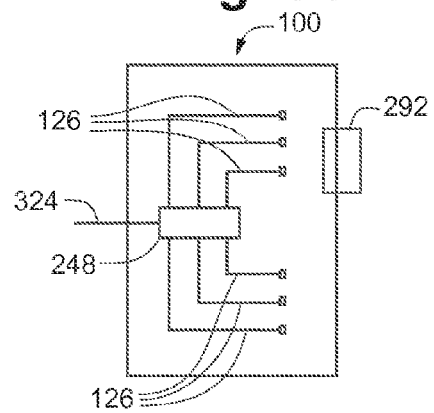
FIG. 3C is an electrical block diagram in accordance with an embodiment.
Figure 3B:
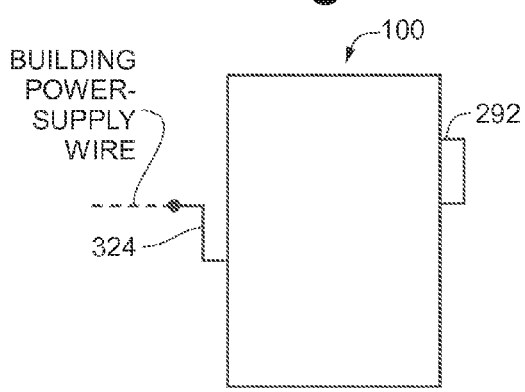
FIG. 3B is an electrical block diagram in accordance with an embodiment.

In some embodiments, the power supply system can include a power cable 324 that extends from the caddy 100 to form a junction with a building power-supply wire, as depicted in the block diagram of FIG. 3B. Such embodiments of the power supply system can be included in any of the generally stationary tablet caddy embodiments discussed herein.

Embodiments of the power supply system convert AC power to DC power and ultimately route the power to each stored tablet. In some embodiments, the power supply system includes a timer, or other arrangement, that charges a subset of the total number of stored tablets at any one time, and can cycle the subsets until all tablets are substantially fully charged. Such a timer or other system, is useful for limiting the instantaneous power draw of the power supply system. In some embodiments, the power supply system can include an auxiliary outlet 292 located on the caddy so that other devices, such as accessories, can be conveniently plugged in and provided with AC or DC power.

In some embodiments, the power supply system can include a combined power supply 248 which has a plurality of wires 126 that provide power to each stored tablet, as depicted in the block diagram of FIG. 3C. In some embodiments, the power supply system can include a plurality of individual power supplies 260, each having a wire 126 that provides power to each stored tablet, as depicted in the block diagram of FIG. 3D. In some embodiments that use individual power supplies 260, the number of tablets that are stored and connected to the power supply system can be limited so that the overall combined power demanded from the tablets does not exceed the capacity available, either from a direct junction to a building power-supply wire, or from a standard wall outlet.

Figure 3D:
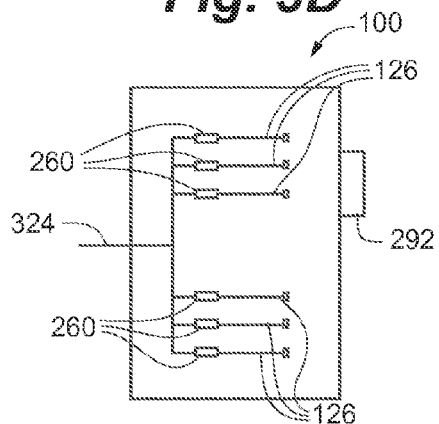
FIG. 3D is an electrical block diagram in accordance with an embodiment.

In some embodiments, a combined power supply such as in FIG. 3C or a switching system for the embodiment in FIG. 3D can include smart charging logic that charges only a subset of the connected tablets at one time, according to the charging current demanded by each tablet. A subset of connected tablets that are being simultaneously charged can be chosen by the smart charging logic when the current draw by the total number of connected tablets that require charging exceeds a preset current level. The subset of connected tablets that are being simultaneously charged can be re-calibrated at the start of a set time interval, and a new sub-set of tablets can then be selected for charging, again according to the charging current demanded by each tablet. Re-calibrating and selecting a new sub-set of tablets for charging at a set time interval is useful because typically tablets draw current at a high rate until their batteries are charged to 80% of their full capacity, and then at that point the current draw is considerably reduced. Thus the current demands of a given sub-set of tablets varies over time. By re-calibrating and selecting a new sub-set of tablets for charging at a set time interval, charging efficiency can be maximized. In addition, using this method of regulating the charging of the connected tablets, the charging logic limits the number of tablets drawing power so that the caddy does not exceed the capacity available either from a junction with a building power-supply wire, or from a standard wall outlet. The charging logic can be implemented in the combined power supply 248 in any suitable manner, such as through hardware/circuitry, software, and/or firmware. U.S. patent application Ser. No. 13/174,637, entitled "Electrical Load Management System and Method," filed Jun. 30, 2011, describes systems and methods for such electronic load management and is incorporated herein by reference in its entirety.

In embodiments where the power supply system of the caddy includes a wire that is directly connected to a building's power-supply wire, as depicted in FIG. 3B the connection to the building's power supply can be adapted so that the overall power available to the power supply system is greater than what would be available from a standard wall outlet. As a result, for these embodiments, a greater number of tablets can be charged at the same time, as compared to those embodiments that use a standard wall outlet, as depicted in FIG. 3A.

An embodiment that uses a standard wall outlet connection, as depicted in FIG. 3A can use either the combined power supply, as depicted in FIG. 3C, or it can use individual power supplies as depicted in FIG. 3D. Likewise, an embodiment that uses a wire directly connected to a building's power-supply wire, as depicted in FIG. 3B can use either the combined power supply as depicted in FIG. 3C, or it can use individual power supplies as depicted in FIG. 3D.

As depicted in the block diagrams of FIGS. 4A-4D, a network connection system can be provided for connecting a plurality of tablets to a network such as the Internet and/or a Local Area Network. Such embodiments of the network connection system can be included in any of the generally stationary or generally mobile tablet caddy embodiments discussed herein. In some cases, the network connection system is stored internally within the caddy and is not easily accessible to users.

Figure 4A:
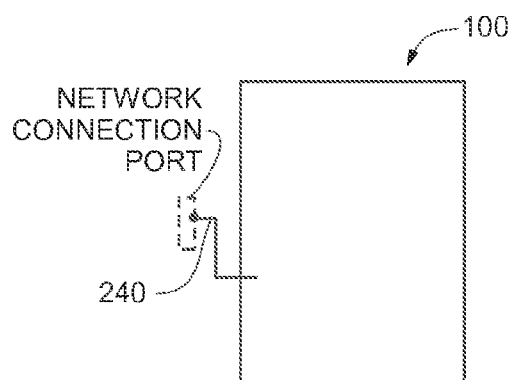
FIG. 4A is a network block diagram in accordance with an embodiment.
Figure 4C:
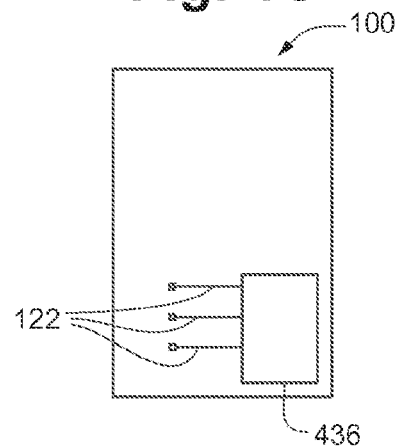
FIG. 4C is a network block diagram in accordance with an embodiment.
Figure 4B:
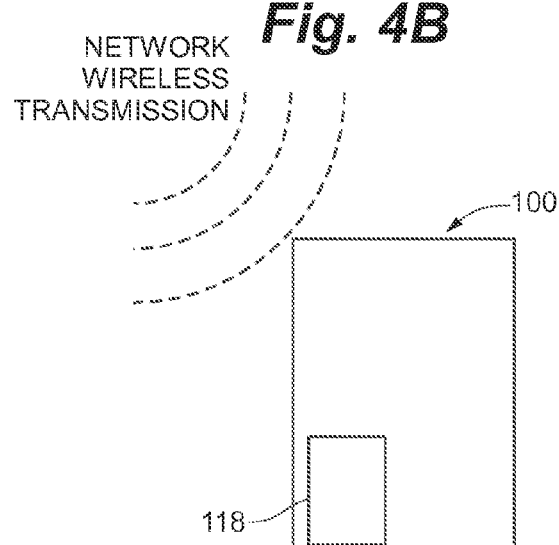
FIG. 4B is a network block diagram in accordance with an embodiment.

In some embodiments, as depicted in the block diagrams of FIGS. 4A-4D, the network connection system can include a device for the caddy to communicate with a network. In some embodiments, this device can include a cable 240 extending from the caddy 100, as depicted in FIG. 4A. In some embodiments, the caddy can include a wireless receiver 118 that allows the caddy to communicate with the network, as depicted in FIG. 4B.

Figure 4D:
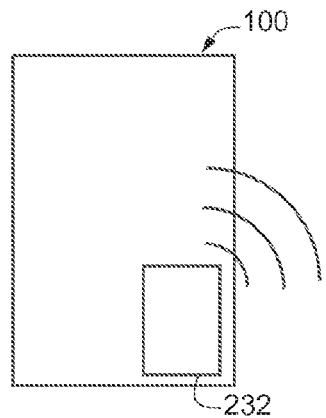
FIG. 4D is a network block diagram in accordance with an embodiment.

In some embodiments, as depicted in the block diagrams of FIGS. 4C-4D, the network connection system can include a device for the caddy to communicate with a plurality of tablets. A network connection from the caddy 100 to a plurality of stored tablets can include a wired connection to each tablet, as depicted in FIG. 4C. This can include a wired router 436 and individual wires 122 to each of the stored tablets. As depicted in FIG. 4D, a network connection from the caddy 100 to a plurality of tablets can include a wireless transmitter 232, such as a Wi-Fi access point, which can also be referred to as a Wi-Fi transmitter, a Wi-Fi router, or by other similar terms. A wireless transmitter can provide wireless access to a network, which can be used by stored tablets, and by tablets that are in use by a user within the operating radius of the transmitter. Of course wireless technology other than Wi-Fi is also possible, depending on the preferences of a user, the capabilities of the tablets, and the wireless protocols that are commercially available, or in use.

An embodiment that uses a wired connection to a network, as depicted in FIG. 4A can use either a wired connection to the tablets, as depicted in FIG. 4C, or it can use a wireless connection to the tablets, as depicted in FIG. 4D. Likewise, an embodiment that uses a wireless connection to a network, as depicted in FIG. 4B can use either a wired connection to the tablets, as depicted in FIG. 4C, or it can use a wireless connection to the tablets, as depicted in FIG. 4D. Thus, either by a wired, a wireless, or some combination of wired and wireless connections, embodiments of the caddy can allow for communication between each stored tablet and a network. Such connections are useful for providing software updates to the tablets; uploading data to the tablets; downloading data from the tablets; and/or backing up data from the tablets when they are not in use. Of course, a wireless connection from the caddy to the tablets can also additionally allow for communication between a network and each tablet, while each tablet is in use, and within the range of the wireless connection.

Turning now to FIGS. 5-14, some embodiments providing a generally stationary tablet caddy will now be described. (As will be discussed, such embodiments can in some cases utilize a power supply system such as one of those described above with respect to FIGS. 3A-3D and/or a network connection system such as one of those described above with respect to FIGS. 4A-4D.) According to some embodiments, a stationary tablet caddy generally includes a tablet storage rack adapted to hold a plurality of tablets in a corresponding plurality of slots. When stored, each tablet can be individually accessed for storage or retrieval, e.g., without disturbing other tablets that may also be stored. In some embodiments connector(s) useful for connecting a stored tablet to a power supply system and/or to a network connection system are disposed in one or more of the slots. In some cases the connector(s) may be pigtail connection connectors or docking station connectors, which will both be described in greater detail below. A tablet storage rack can be configured to hold as many tablets as desired. For example, in some cases a rack may hold one, ten, twenty, thirty, fifty, or any number of tablets greater or less.

Stationary tablet caddy embodiments can be considered generally stationary as they are commonly adapted to be supported by or mounted to a stationary surface. For example, a frame for a tablet storage rack may include a surface adapted to be in apposition to or attached to another surface, such as a stationary support surface. Examples of such stationary surfaces can include vertical surfaces, horizontal surfaces, and surfaces at other angles, including surfaces of a wall, a column (which can have, for example, a circular, oval, square, rectangular or irregular cross-sectional shape), a post, a desk, a counter, a floor and a ceiling.

The plurality of slots of a tablet storage rack can be generally configured to hold a plurality of corresponding tablets. For example, each slot in a tablet storage rack may be configured to receive and store one tablet or optionally two or more tablets depending upon the particular physical implementation. In some cases one or more slots may include one or more connectors for connecting to a tablet received within the slot(s) as mentioned above. Thus, in some cases the slots may be referred to as storage slots, connection slots, and/or storage and connection slots. While certain embodiments of tablet caddies are described herein as specifically including storage slots, connection slots, and/or storage and connection slots, it should be appreciated that in many cases these terms are used interchangeably and many variations of slot configurations can be utilized, including configurations in which none, one, some, or all of the slots in a tablet caddy have connectors for connecting to a tablet received within a particular slot.

In some cases storage and/or connection slots can be arranged in a substantially vertical orientation in a frame such that tablets can be stored in a substantially vertical orientation. Storage and connection slots can include any shape that is useful for holding a tablet in such a generally vertical orientation, which can include holding a tablet on one of its four edges (the top, bottom, left and right edges when the screen of the tablet is viewed). Tablets can also be held at a slight angle to a vertical, which can range from about 10 degrees to about 30 degrees from vertical.

One embodiment of a stationary tablet caddy including a tablet storage rack 151 is depicted in FIG. 5. As shown, the rack 151 has a frame 124 which includes six connection slots 112, with five tablets 108 depicted as stored in the rack. The rack 151 also includes a front compartment 228, which will be described in further detail below. Tablet storage racks can include any desirable number of slots 112 (e.g., from one to many). Another embodiment of a tablet storage rack 153 is depicted in FIG. 6 which shows a rack that has a frame 124 which includes three connection slots 112. Three stored tablets 108 are shown placed in the rack. The rack 153 also includes a front compartment 228.

FIG. 7 depicts an embodiment of a tablet storage rack 155 that has a frame 124. The frame 124 includes eight connection slots 112 that are configured in two rows and four columns, with two slots 112 per column. Vertical dividers 220 are provided between each adjoining column of slots. The rack 155 also includes two front compartments 228, and is shown with seven tablets 108 stored in the rack. Thus referring to FIGS. 5, 6 and 7, it should be appreciated that tablet storage racks can include various configurations of slots, including generally vertical and generally horizontal configurations, with different numbers of rows and columns of slots depending upon the design requirements for a particular implementation.

FIGS. 8A-8B illustrate an embodiment of a tablet storage rack 157 including a locking door. Rack 157 has a frame 124 which includes five connection slots 112 and a door 132 with a lock 134. FIG. 8A depicts the door in an open position, which allows loading and removing of tablets from the slots 112. FIG. 8B depicts the door in a closed position, which when locked secures the tablet storage rack 157 to prevent removal of tablets from the slots 112. The door 132 can be designed to open and close in any usual manner, for example, by hinges, sliders, rollers, and the like. In the embodiment shown in FIGS. 8A-8B, the door 132 is adapted to slide from the open to the closed position. The rack 157 also includes a front compartment 228.

Figure 9A:
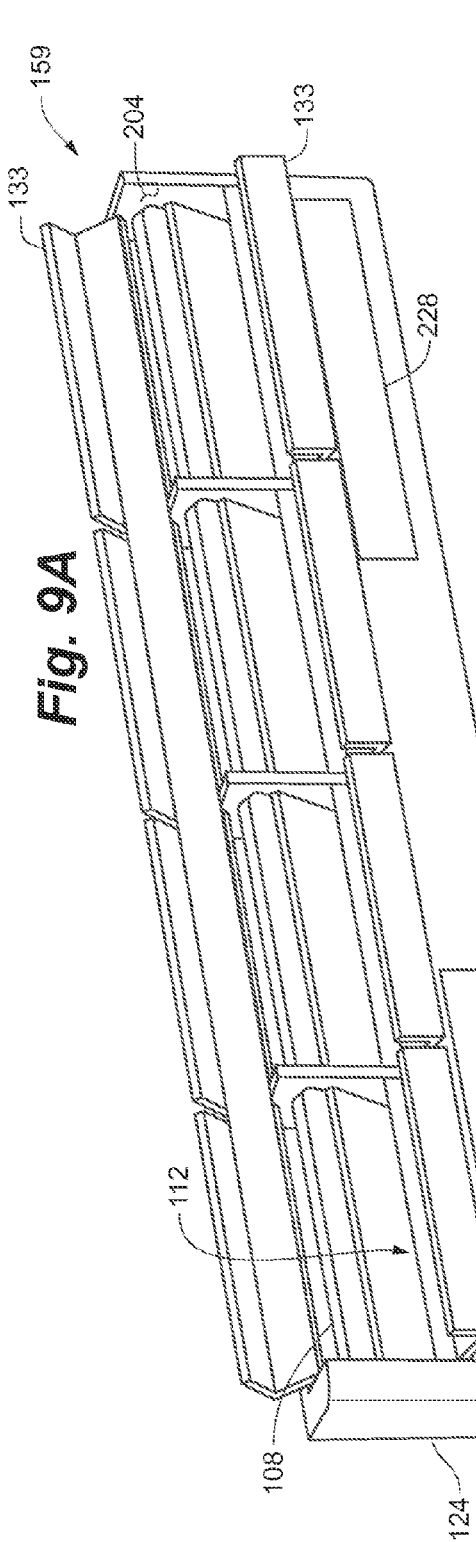
FIG. 9A is a front perspective view of a tablet storage rack with two doors in an open position in accordance with an embodiment.
Figure 9B:
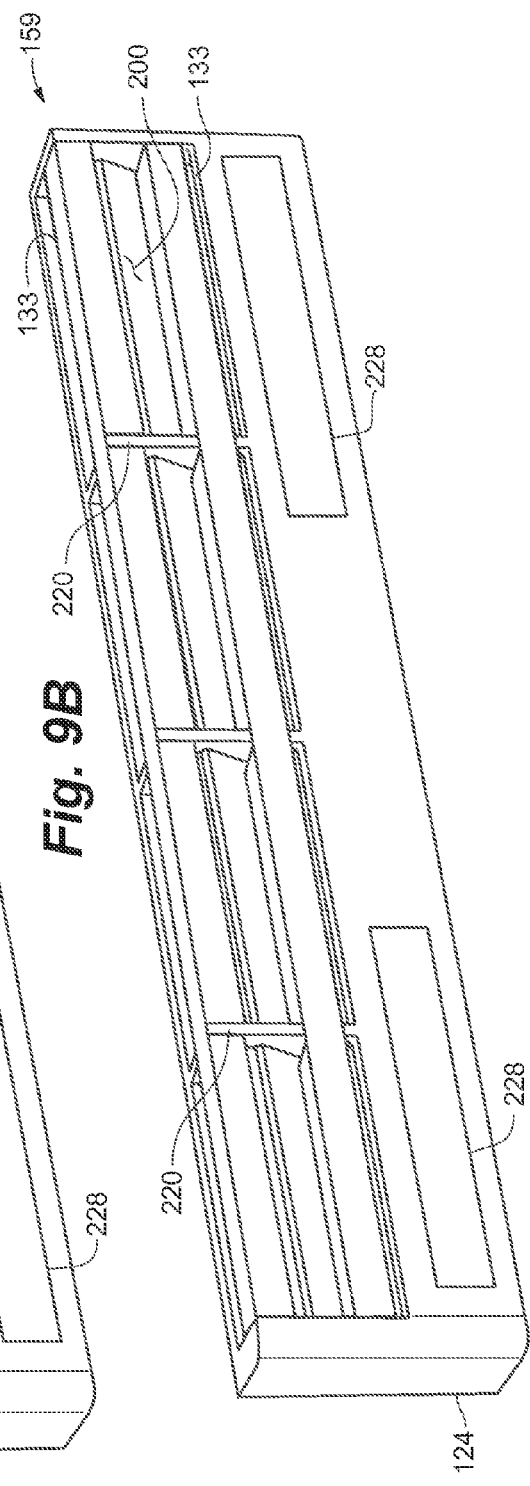
FIG. 9B is a front perspective view of the tablet storage rack of FIG. 9A with the doors in a closed position in accordance with an embodiment.

FIGS. 9A-9B illustrate another embodiment of a tablet storage rack 159 that includes doors configured to close at least partially over tablets stored within the rack 159. The tablet storage rack 159 has a frame 124 which includes eight connection slots 112, and two doors 133. The slots 112 are configured in two rows and four columns, with two slots per column. Vertical dividers 220 are provided between each adjoining column of slots. The rack 159 also includes two front compartments 228. Rack 159 is depicted with four tablets 108 stored in the rack. FIG. 9A shows the rack 159 with the two doors 133 in an open position, and FIG. 9B depicts both doors 133 in a closed position. Each door 133 is adapted to rotate about a substantially horizontal axis from the open to the closed position. As shown, the bottom door 133 is configured to rotate up to close about the bottom row of slots while the top door 133 is configured to rotate down to close about the top row of slots. Each door 133 includes a number slots corresponding to the vertical dividers 220 that allow the doors to close about the dividers thus providing a more secure enclosure about the tablets 108. While in this embodiment the doors 133 are provided as a single bottom door and a single top door, it is contemplated that any number of doors can be used, including multiple top doors and/or multiple bottoms doors (e.g., one door per slot).

Figure 10B:
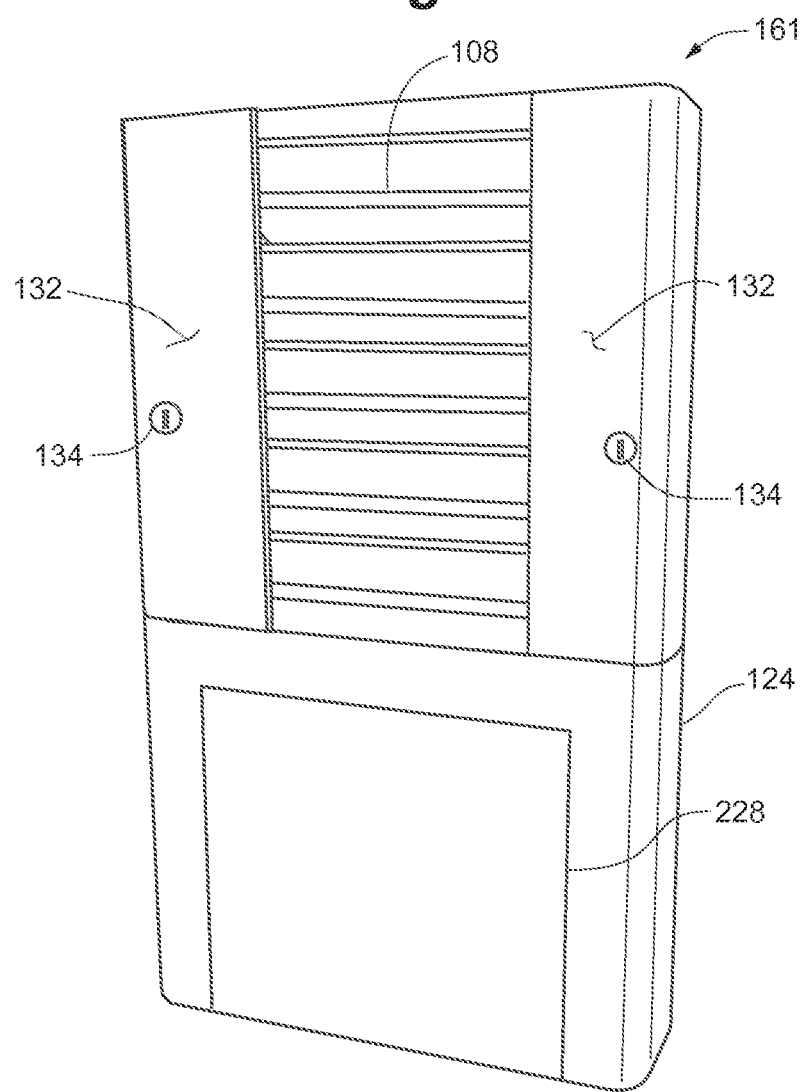
FIG. 10B is a front perspective view of the tablet storage rack of FIG. 10A with the doors in a closed position in accordance with an embodiment.

Another embodiment of a tablet storage rack 161 is depicted in FIGS. 10A-10B. Rack 161 has a frame 124 which includes five connection slots 112 and two doors 132, each door with a lock 134. FIG. 10A depicts the doors 132 in an open position, and FIG. 10B depicts the doors 132 in a closed position. The doors are adapted to slide from the open to the closed positions. Rack 161 also includes a front compartment 228.

Figure 11:
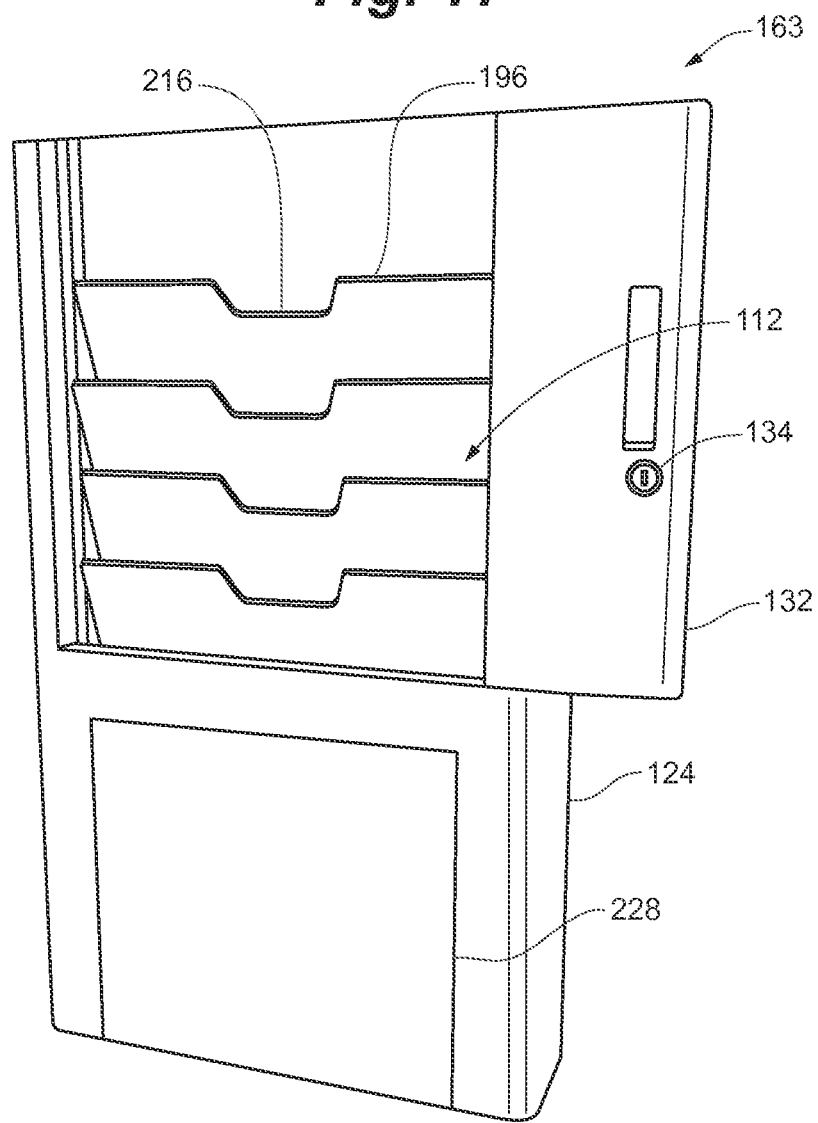
FIG. 11 is a front perspective view of a tablet storage rack with a door in an open position in accordance with an embodiment.

FIG. 11 depicts another embodiment of a tablet storage rack 163 that has a frame 124 which includes four connection slots 112 and a door 132 with a lock 134. In this embodiment the dividers in the storage rack forming adjacent slots 112 include a notched portion 216. In some cases the notched portion 216 can facilitate placing a tablet into a slot 112, and accessing and retrieving a tablet that has been stored in a slot.

FIG. 11 depicts the door 132 in an open position. In this case the door 132 is adapted to slide from an open to a closed position. The rack 163 also includes a front compartment 228.

Figure 13B:
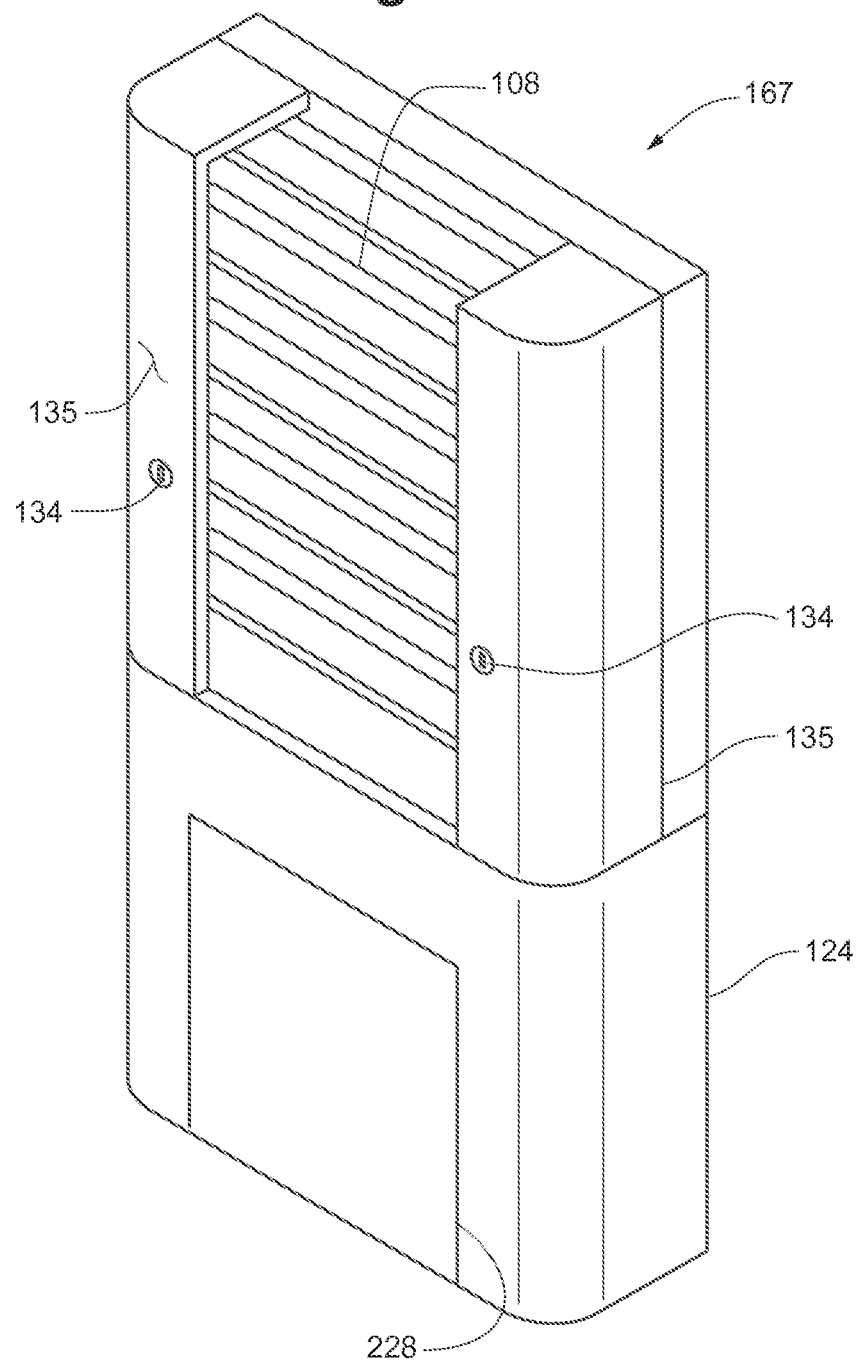
FIG. 13B is a front perspective view of the tablet storage rack of FIG. 13A with the doors in a closed position in accordance with an embodiment.

Another embodiment of a tablet storage rack 165 is depicted in FIGS. 12A-12B. Rack 165 has a frame 124 which includes six connection slots 112 and one door 135 with a lock 134. FIG. 12A depicts the door 135 in an open position, and FIG. 12B depicts the door 135 in a closed position. The door 135 is adapted to rotate about a substantially vertical axis from the open to the closed position. The rack 165 also includes a front compartment 228, and is depicted with five tablets 108 stored in the slots 112. FIGS. 13A-13B illustrate another embodiment of a similar tablet storage rack 167 that includes two doors 135. Each of the two doors 135 has a lock 134 for securing tablets within the storage rack 167. FIG. 13A depicts both of the doors 135 in an open position, and FIG. 13B depicts both doors 135 in a closed position. The doors are adapted to rotate about a substantially vertical axis from the open to the closed positions. The rack 167 also includes a front compartment 228.

Figure 14:
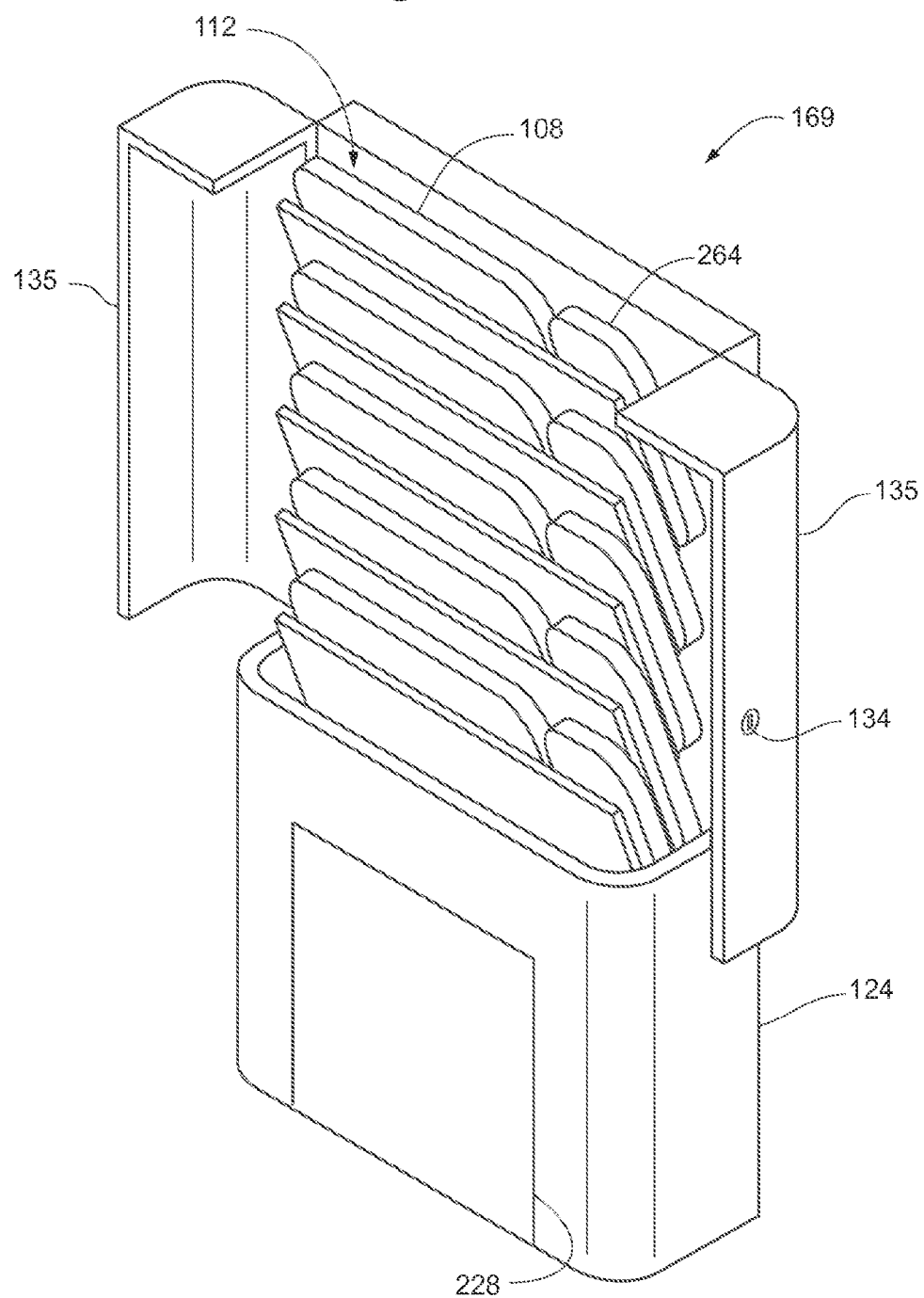
FIG. 14 is a front perspective view of a tablet storage rack with two doors in an open position in accordance with an embodiment.

FIG. 14 illustrates another embodiment of a tablet storage rack 169 having a frame 124 which includes six connection slots 112. Each of the connection slots 112 of rack 169 is adapted to hold a tablet 108 and a small electronic device 264 in a manner that will be described in greater detail below. Rack 169 is provided with two doors 135, each of the two doors 135 with a lock 134. Rack 169 is depicted with five tablets 108 and five small electronic devices 264 stored in the slots 112. Each of the doors 135 are adapted to rotate about a substantially vertical axis from open to closed positions. Rack 169 also includes a front compartment 228.

Thus, a tablet caddy can be a tablet storage rack that can be configured as a type of cabinet that in some cases can have doors to retain the tablets in place within the slots. A tablet storage rack can be mounted to a wall or other vertical surface, or can be mounted to a counter or other horizontal surface and can be configured to hold as many tablets as desired. In some embodiments, the rack can hold at least ten tablets. In other embodiments, the rack can be configured to hold between ten and forty (for example, between twenty and thirty) tablets and can include a corresponding number of connection slots.

Figure 15:
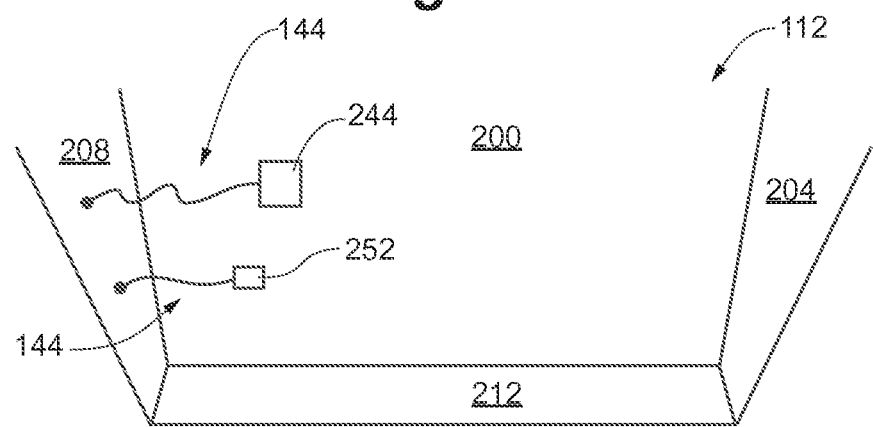
FIG. 15 is a front perspective cutaway view of a storage slot with connectors in accordance with an embodiment.
Figure 16:
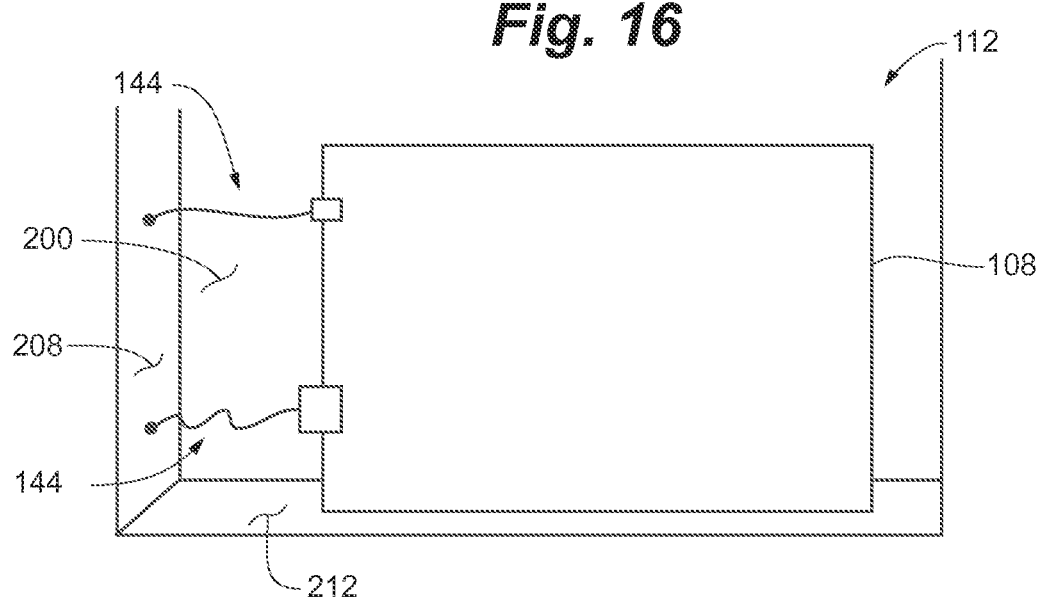
FIG. 16 is a front perspective cutaway view of a storage slot with connectors in accordance with an embodiment.
Figure 17:
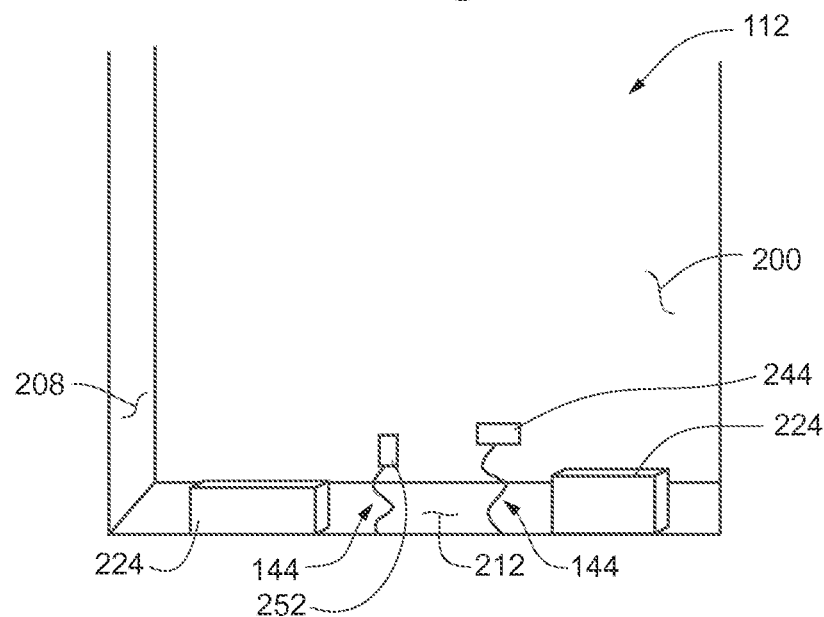
FIG. 17 is a front perspective cutaway view of a storage slot with connectors in accordance with an embodiment.
Figure 18A:
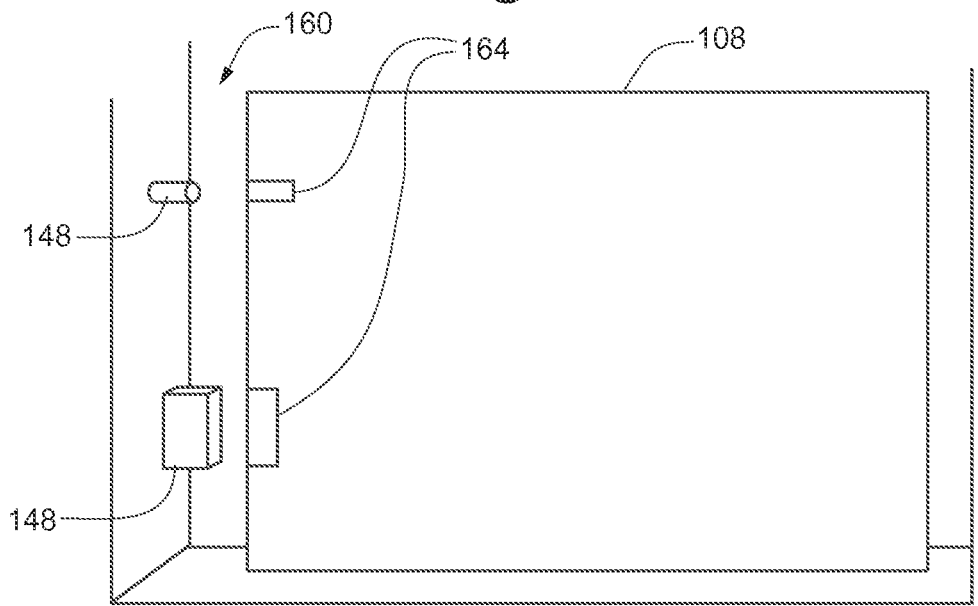
FIG. 18A is a front perspective cutaway view of a storage slot with connectors in accordance with an embodiment.
Figure 18B:
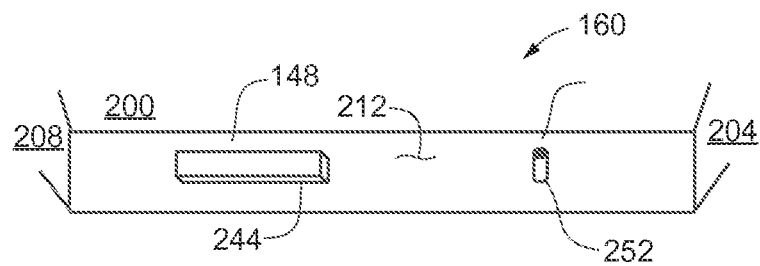
FIG. 18B is a top-front perspective cutaway view of a storage slot with connectors in accordance with an embodiment.

As mentioned above, in some embodiments, connector(s) useful for connecting one or more stored tablets to a power supply system and/or network connection system are disposed in one or more of the slots. Such connector(s) can be applicable to one or all of the embodiments described herein. FIGS. 15-18B provide perspective cutaway views of a number of storage slots with various connector configurations in accordance with some embodiments. In some cases connectors can be pigtail connection connectors 144, as shown in FIGS. 15-17, or connectors 148 that are part of a docking station 160, as shown in FIGS. 18A-18B. Each connector can connect an associated tablet with, for example, the caddy's power supply system and/or network connection system when the tablets are stored and connected. A plurality of additional connections are also possible, including, Universal Serial Bus (USB) connection, video connection, or any other connection that is desired and available from a tablet.

In the embodiments that use a docking station 160, the docking station connector 148 connects to the tablet automatically as the tablet is positioned (e.g. pushed in or let down from a vertical position) into the storage and connection position. Such a system saves significant time because of the potential number of connections required to connect a plurality of tablets. Further, such a system is user friendly because, in many embodiments, the connections are made near the bottom of the slot 112, which may be hard to access or see by the user. In some embodiments, connector(s) within a slot can be located to one side of the storage and connection slot 112, as discussed in greater detail below. Further, in some cases connectors may be integrated within a tray-shaped docking station that is positioned within a storage slot. Examples of such configurations are discussed below with respect to FIG. 42, though are also applicable to embodiments including tablet storage racks.

In some embodiments that use a pigtail connection connector 144, individual storage and connection slots may in some cases be used by more than one type (e.g., brand and/or model) of tablet, depending on the compatibility of the connector itself with respect to a particular tablet type. In some embodiments that use a docking station connector 148, the docking station 160 along with the docking station connector(s) 148 may optionally be removable so that they can be removed and replaced by another docking station 160 that has a configuration and docking station connector(s) 148 that are adapted for use with another type of tablet. Similarly, pigtail connection connectors 144 that are adapted for a proprietary connector and pin arrangement can be removed and replaced by another pigtail connection connector 144 that is adapted for use with another type of tablet, or with a connector that is compatible with a variety of tablet types. Such interchangeability is useful if a user has new tablets that are desired to be stored in the caddy, such as in cases where one brand of tablets are being phased out and are being replaced by another brand or model.

Continuing with reference to FIGS. 15-18B, storage and/or connection slots 112 generally include a front wall, a back wall 200, right and left side walls 204, 208 respectively, and a basal wall 212 (FIGS. 15-18B are illustrated with the front wall of the slot removed so that the viewer can see into the slot). Of course, the front wall 196 and the back wall 200 of two adjoining slots can be the two opposite sides of a single member of the frame 124 structure.

In some embodiments, the front wall of a slot can be in an overlapping configuration with the front wall of an adjacent slot in order to overlap at least a portion of the tablets when stored. This configuration can reduce the vertical footprint of the caddy. In some embodiments, the front wall can be angled 10-35 degrees from the back wall. In certain embodiments, it may be desirable to have at least some portion of the tablet screen visible to a user while the tablet is held in the tablet storage rack 104, as shown for example in FIG. 7. In some embodiments, as seen in FIG. 11, the front wall 196 of each slot 112 has a notched portion 216 that can help facilitate a user grasping a tablet when placing it into, or removing it from, a slot 112. Factors that can be important to consider when selecting an appropriate slot size and shape can include: the size and shape of the tablet; the additional volume and shape that a tablet cover may add to a tablet, the ability for a user to securely grasp the tablet, both when disposing a tablet into a slot as well as when retrieving the tablet; and how securely a tablet will be retained within a particularly sized and shaped slot.

The rack itself can include any suitable configuration. In some embodiments such as those in FIGS. 5-14, the storage rack is adapted to be attached to an upright surface, such as a wall. Further, embodiments can incorporate different rack configurations adapted to store tablets in various column and row configurations. For example, the embodiments of FIG. 5 shows tablets stored in a one-column by five-row arrangement. In another example, FIGS. 7 and 9A-9B, depict tablets stored in a four-column by two-row arrangement. Other configurations are also possible, for example a five-column by ten-row arrangement, or a seven-column by four-row arrangement, or a rack that has a five-column by three-row arrangement in a top portion of the rack, and an eight-column by four-row arrangement in a lower portion of the rack, or any of a number of other possible row and column configuration. In embodiments that use multiple column and row configurations, more than one slot can be provided on each row through the use of vertical dividers 220, as shown in FIGS. 7 and 9A-9B. In some embodiments, vertical dividers 220 can be omitted to provide for greater flexibility in configuring for the storage of multiple tablet sizes in one rack.

For embodiments that use a docking station 160, the slot can include any shape useful for automatically guiding the tablet into the slot and for aligning the tablet port(s) 164 to engage with the docking station connector(s) 148. Docking station connector(s) 148 can be coated with a highly conductive material, that can be applied in a relatively thick coating (for example, 50 microinches of gold (about 0.00127 mm)) to protect against wear from repeated insertions. In determining appropriate slot geometry, consideration of any asymmetrical feature 192 can be useful to ensure that the tablet port(s) 164 engage correctly with the docking station connector(s) 148.

In some embodiments, the docking station has a shape adapted to conform to the tablet, in order to hold the tablet in a desired position. In some embodiments, the docking station is adapted to support two or more tablet surfaces, and thereby control the orientation of a tablet in order to establish correct tablet port alignment with the docking station connector. For example, a docking station can be adapted to hold the tablet at an angle from about 10 to about 35 degrees from vertical. In other embodiments, the docking station can use one or more spring biased pressure tabs to ensure correct tablet alignment within the docking station.

Tablet physical properties, such as an asymmetrical feature 192, as well as one or more outside linear dimensions (e.g. tablet thickness) can be used by a docking station to correctly align tablet port(s) to the station docking connector(s). Thus, in certain embodiments, it may be desirable to adapt the docking stations such that they accept a tablet for docking with an attached tablet cover. In other embodiments, it may be desirable to adapt the docking stations such that they accept a tablet for docking with, or without an attached tablet cover. For example, such a configuration can be achieved through the use of a spring biased docking station connector, that has a beveled leading edge, and that is adapted to adjust its distance from an alignment surface according to the location of the corresponding mating port on a tablet. In other embodiments that use pigtail connection connectors 144, tablet covers should not require any special adaptation, as long as the tablet cover does not hinder access to a tablet port, and the overall dimensions of the tablet with the tablet cover attached do not exceed the interior slot dimensions.

FIGS. 15-18B show various embodiments of pigtail connection connectors 144 and docking station connectors 148 within a slot 112. In some embodiments, pigtail connection connector(s) 144 can be used, as depicted in FIGS. 15-17. As shown in FIG. 17, the pigtail connection connectors 144, can enter the slot 112 through the basal wall 212. In such configurations, it may be desirable to provide risers 224 so that the tablet weight does not rest on the wires coming out of the back of the connector, as doing so may eventually lead to a broken wire within the pigtail. Of course, the use of risers 224 may not be appropriate in all configurations as doing so would tend to raise the tablet from the basal wall 212, and thus decrease the effective or usable depth of a slot which may impact how securely a tablet is retained in a slot.

In some embodiments a slot 112 and pigtail can be provided as depicted in FIG. 16. As can be seen, the tablet 108 is disposed within the slot 112 on its right side, while the pigtail can enter the slot 112 from the left side wall 208. In other embodiments, a docking station connector 148 may be located on one of the side walls 204, 208. In such an embodiment, as depicted in FIG. 18A, storing and connecting a tablet 108 in a caddy 100 would require disposing a tablet 108 within a slot 112 and sliding the tablet 108 to the left in order to engage the tablet port(s) 164 with the docking connector(s) 148. Again, as with other embodiments that make use of a docking station 160, the slot can include any shape useful for automatically guiding a tablet 108 into proper alignment so that the tablet port(s) 164 engage with the docking station connector(s) 148. In the case of this embodiment the slot shape must be adapted so that the tablet port(s) 164 engages with the docking station connector(s) 148, the when the tablet 108 is moved to the left, rather than in other embodiments that make use of a docking station 160 where the tablet port(s) 164 engage with the docking station connector(s) 148 when the tablet is placed into the slot. Of course another embodiment where the tablet port(s) 164 engages with the docking station connector(s) 148 when the tablet 108 is moved to the right, should be equally apparent.

Figure 19A:
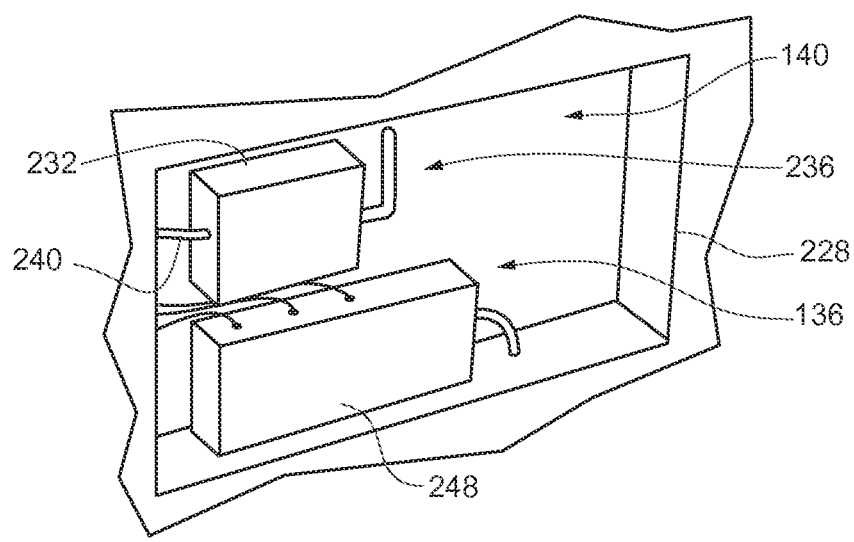
FIG. 19A is a front perspective view of a front compartment in accordance with an embodiment.
Figure 19B:
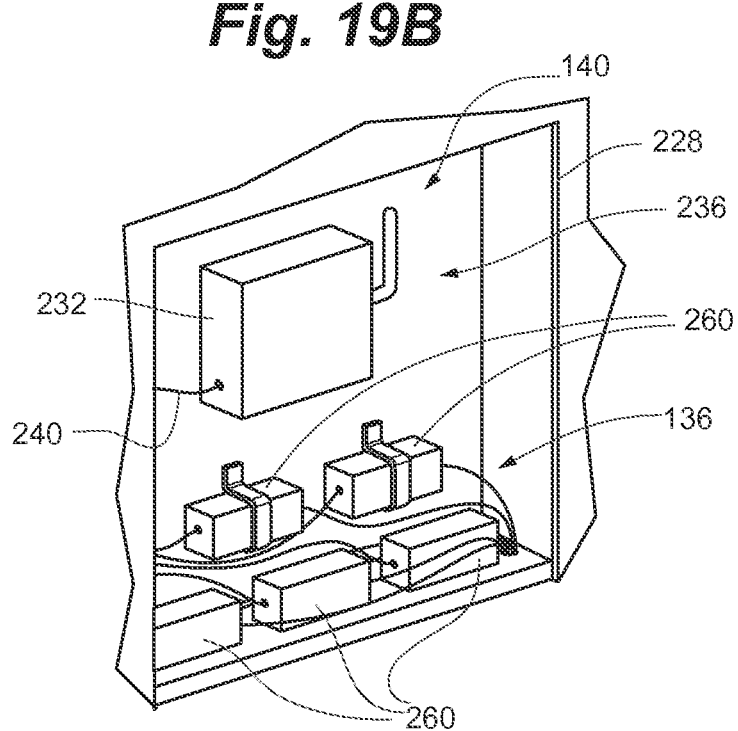
FIG. 19B is a front perspective view of a front compartment in accordance with an embodiment.

FIGS. 19A-19B depict some embodiments of an internal configuration within the front compartment 228 of the tablet storage rack 104. As can be seen in the figures, a Wi-Fi transmitter 232 is located within the front compartment 228 as part of the wireless network connection 236. A cable 240, which is connected to the local area network is also connected to the Wi-Fi transmitter 232.

Alternately, a wired router can be used to supply access to a network via cables and network connectors. In this embodiment, which is not depicted, a wired network router can be located within the front compartment 228 in lieu of the Wi-Fi transmitter 232. In such a configuration, one cable per tablet would come from the router and be connected to each tablet 108, either through pigtail connector 144, or a docking station connector 148.

As can also be seen from FIG. 19A (and also referring generally to FIGS. 15-18B), a combined power supply 248 can also be provided according to certain embodiments of the tablet storage rack. In such embodiments, for tablets that are connected to the power supply system 136, the power supply system provides power to the tablets via the combined power supply 248. Tablets can be connected to the power supply system through a power connection 252 (either via a pigtail connector 144 or by a docking station connector 148) or through a proprietary port (either via a pigtail connector 144 or by a docking station connector 148).

In some embodiments, an individual power supply 260 can be provided to each tablet that is connected to the power supply system. In such embodiments, as depicted in FIG. 19B (and also referring generally to FIGS. 15-18B), the power supply system provides power to the tablets via the individual power supplies 260, for tablets that are connected to the power supply system 136. Tablets can be connected to the power supply system through a power connection 252 (either via a pigtail connector 144 or by a docking station connector 148) or through a proprietary port (either via a pigtail connector 144 or by a docking station connector 148).

As seen in FIGS. 8A-14 and mentioned previously, in certain embodiments a tablet caddy can have a tablet storage rack provided with one or more doors that may optionally be lockable. In some embodiments, the door(s) can pivot about a generally vertical or generally horizontal axis, from an open position to a closed position, as shown in FIGS. 12A and 12B respectively. In other embodiments, a door can slide, or move translationally with respect to the frame 124 as shown for example in FIGS. 10A and 10B. For racks that have a multiple column and row configuration, as depicted in FIGS. 9A and 9B, doors can rotate about a horizontal axis from an open position to a closed position, and can be configured to rotate up in order to open, or to rotate down in order to open, as shown in FIG. 9A. In some embodiments, the door 132 can partially cover stored tablets such that sufficient air circulation is permitted around each of the tablets so as to not overheat a stored tablet, while at the same time, adequately covering a tablet so that it cannot be removed while the door is closed. In such embodiments, the door does not fully cover the slots or the tablets within the slots when closed, such that an uncovered gap exists along the length of the slot. In some embodiments, the door 132 can include vents to further facilitate air circulation.

In some embodiments, as show for example in FIGS. 10A and 10B, optional locks 134 may also be provided to secure the tablets within the tablet storage rack 104. In some embodiments, a key (not shown) is retained in the keyway entry when the keyway is in the unlocked position. In such an embodiment, the key can be used as a handle to open the door from a closed position to an opened position, which can eliminate the need for a separate handle.

In some embodiments of the tablet storage rack 104, a small electronic device 264, such as a cell phone, smart phone, music player (e.g. mp3 player), a handheld device, a palm sized device or any other relatively small electronic device (e.g. a device that can be held and operated with one hand) can also be stored, alone or alongside a tablet. These small electronic devices 264 can either be simply stored in the rack, or they can also be charged and/or networked, by adding the appropriate connectors, according to the general teachings of this disclosure. As shown in FIG. 14 the small electronic devices 264 can be placed next to a tablet 108 in a slot 112. In some embodiments, small electronic devices can be placed in the same slot as a tablet, while in other embodiments, small electronic devices can be placed in separate slots, which can be adjacent to the tablet slots. In some embodiments, a door can partially cover stored small electronic devices such that sufficient air circulation is permitted around each stored device (so as to not promote device overheating) while at the same time, adequately covering a small electronic device so that it cannot be removed while the door is closed. In other embodiments, a small electronic device can be fully covered by a closed door.

FIGS. 20A-21G illustrate one possible manner of attaching a tablet storage rack to a support surface. A back elevation view of a tablet storage rack 171 is depicted in FIG. 20A according to some embodiments. The tablet storage rack 171 includes a frame 124 which has a back surface 174 that can be used to attach the storage rack 171 to a vertical surface, such as a wall, for example. In the depicted embodiment, the back surface 174 of rack 171 includes a slot 178 and a hole 182 that can both be used to facilitate attaching the storage rack 171 to a vertical surface, as will be described below. FIG. 20B depicts a partial cross section of storage rack 171, according to the cross sectional cut depicted in FIG. 20A. As can be seen from FIG. 20B, in some cases back surface 174 can be a planar surface that can ease attachment of storage rack 171 to an upright planar surface. Slot 178 is configured to receive a mounting bracket that can be attached to a vertical surface. In this case, slot 178 includes a countersunk portion 186 corresponding to the bracket design illustrated in FIGS. 21A-21B.

The bracket 190 illustrated in FIGS. 21A-21B is one example of a mounting bracket 190 for mounting a tablet storage rack to a vertical surface according to some embodiments. The bracket 190 is shown in FIG. 21A in a front perspective view, and is shown in FIG. 21B in an end view. Bracket 190 can be fabricated from any suitable material, for example: a composite such as fiberglass or carbon fiber composites, extruded or molded plastics, or metals. Bracket 190 can be of any shape or dimension suitable for supporting a tablet storage rack. In this example, the bracket 190 includes an angled flange that corresponds to the countersunk portion 186 of the slot 178 of the tablet storage rack 171 shown in FIGS. 20A-20B. Further, the bracket 190 can include any appropriate number of holes for mounting the bracket 190 to a vertical support surface, such as a wall.

Figure 21D:
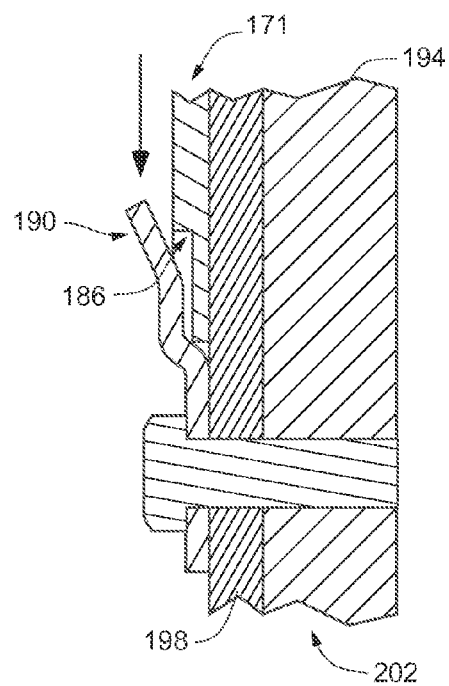
FIG. 21D is a partial cross-sectional view of a tablet storage rack mounted to the bracket and wall depicted in FIG. 21C in accordance with an embodiment.
Figure 21E:
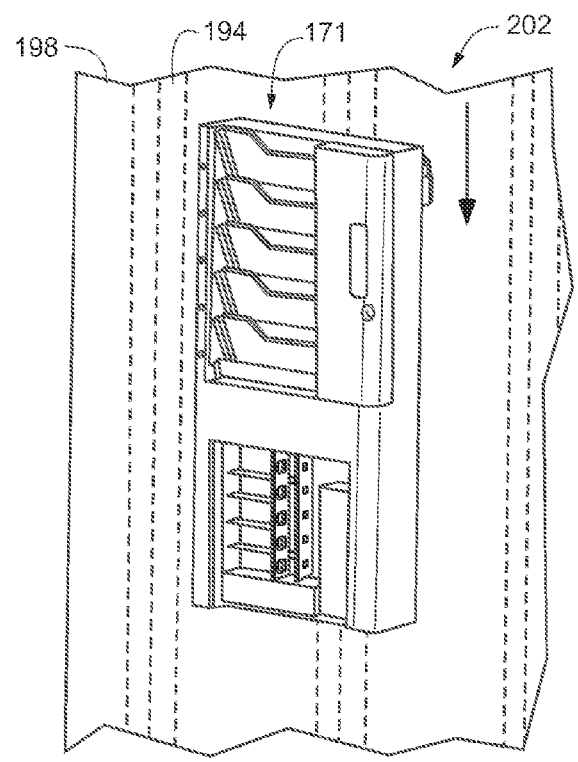
FIGS. 21E-21G are perspective views of a tablet storage rack mounted to the bracket and wall depicted in FIG. 21C in accordance with an embodiment.
Figure 21F:
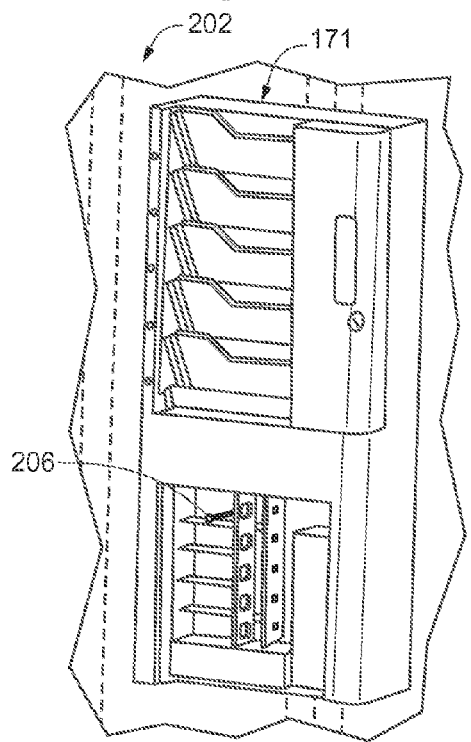
Figure 21G:
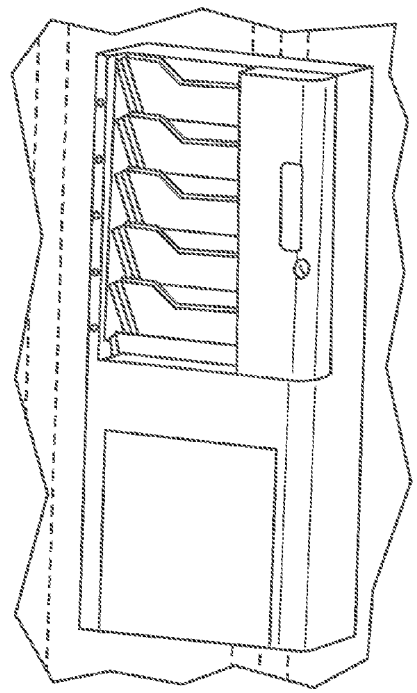

FIG. 21C-21G illustrate typical steps, according to some embodiments, that can be followed in order to mount storage rack 171 to wall 202. The wall 202 can include upright posts 194 as part of the wall framework, and upright posts 194 can support one or more drywall (plasterboard) sheets 198. The bracket 190 can be mounted to the wall 202 with any suitable fastener, such as a nail or a screw, and depending on the construction of the wall 202, one or more anchors or anchoring devices can be used to secure a fastener to the wall 202. FIG. 21D depicts a partial cross section of storage rack 171 as depicted in FIG. 20B, mounted on bracket 190 and wall 202 according to the cross sectional cut depicted in FIG. 21C. As can be seen from FIG. 21D, the slot 178 can be placed over bracket 190 and the storage rack 171 can then be moved down in the direction of the arrow such that the upper portion of the slot, which can include the countersunk portion 186, rests on the bracket 190. This is also illustrated in FIG. 21E which shows the slot placed over, and down onto, the bracket (both the slot and the bracket are hidden in this view). A fastener 206 can then be inserted through hole 182 in order to aid in securing the storage rack 171 to the wall 202, as shown in FIG. 21F. FIG. 21G shows the cover replaced on the front compartment of the storage rack after mounting of the storage rack has been completed.

Of course, a tablet storage rack can be supported or suspended off the ground or floor by a support beam or other elevated surface in a wide variety of configurations that will be apparent to those skilled in the art. In some cases, one or more types of fasteners may be used to attach a surface of the tablet storage rack to a support surface, such as the bracket and slot configuration discussed and illustrated with respect to FIGS. 20A-21G. As can be appreciated, the frame of a tablet storage rack may include one or more surfaces that can also be adapted to be in apposition to or attached to another surface that is not planar. For example, a back surface can be adapted to be in apposition to a wall that includes a protrusion, a wall corner, a column, a ledge, a shelf, or numerous other configurations which can have, for example, a circular, oval, square, rectangular or an irregular cross-sectional shape.

Turning now to FIGS. 22-51D, some embodiments of a tablet caddy can provide a generally mobile tablet caddy configuration. Thus a tablet storage device, which can also be referred to as a tablet caddy, can also include a tablet cart. Features associated with a tablet cart will now be described.

According to some embodiments, a tablet storage device in the form of a mobile tablet caddy generally includes a tablet cart adapted to hold a plurality of tablets within an interior space of the tablet cart, such as within a corresponding plurality of slots in the interior space of the cart. A tablet cart can be useful for transporting and/or storing (e.g., in a temporary location) a plurality of tablets and in some cases may also be referred to herein as a storage and/or transportation cart. When stored, each tablet can be individually accessed for storage or retrieval, e.g., without disturbing other tablets that may also be stored. In some embodiments connector(s) useful for connecting a stored tablet to a power supply system and/or to a network connection system are disposed in one or more of the slots. In some cases the connector(s) may be pigtail connection connectors or docking station connectors, both of which can share configuration similarities with the connector(s) that can be included in a tablet storage rack.

A cart can be configured to hold as many tablets as desired. In some embodiments, a tablet cart holds at least ten tablets. In other embodiments, a tablet cart is configured to hold between ten and forty (for example, between twenty and thirty) tablets. In some embodiments, a cart is configured to hold between thirty and one hundred and eighty (for example, between sixty and ninety) tablets, and includes a corresponding number of connection slots. The slot(s) provided by the tablet cart can include any shape that is useful for holding a tablet and in many cases may have configurations and features generally similar to those described above with reference to the generally stationary tablet storage racks.

According to some embodiments, slots in a tablet cart can be grouped within one or more tablet storage modules that each define an interior space for storing one or more tablets. According to some embodiments, a tablet cart may have at least two or at least three or even more tablet storage modules for storing portions of a plurality of tablets. As will be discussed herein, several examples are given in which a tablet cart has three tablet storage modules. However, this is just one example and embodiments with less or even more storage modules are possible.

The tablet storage modules are each adapted to hold one or more tablets in a corresponding number of slots, as will be further described. Tablet storage modules can be arranged in a variety of ways on a cart and depending on the cart and module configurations, a variety of connection embodiments may be available for electronic connection of a network connection system and a power supply system to provide power and/or a network connection from the respective source(s) to each connected tablet though the cart and modules.

According to some embodiments a tablet cart may have one or more non-tablet modules that may be included within a stack of modules on a particular tablet cart. In some cases non-tablet modules can be used for storing or housing equipment and items other than tablets. For example, in some cases a module may be dedicated for power supply and distribution equipment and may be useful for providing power to the tablet storage modules. Another example of a non-tablet module includes a module with networking equipment that provides the tablet storage modules with network connectivity. In some cases one or more modules may be included for storing auxiliary and peripheral equipment that may or may not be used in conjunction with the tablets. In some cases, simple open storage modules may also be provided without any internal customization or specific hardware, thus providing simple storage units along with the tablet storage modules.

According to some embodiments, a tablet cart can have a frame that can include a wheeled base (which can also be referred to as a horizontal portion) and a vertical portion, which can have a handle, as depicted for example in FIG. 22. According to some embodiments, a tablet cart can include a wheeled base without a vertical portion, as depicted for example in FIG. 28.

Referring generally to FIGS. 22-27, features that can be common to some embodiments of tablet carts that include a wheeled base and a vertical portion will now be described. Such a tablet cart can include a cart frame which has a generally vertical portion and a generally horizontal portion. The cart frame can optionally have an ergonomic handle, and locking swivel casters. Such tablet carts can also include removable modules for storing tablets. In some cases the ergonomic handle can be height adjustable so that users of different physical statures can comfortably maneuver the cart.

One embodiment of a tablet cart 271 is depicted in FIG. 22. The cart 271 includes a frame 276A, which has a vertical portion 278 and a horizontal portion 282. The vertical portion 278 includes a handle 284. As can be seen from FIG. 22, three modules 120A are positioned on the horizontal portion 282 of the cart. The generally horizontal portion 282 is also provided with an open storage compartment 304 and casters 308.

Figure 23:
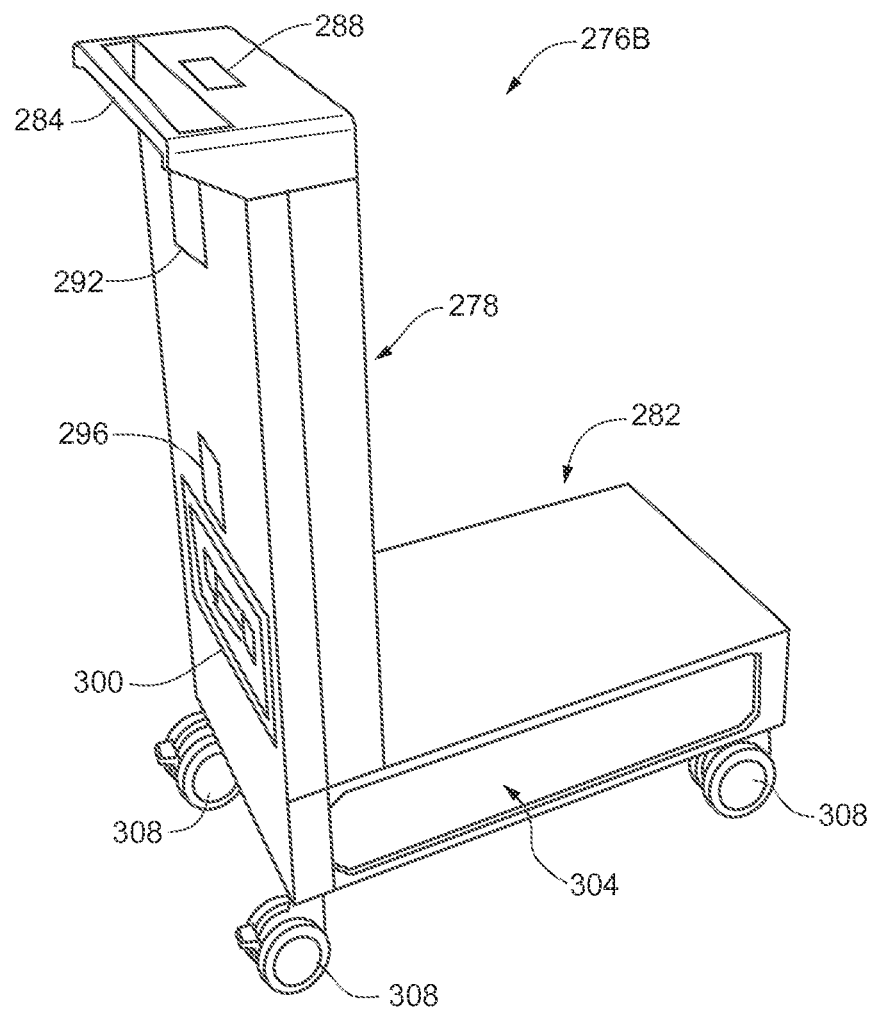
FIG. 23 is a back perspective view of a tablet cart frame in accordance with an embodiment.

FIG. 23 is a perspective view of a cart frame 276B according to some embodiments. The cart frame 276B has a vertical portion 278 and a horizontal portion 282. According to some embodiments, the vertical portion 278 includes an ergonomic handle 284, a display 288, one or more auxiliary outlets 292, a cooling fan 296 and a provision for cord stowage 300. As depicted, the horizontal portion 282 includes an open storage compartment 304 and is provided with swivel casters 308. Tablet storage modules (not shown) can be stacked and supported upon the horizontal portion 282, similarly to the embodiment of FIG. 22.

In some cases the display 288 can include (a) indications for power consumption and/or distribution, which can be displayed as an aggregate for the cart, or displayed module by module; (b) the temperature within each tablet storage module (not shown), as well as a temperature indication for within the cart frame; and/or (c) indications for network connectivity. In some cases the one or more auxiliary outlets 292 can provide pass through power, such that if the cart is plugged into a wall outlet, power can also be provided to the auxiliary outlets 292 in order to reduce or eliminate the need for additional extension cords that may be required to power devices, such as a laptop computer, and/or a projector that are in use on, or near, the cart.

In some embodiments the frame 276B may house one or more electronic components or systems, such as a network connection system or a power supply system, within an internal compartment of the cart frame (not shown). In order to keep such internal electronic components cooled, a fan 296 that either draws air into, or out from, the internal compartment can be installed on the cart frame in communication with the internal compartment. One or more cooperating vents can also be provided to enhance air flow into, out from, and throughout the internal compartment. The power supply system can include a power cable which can terminate on one end in a standard wall plug for plugging into a standard wall outlet. A retractable cord assembly can also be provided within the cord stowage compartment, such that the power cable can be retracted into the cart frame when not in use.

Figure 24:
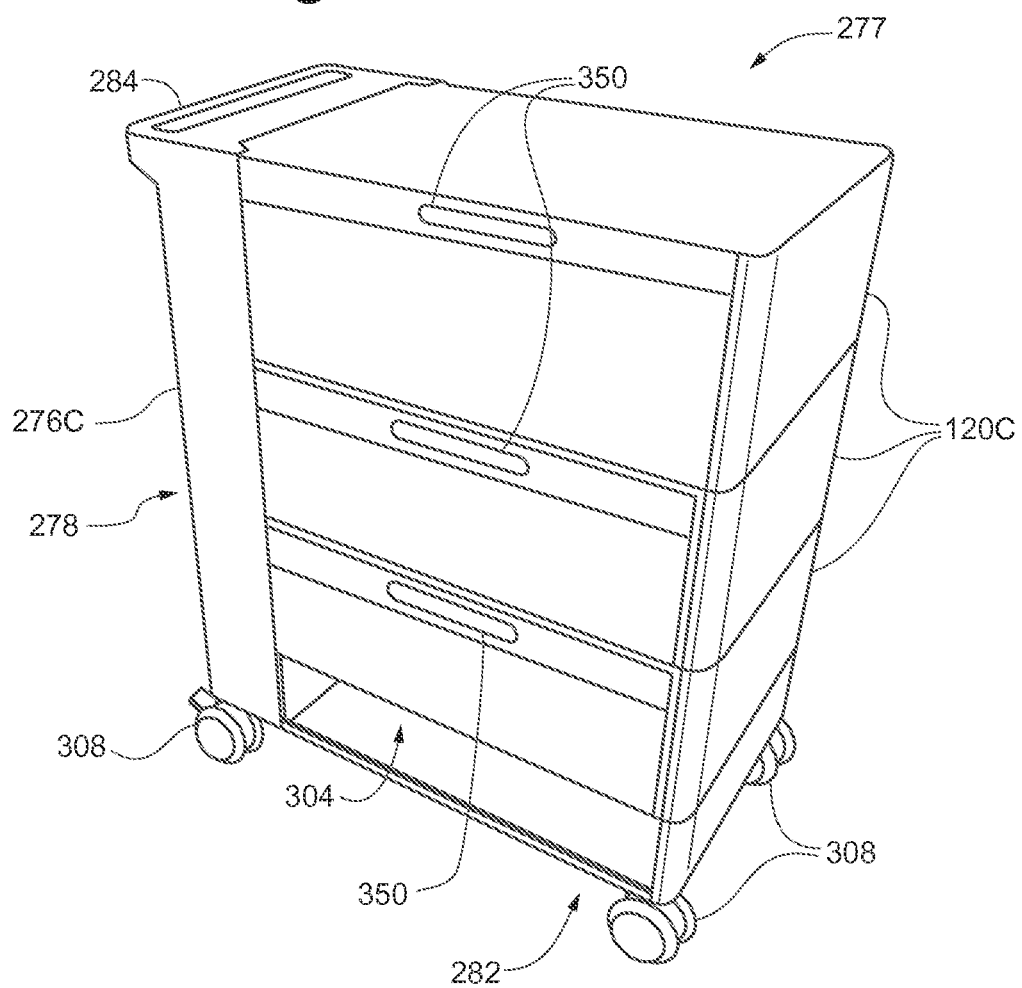
FIG. 24 is a front perspective view of a tablet cart in accordance with an embodiment.

Another embodiment of a tablet cart 277 is depicted in FIG. 24. Transportation cart 277 includes a frame 276C, which has a horizontal portion for supporting tablet storage modules 120C, and a vertical portion that includes a handle 284. The horizontal portion also provides an open storage compartment 304 and is attached to casters 308 for mobility. The three modules 120C positioned within the frame 276C on the horizontal portion each include a handle 350. In this case, the modules 120C are positioned to face the side of the cart 277 with the handles 350 accessible from the sides.

An embodiment of another transportation cart 275 is depicted in FIGS. 25A-25B. The cart 275 includes a frame 276D, which has a vertical portion 278 and a horizontal portion 282. The vertical portion 278 includes a handle 284.

As can be seen from FIG. 25A, three modules 120D are positioned on the horizontal portion 282. As depicted, the horizontal portion 282 includes an open storage compartment 304 and is provided with casters 308. Turning to FIG. 25B, in some cases the horizontal portion 282 is also provided with a translatable tray 352. As may now be apparent from FIG. 25B, the three modules 120D are positioned on the translatable tray 352 of the horizontal portion 282. According to some embodiments, the translatable tray 352 translates from a first position to a second position along with the modules 120D. In the first position, a vertical surface of the three modules 120D (e.g., the left end surface as oriented in FIGS. 25A-25B) is disposed immediately adjacent to the vertical portion 278 of the cart frame 276D. In the second position, the vertical surface of the modules 120D is spaced away from the vertical portion 278 of the cart frame 276D.

Figure 26A:
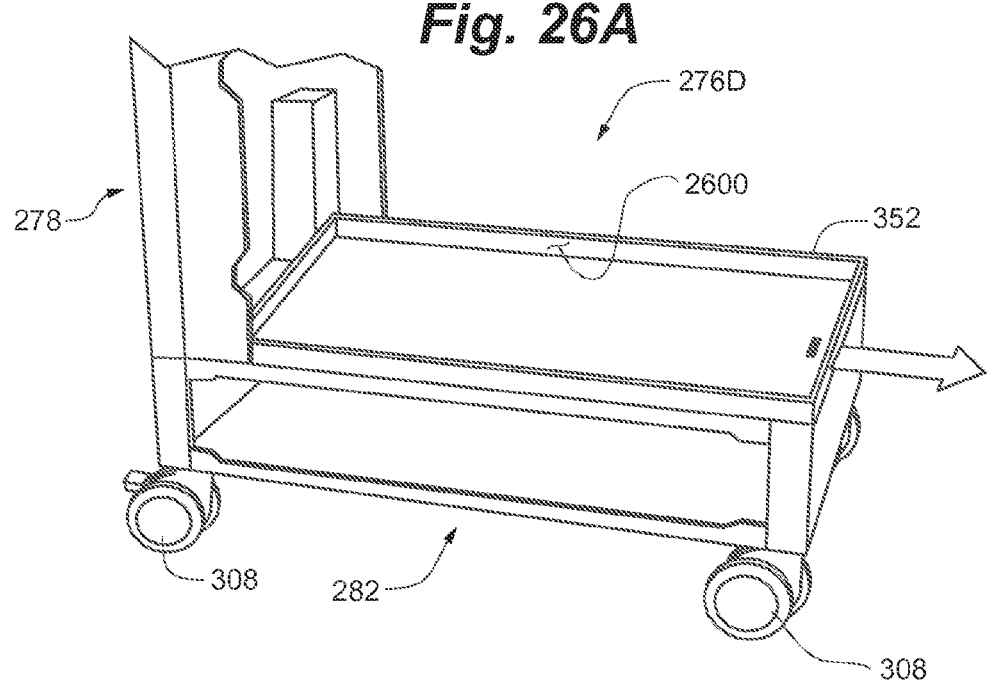
FIG. 26A is a front perspective view of the frame of the tablet cart of FIG. 25A with a tray in a first position in accordance with an embodiment.
Figure 26B:
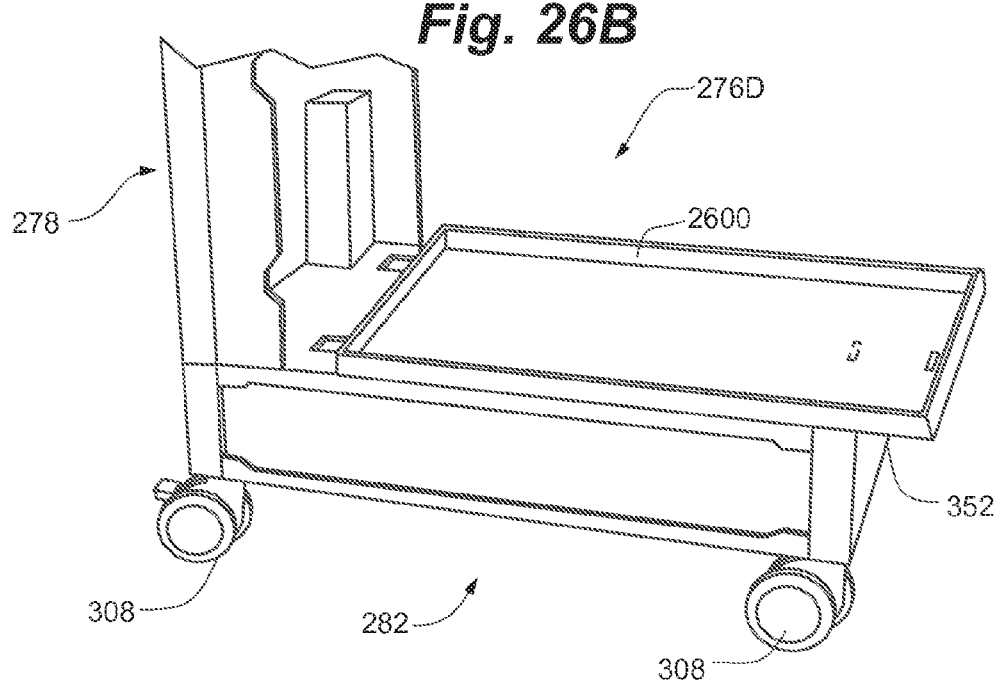
FIG. 26B is a front perspective view of the frame of the tablet cart of FIG. 25A with a tray in a second position in accordance with an embodiment.
Figure 26C:
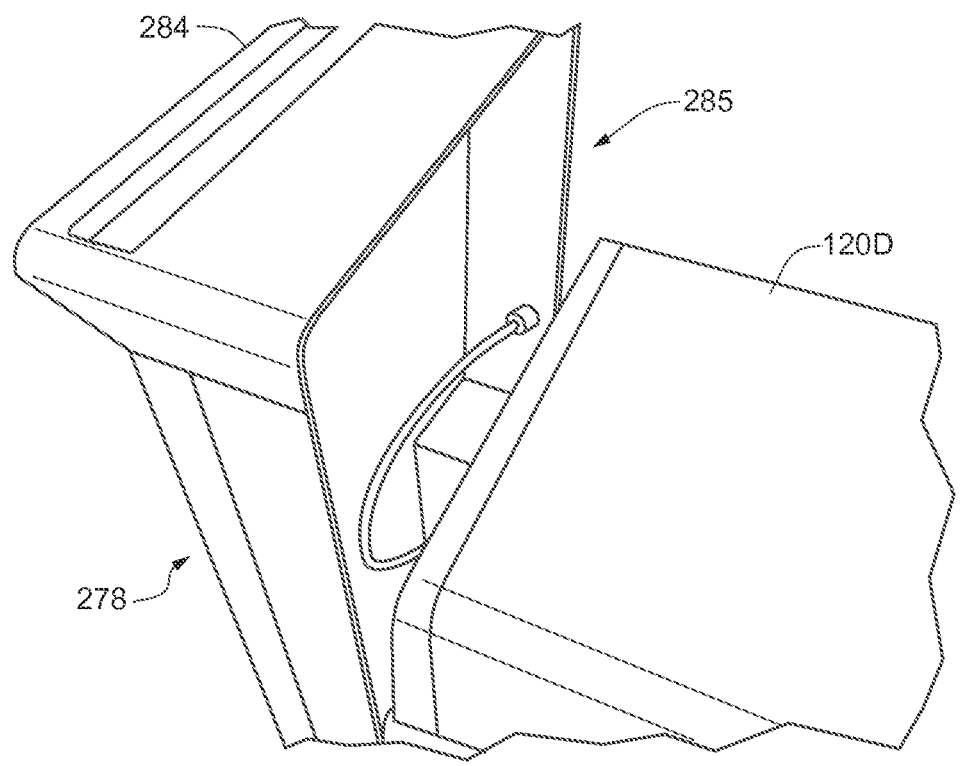
FIG. 26C is a front perspective view of a portion of the tablet cart of FIG. 25A in accordance with an embodiment.

In some embodiments, such as depicted in FIGS. 25A-26C, removable modules 120D have a generally rectangular footprint, with two ends being relatively shorter than the two sides. In some cases like these, the modules 120D have handles (not shown) located on both of the two short ends of the modules 120D. As the modules 120D and the translatable tray 352 translate from the first position (FIG. 25A) to the second position (FIG. 25B), the modules 120D move to an extended position that is away from the vertical portion 278 of the cart frame 276D as shown for example in FIGS. 25B and 26C. As the modules 120D and the translatable tray 352 translate back to the first position, they move to a refracted position that is closer to the vertical portion 278 of the cart frame 276, as shown for example in FIG. 25A. In the retracted position, one of the ends of each of the stacked modules 120D abuts the vertical portion 278. In some cases, the ends of the modules 120D may also be received within an opening 285 of the vertical portion 278 as shown in FIGS. 25A, 25B, and 26C. This renders the handles located on that end of each module 120D inaccessible to a user. However, once in the extended position, a user can more readily access the handles on both ends of the modules 120D in order to lift a module from the cart, or to replace a module to the cart. Returning to FIG. 24, in some cases such module handles may have other configurations. For example, as shown in FIG. 24, tablet cart 277 includes modules 120C having handles 350 that are located on the long sides of the modules 120C. In this embodiment, the modules 120C can be stacked on the cart frame horizontal portion without the need for a movable tray.

Another embodiment of a transportation cart is depicted in FIG. 27. Cart 279 includes a frame 276E, which has a horizontal portion 283 and a vertical portion 281 that includes a handle 284. In this embodiment the horizontal portion 283 has a cabinet configuration that includes three tablet storage modules configured as extendable drawers 268 within the horizontal portion 283. The horizontal portion 283 and drawers 268 are supported by four casters 308 generally positioned near the corners of the cart 279. Each of the drawers can be pulled out, and tablets can be removed from, or deposed into, vertically aligned slots within the drawers. The casters 308 along the drawer-handle side of the cart 279 (i.e. near positions C and D) are attached to the underside of the lower drawer 268, so that when the drawer is opened, the casters move to positions A and B. The repositioning of the casters helps prevent the cart 279 from tipping over when the drawers 268 are opened. In some cases, a tab 366 along the upper edge 362 of the lowest drawer can be included to prevent the middle drawer from opening unless the lowest drawer is already open. In this manner, the weight of the middle drawer in the open position is supported by the bottom drawer, and ultimately by the casters 308 in the extended position (A and B). Likewise a tab 366 along the upper edge 362 of the middle drawer can prevent the top drawer from opening, unless the middle drawer is already open, and in a similar manner, the weight of the top drawer in the open position can be supported by the casters 308 in the extended position.

Although not shown in FIG. 27, in some embodiments transportation cart 279 can include four casters generally positioned near the corners of the cart and two legs. In these embodiments the two casters along the drawer-handle side of the cart (i.e. near positions C and D) are attached to the underside of the lower drawer, as described above. The two legs can be attached to the cart's frame (e.g., fixedly or movably attached to the frame to allow engagement and disengagement of the legs), also near positions C and D. In this configuration, when the lower drawer is opened, the casters near positions C and D move to positions A and B because they are attached to the drawer, while the two legs remain near positions C and D because they are attached to the frame. Positioning the casters and the legs in this manner helps prevent the cart from tipping over when the drawer is opened, due to the casters that move with the drawer to positions A and B, while the legs that remain at positions C and D help prevent the frame from sagging.

In some embodiments, transportation cart 279 may include six casters (not shown) generally positioned near the corners of the cart 279 instead of only the four casters 308 shown in FIG. 27. In these embodiments, four casters are attached along the drawer-handle side of the cart: two near position C, and two near position D. Of these four casters, two are attached to the underside of the lower drawer (one near position C, the other near position D), and two are attached to the cart frame (one near position C, the other near position D). In this configuration, when the lower drawer is opened, two casters remain in positions C and D, as they are attached to the frame, and two casters move to positions A and B, as they are attached to the drawer. Positioning the casters in this manner helps prevent the cart from tipping over when the drawers are opened, while the casters that remain at positions C and D help prevent the frame from sagging.

According to some embodiments, transportation cart 279 can include four casters that are attached to the frame (not shown). As the four casters in these embodiments are all attached to the frame, none of the casters move to positions A and/or B when the lowest drawer is opened.

As mentioned above, in some embodiments, a tablet cart can have a cart frame with a generally horizontal portion that includes a wheeled base, but without a generally vertical portion as described with respect to some other embodiments. In some cases the horizontal portion is adapted to hold one or more tablet storage modules in a stacking arrangement. A user can transport the system by applying a generally horizontal force to one of the stacked modules, which will transfer the force to any module(s) stacked below and to the wheeled base, thus facilitating movement of the cart. Several features, discussed in detail below, inhibit the relative horizontal movement of one module with respect to another, or with respect to the base.

Features that can be common to cart frames that include a wheeled base, but not a vertical portion, can include an internal compartment within the wheeled base. The internal compartment can house electronic components, such as a network connection system or a power supply system. In order to keep such internal electronic components cooled, a fan that either draws air into, or out from, the internal compartment can be installed on the wheeled base. One or more corresponding vents can also be provided to enhance air flow into, out from, and within the internal compartment.

Figure 29:
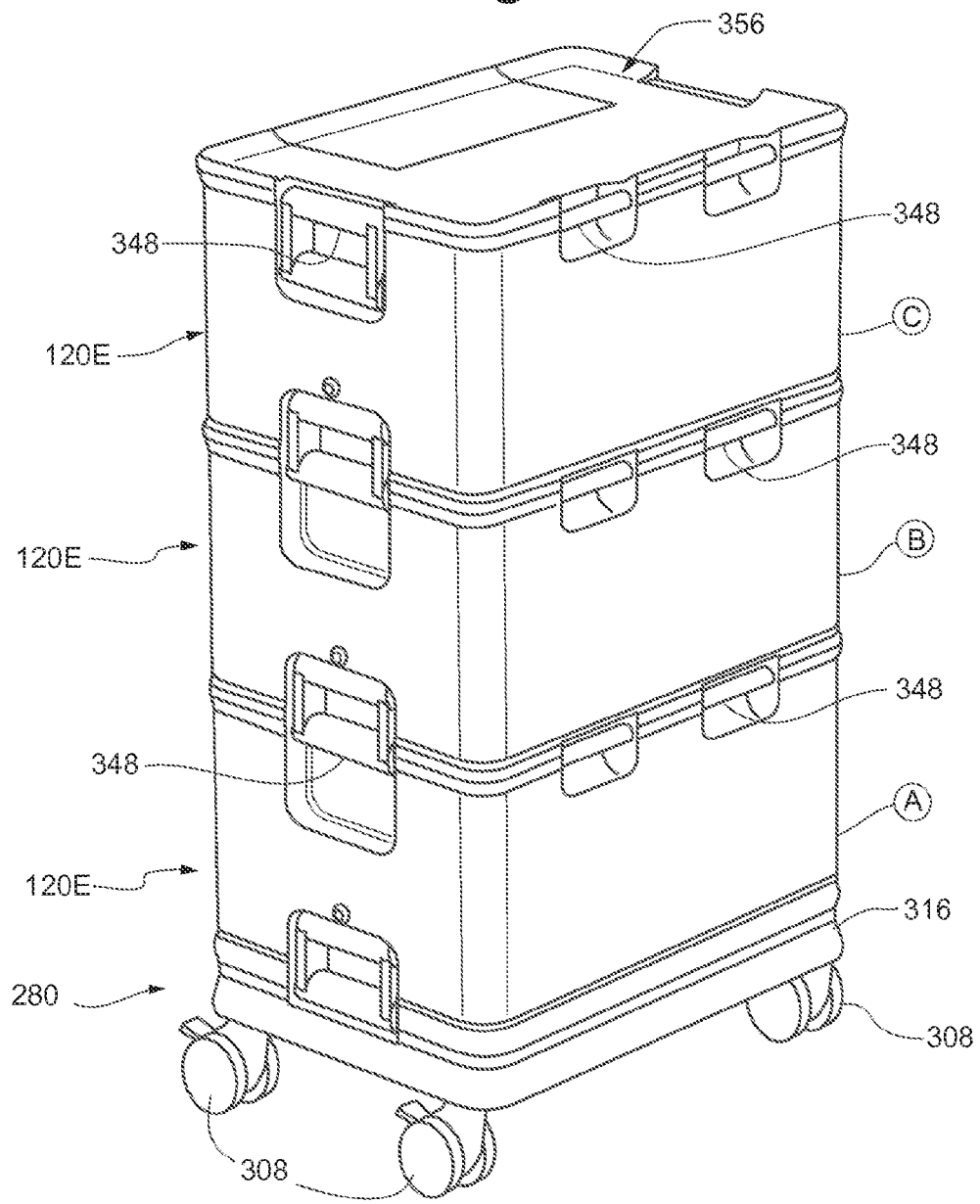
FIG. 29 is a rear perspective view of the tablet cart of FIG. 28 in accordance with an embodiment.

FIGS. 28-29 are perspective views of one example of a tablet cart 273 with a frame having a generally horizontal portion that includes a wheeled base 280 but no generally vertical portion. As shown, the wheeled base 280 includes a body 316 that provides a support surface for supporting one or more tablet storage modules 120E (in this case three modules) stacked one upon another. The body 316 of the wheeled base 280 is also attached to four casters 308 that make the cart 273 rollable. As mentioned above, despite the lack of a vertical portion of the cart frame, a user can apply a generally horizontal force to one of the modules 120E and thus through the other modules 120E in the stack in order to impart a horizontal force component upon the wheeled base 280 for moving the cart 273.

Figure 30:
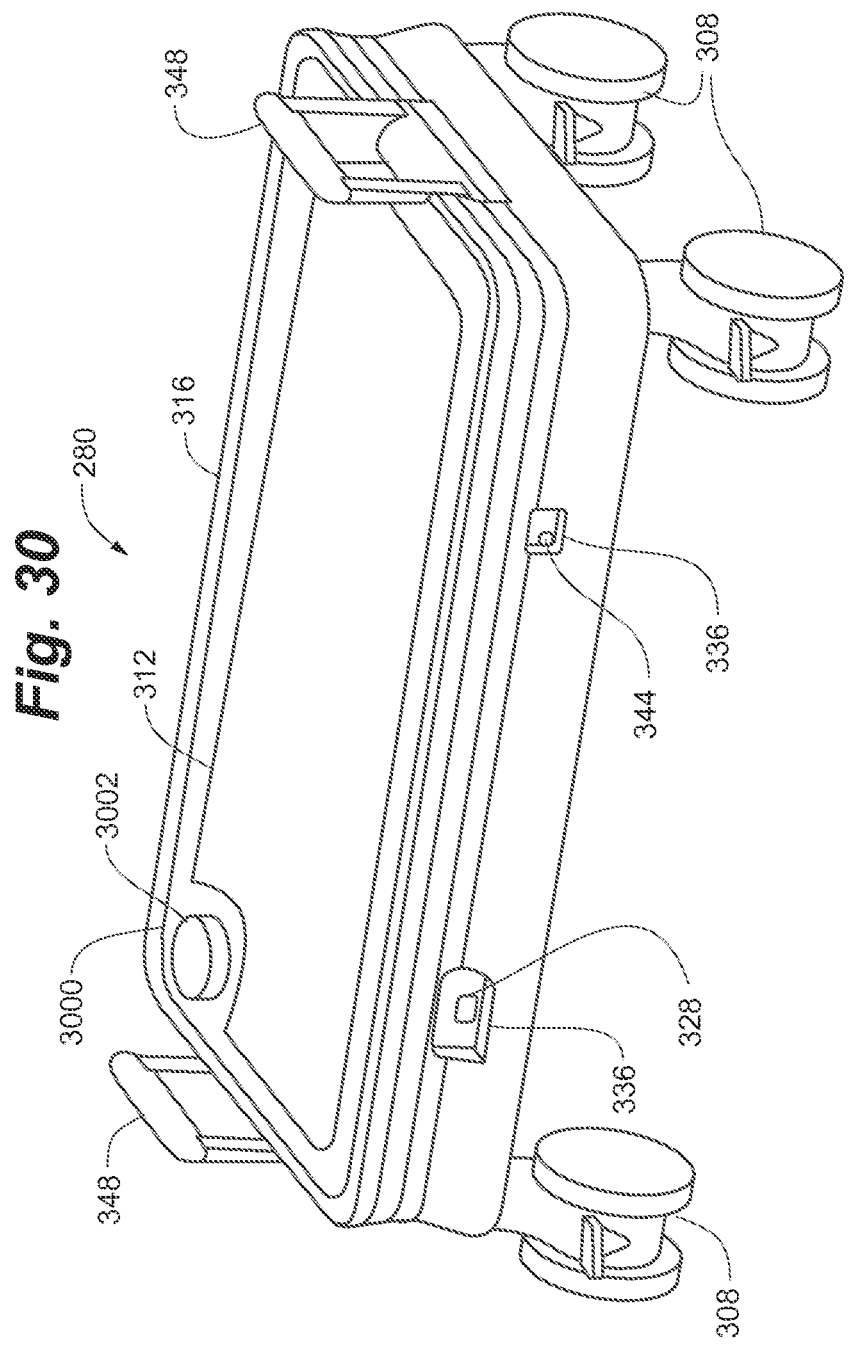
FIG. 30 is a front perspective view of a tablet cart wheeled base in accordance with an embodiment.
Figure 31:
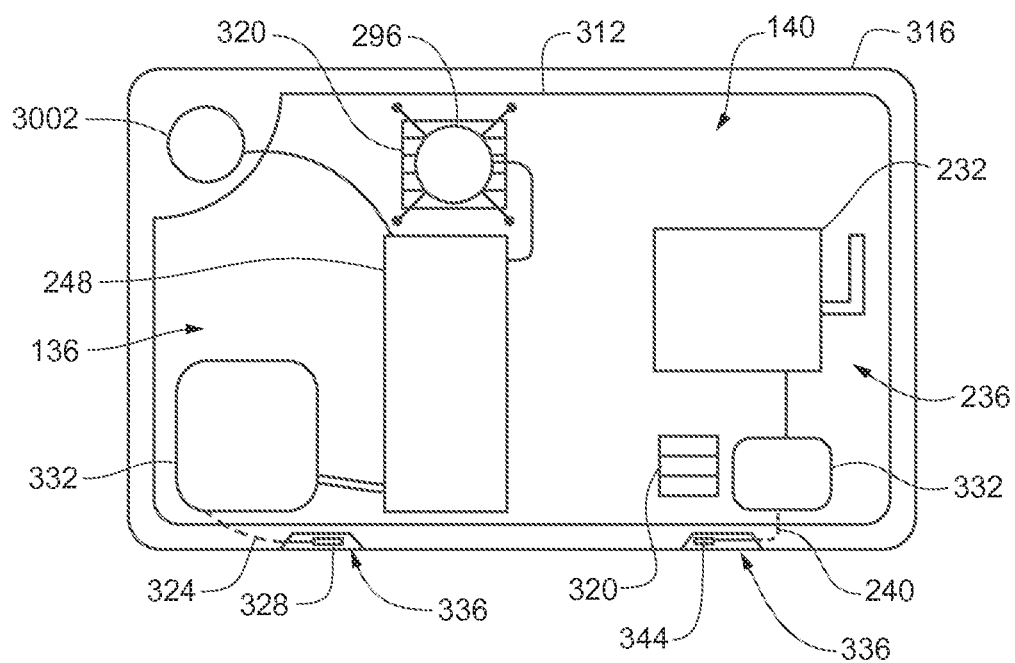
FIG. 31 is a top plan view of an internal compartment of a tablet cart wheeled base in accordance with an embodiment.
Figure 32A:
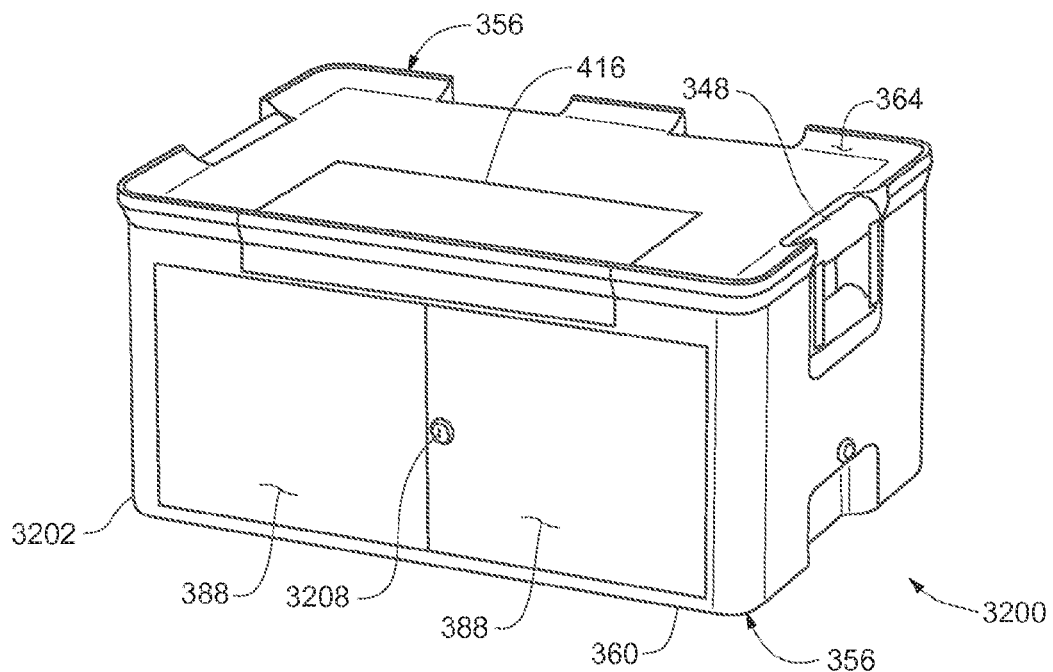
Figure 32B:
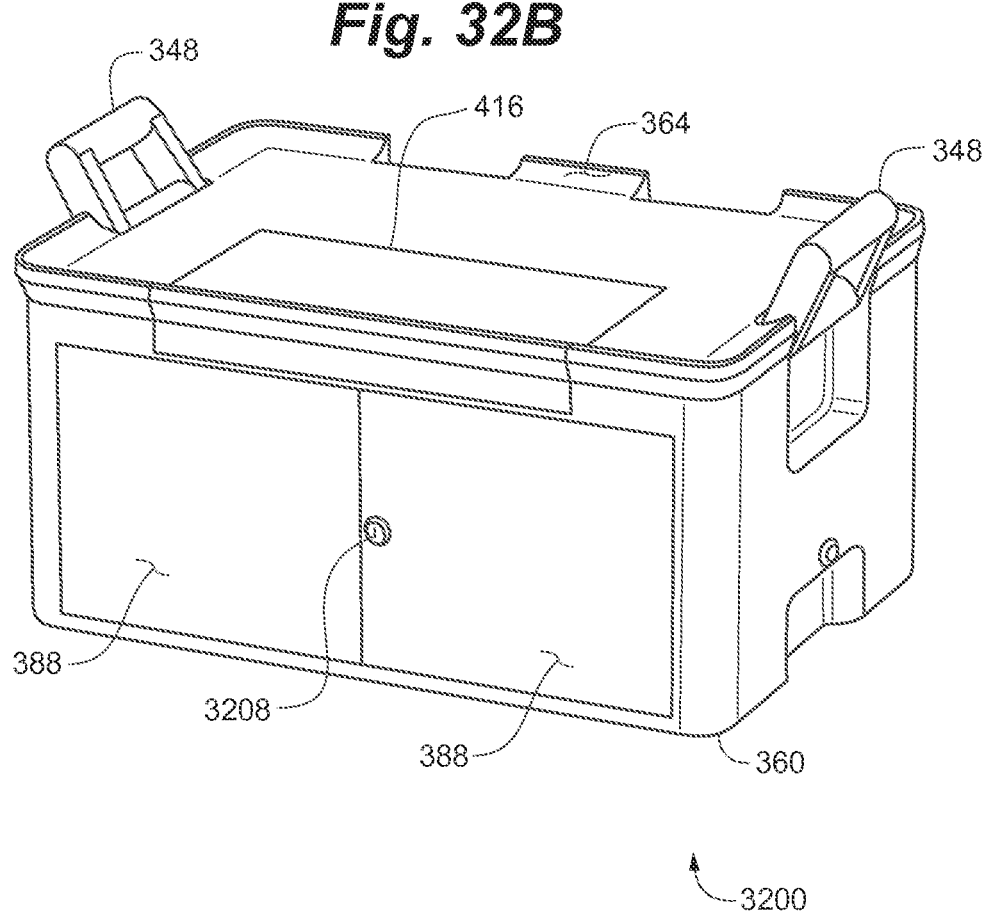

As shown in FIGS. 30-31, some embodiments of the wheeled base 280 can include an internal compartment 312 for housing electronic components, such as a power supply system 136 and/or a network connection system 140. A fan 296 can be used to circulate air throughout the internal compartment 312, and one or more cooperating vents 320 can also be used to promote efficient air circulation. The power supply system 136 can include a power cable 324 which terminates on one end in a standard wall plug 328 for plugging into a standard wall outlet. A retractable cord assembly 332 can be provided within the internal compartment, such that the power cable 324 can be retracted into the body 316 when not in use. A recess 336 can be provided so that the plug 328 can be stowed within the body 316, such that the plug 328 does not extend beyond the periphery of the wheeled base 280, and thereby the recess 336 can help protect the plug from being accidentally snagged as the cart is being transported.

A combined power supply 248 can also be provided according to certain embodiments of the base 280. In such embodiments, the power supply system 136 can provide power to the modules through connector 3002, and through power distribution within each module, to reach each tablet that is connected to the power supply system through the connector 3002 as will be described further with respect to FIG. 47 below. In some embodiments, as described above, the combined power supply 248 can include smart charging logic that charges only a subset of the connected tablets at one time, according to the charging power demanded by each tablet.

In other embodiments, the power supply system 136 within the base 280 does not include the combined power supply 248. Instead, the power supply system 136 distributes power to each module, and each module includes a combined power supply to distribute power to each connected tablet.

In the embodiment of the internal compartment 312 depicted in FIG. 31, a Wi-Fi transmitter 232 is located within the compartment as part of the wireless network connection 236. A network cable 240 can be provided which can be connected to the Wi-Fi transmitter 232 and can be extended from the base so that the network cable jack 344 can be connected to a network outlet. A second retractable cord assembly 332 can be provided within the internal compartment, such that the network cable 240 can be retracted into the body 316 when not in use. A second recess 336 can also be provided so that the cable jack 344 can be stowed within the periphery of the body 316, in a similar manner to, and for the same reason as, for the plug 328. Thus the Wi-Fi transmitter 232 can provide wireless access to a network, which can be used by stored tablets, and by tablets that are in use by a user within the operating radius of the Wi-Fi transmitter.

Alternately, a wired router can be used to supply access to a network via cables and network connectors such as a pig tail or docking station connectors as described elsewhere herein.

In this embodiment, a wired network router can be located within the compartment 312 in lieu of the Wi-Fi transmitter 232. In such a configuration, network signals can be transmitted through cart connector 3002 to the modules, and from there, the network signals can be routed to each connected tablet, as will be described in further detail below. Thus, either by a wired, or by a wireless connection, the cart can allow for communication between each stored tablet and a network.

As can be appreciated, some or all of the components which have been described, or have been depicted in the figures, as being located within the internal compartment 312 of the wheeled base 280, can also be located within an internal compartment of a cart frame with a vertical portion, an example of which is depicted in FIG. 23.

Turning to FIGS. 32A-51D, some features will now be described that may be applicable to some embodiments of tablet carts that include a wheeled base and a vertical portion, and also applicable to some embodiments of tablet carts that include a wheeled base without a vertical portion.

As discussed above with respect to several embodiments, tablet carts can include one or more tablet storage modules. A tablet storage module can have an interior space configured to hold one or a plurality of tablets within one or more corresponding slots within the module. As an example, a tablet cart configured to hold a plurality of tablets may include two or more modules, including a first module that defines a selectively accessible first interior space and a second module that defines a selectively accessible second interior space. The first module can have a plurality of storage slots within the first interior space adapted to hold a first portion of the plurality of tablets, while the second module can have a plurality of storage slots within the second interior space adapted to hold a second portion of the plurality of tablets.

FIGS. 32A-33B illustrate several views of one example of a tablet storage module 3200 according to some embodiments. The module 3200 generally includes a module body 3202 provided by a top panel, several side panels, and a bottom panel to generally define an interior space 3204 for storing tablets. Within the interior space, the module includes a plurality of storage slots 3206 for storing tablets. In this case the module body is shaped as a rectangular box, though it should be appreciated that modules are not limited to any particular shape or configuration.

According to some embodiments, the interior space of a module may be freely accessible from outside the module, such as through a permanent opening or window in a side of the module. In some cases, a storage module may alternately include one or more doors that close upon the interior space to provide selective access to tablets stored therein. As shown in FIGS. 32A-33B, one side of the module 3200 includes a door assembly including two doors 388 that open and close to provide access to tablets stored within the module 3200. In this case the doors 388 include an optional locking mechanism 3208 that allows the doors 388 to be secured when closed, thus securing any tablets that are stored within the module 3200.

Of course, tablet storage modules may optionally include a number of other features, some of which are described in further detail elsewhere herein. For example, modules may be provided with handles (e.g., handles 348 of module 3200) that facilitate easy transport of modules on and off of a tablet cart, may include one or more alignment features (e.g., edge features or surface features 356, protrusion 360, and recesses 364 of module 3200) to facilitate stacking of modules, one upon another, and/or may include various slot configurations within the modules. As other examples, modules may include various types of electrical components (e.g., for a power supply system and/or communication network system) and connectors for connecting tablets and other devices. In addition, while several features have been discussed with respect to module 3200 in FIGS. 32A-33B, it should be appreciated that several characteristics and features of the module 3200 are applicable to a number of different tablet storage modules. For example, modules such as those described above with respect to the tablet carts depicted in FIGS. 22, 24, 25A-25B, 26C, and 27-29 may include one or more of the same features described with respect to module 3200.

Turning to FIGS. 34-35, in some cases tablet storage modules can optionally have one or more alignment features as mentioned above that aid in aligning two or more modules stacked together upon a tablet cart. FIG. 34 is a perspective view of two modules 3400 that include alignment features generally depicted at 3402. In this case the alignment features 3402 include multiple protrusions 3404 extending from the bottom side of one of the modules 3400 and corresponding recesses 3406 within the top side of the other module 3400. The protrusions 3404 and recesses 3406 work cooperatively to align the modules 3400 when they are stacked together. FIG. 35 illustrates another type of alignment feature 3502 incorporated into modules 3500. In this case, each of the modules 3500 includes a recess or groove 3504 in its top surface and a corresponding protrusion or running rib 3506 extending from its bottom surface. As can be appreciated, the alignment features 3502 of two adjoining modules cooperate to align and retain one module 3500 as it is set down on top of another module 3500.

In some embodiments, a horizontal extension of a tablet cart (e.g., the horizontal portion 282 of the carts in FIGS. 22-26B) and/or a wheeled base of a tablet cart (e.g., the wheeled base 280 in FIGS. 28-31) can have an alignment feature that cooperates with the bottom-most storage module to align the bottom storage module on the horizontal portion of the cart. For example, as shown in FIGS. 26A-26B, in some cases the horizontal portion 282 of the cart frame can have an alignment feature 2600 in the form of a raised edge that is adapted to mate with or receive a corresponding feature on the base of one or more storage modules 120D shown in FIGS. 25A-25B. As another example, the wheeled base 280 illustrated in FIG. 30 includes an alignment feature 3000 in the form of a raised edge that is adapted to receive a corresponding feature, such as a groove or recessed area, on the bottom of one or more storage modules 120E. Of course protrusions, recesses, and/or other types of engaging surfaces that allow for positive alignment may be used on various surfaces of opposing modules and horizontal portions.

In some embodiments, an alignment feature on the horizontal portion of a tablet cart frame can be the same as the alignment feature on each module, such that modules can be stacked in any order on the horizontal portion and thus the cart. In some cases, alignment features can be used to restrict the possible combinations for ordering and aligning modules upon a cart. Turning to FIG. 29 for example, in this example the alignment features of two adjoining modules are distinct from those of other modules, such that only the alignment features of the lowest module (indicated as "A") will engage with the alignment features of the wheeled base. In a similar manner, only the alignment features on the base of the middle module "B" will engage with the alignment features on the top of module "A." Finally, only the alignment features on the base of module "C" will engage with the alignment features on the top of module "B." This embodiment can thus be useful for ensuring that tablet storage modules are stacked in a desired order. In some cases the order may correspond to an order in which the modules will be needed, such as in applications where a module will be left for use in one location, and the other modules will be transported to other distinct locations.

Of course the type and number of alignment features for a given module may vary from the particular embodiments illustrated herein. In some cases more or less alignment features may be included or alignment features having a different type of engagement may be included. In some embodiments the alignment features may include two or more cooperating surface features on opposing surfaces of two storage modules or on opposing surfaces of a storage module and a horizontal frame portion. In some cases one or more alignment features may facilitate stacking of multiple modules and aid in transporting the modules and cart together by inhibiting relative horizontal movement of one module with respect to another in some embodiments. As described above, in some cases the alignment feature can be a protrusion or a recess, though these are just some illustrated examples.

As shown in FIGS. 32A-33B, and in several other depictions of tablet storage modules herein, in some cases a tablet storage module can include one or more doors as part of a door assembly that is configured to close upon the interior space of the storage module to provide selective access to tablets stored therein. Storage modules may be provided with any number and/or suitable type of doors, and in some cases may not include any doors. As just a few examples, module doors may be sliding and/or hinged (e.g., upwards, downwards, outwardly, inwardly to the side, etc.). In some cases an optional locking mechanism may be built into a door assembly to allow one or more module doors to be secured when closed, thus securing any tablets that are stored within the module.

Figure 36A:
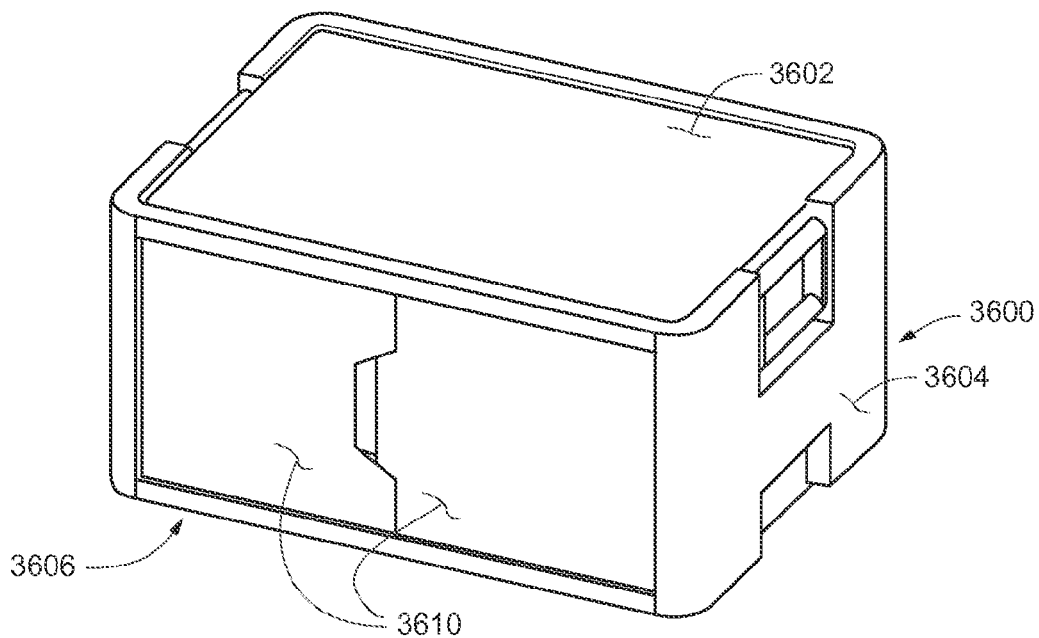
FIG. 36A-36C are front perspective views of a storage module in accordance with an embodiment.
Figure 36B:
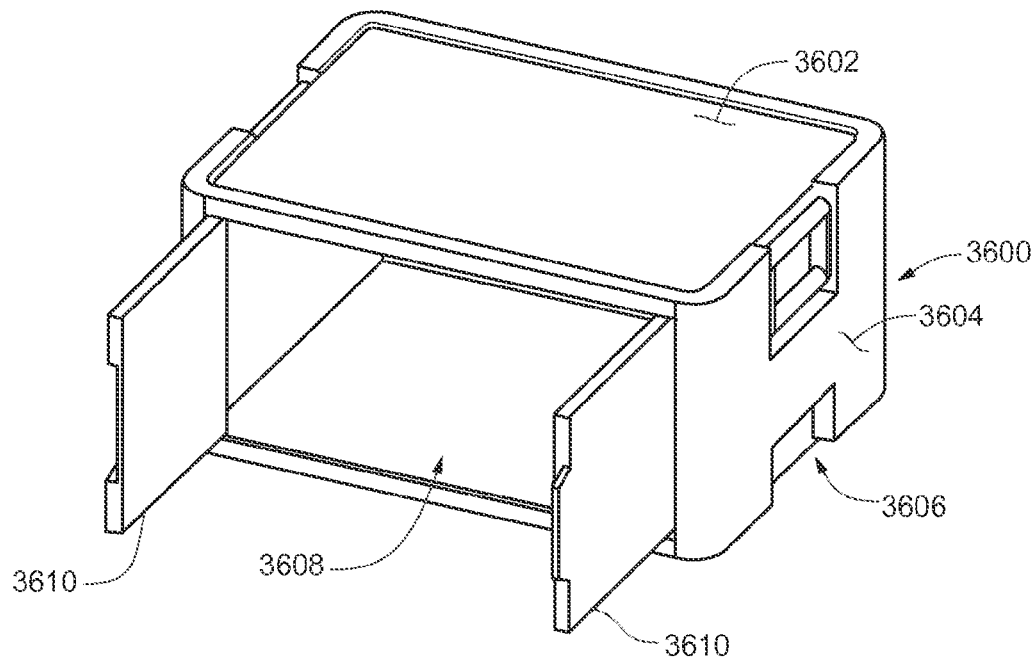
Figure 36C:
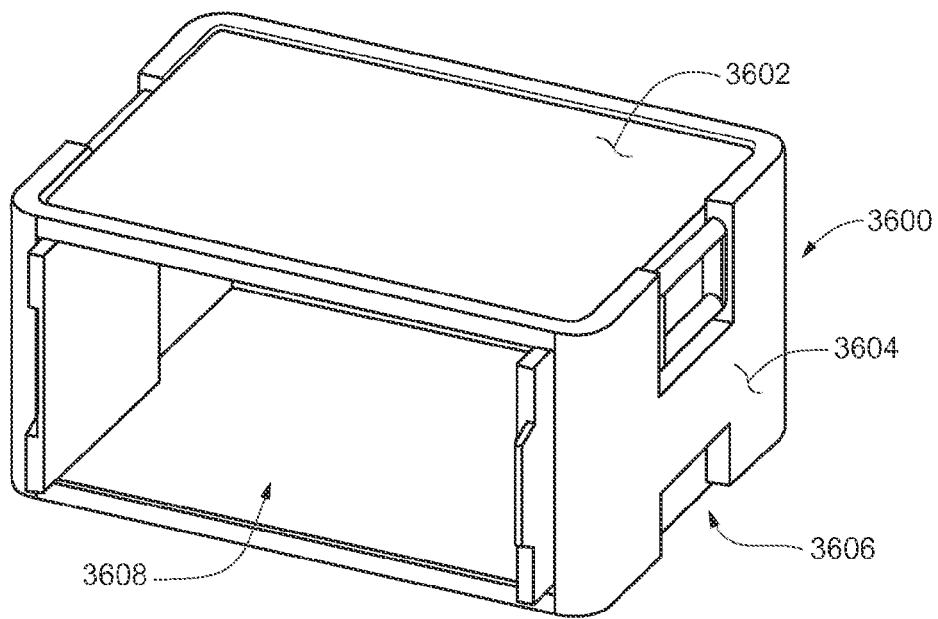

FIGS. 36A-38C provide illustrations of three types of possible doors that may optionally be incorporated into one or more storage modules on a tablet cart. FIGS. 36A-36C are perspective views of a module 3600 that generally includes a module body provided by a top panel 3602, several side panels 3604, and a bottom panel 3606 to generally define an interior space 3608 for storing tablets. The module 3600 also includes two side pocket doors 3610. The pocket doors 3610 are adapted to pivot outwards and to the sides, after which the doors can be translated rearward and stowed within the module body along the sides of the module, so that they do not interfere with a user's ability to access the interior space 3608 of the module.

Figure 37A:
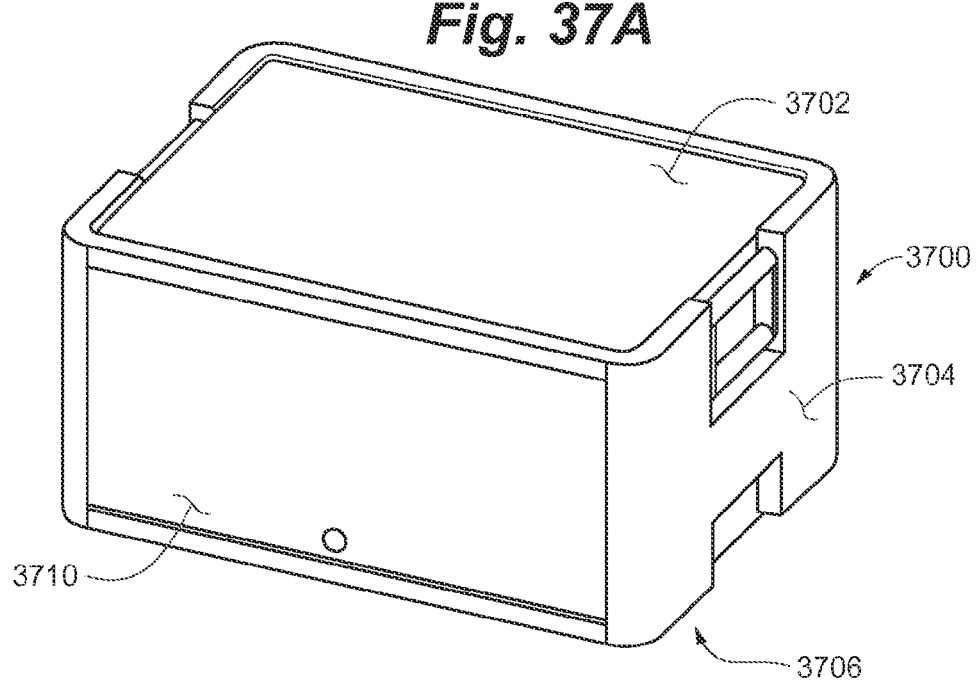
FIG. 37A-37C are front perspective views of a storage module in accordance with an embodiment.
Figure 37B:
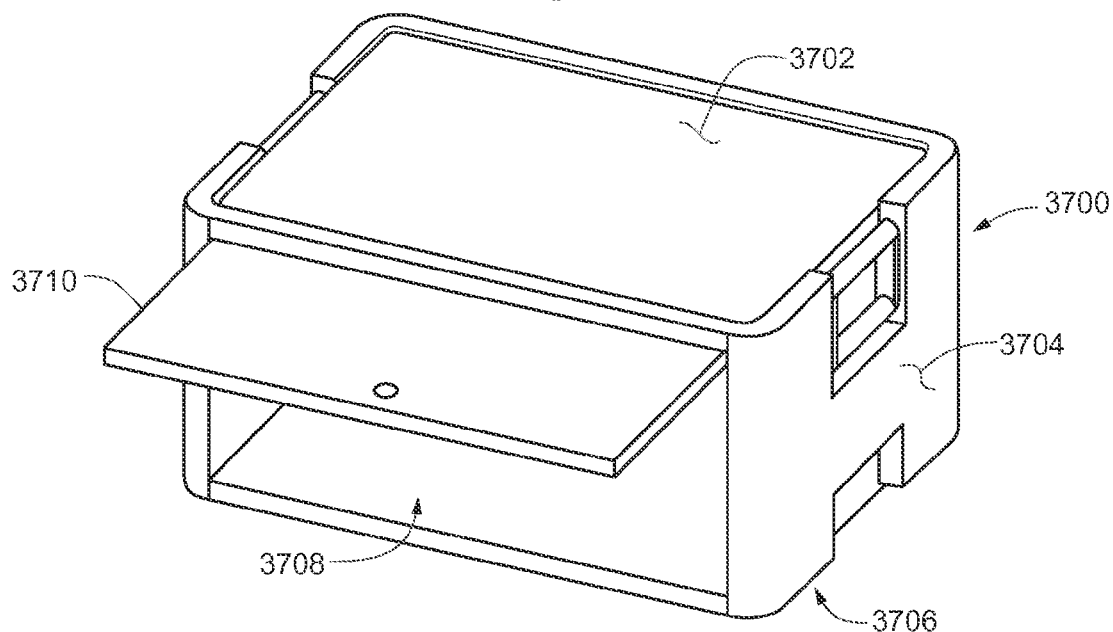
Figure 37C:
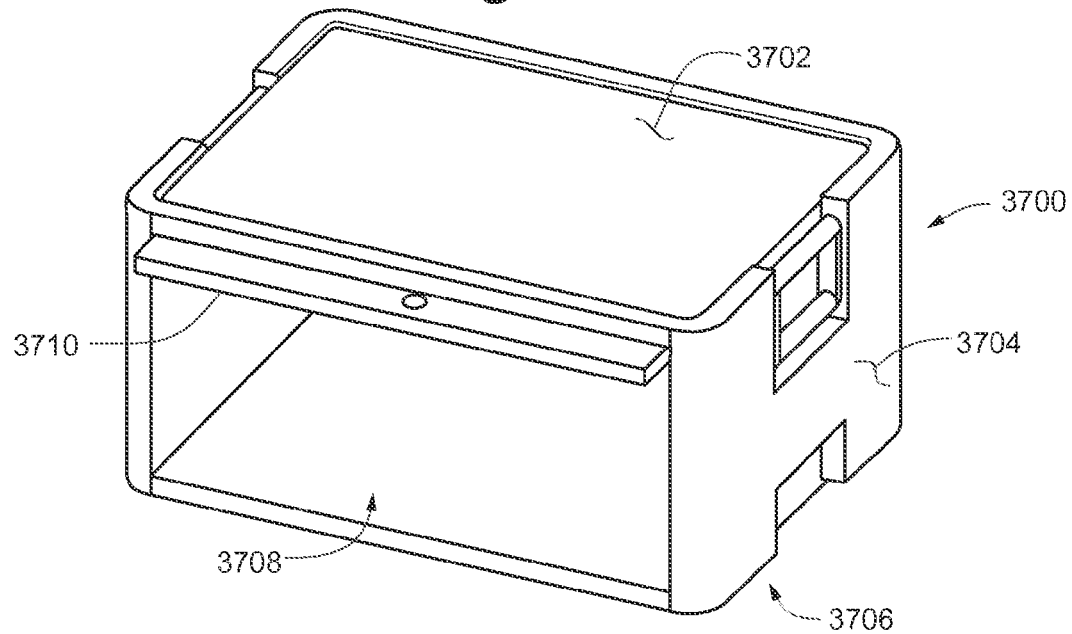

FIGS. 37A-37C are perspective views of a module 3700 that generally includes a module body provided by a top panel 3702, several side panels 3704, and a bottom panel 3706 to generally define an interior space 3708 for storing tablets. The module 3700 also includes a single pocket door 3710. In this embodiment, the pocket door 3710 is adapted to pivot upwards and then translate rearward and stow within the module frame, along the top of the module, so that the door does not interfere with a user's ability to access the interior space of the module.

Figure 38A:
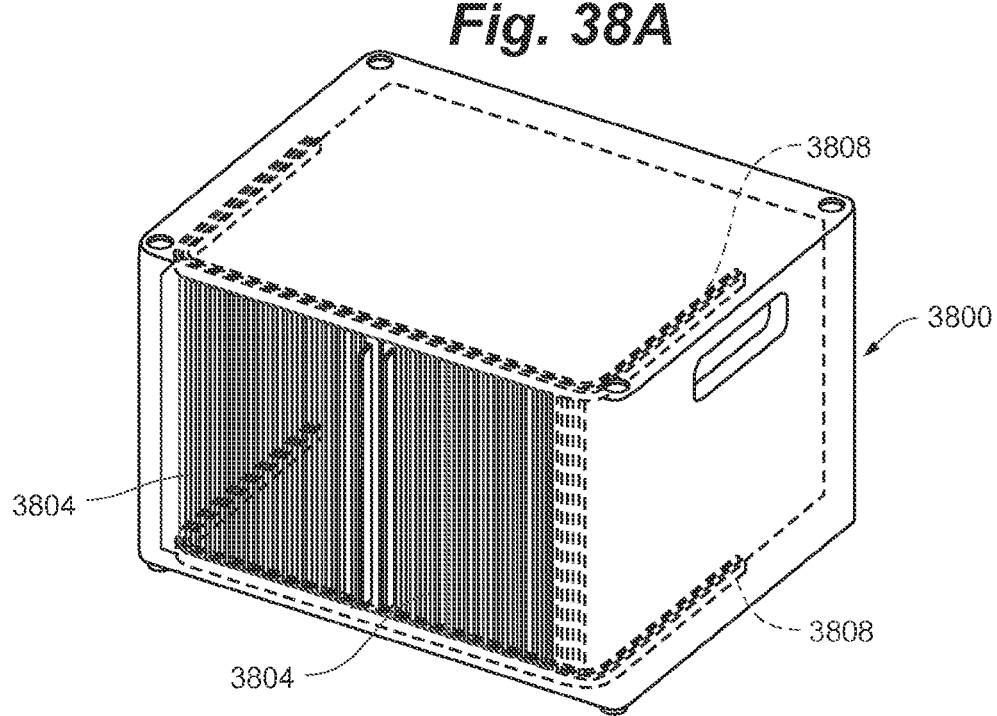
FIG. 38A-38B are front perspective views of a storage module in accordance with an embodiment.
Figure 38B:
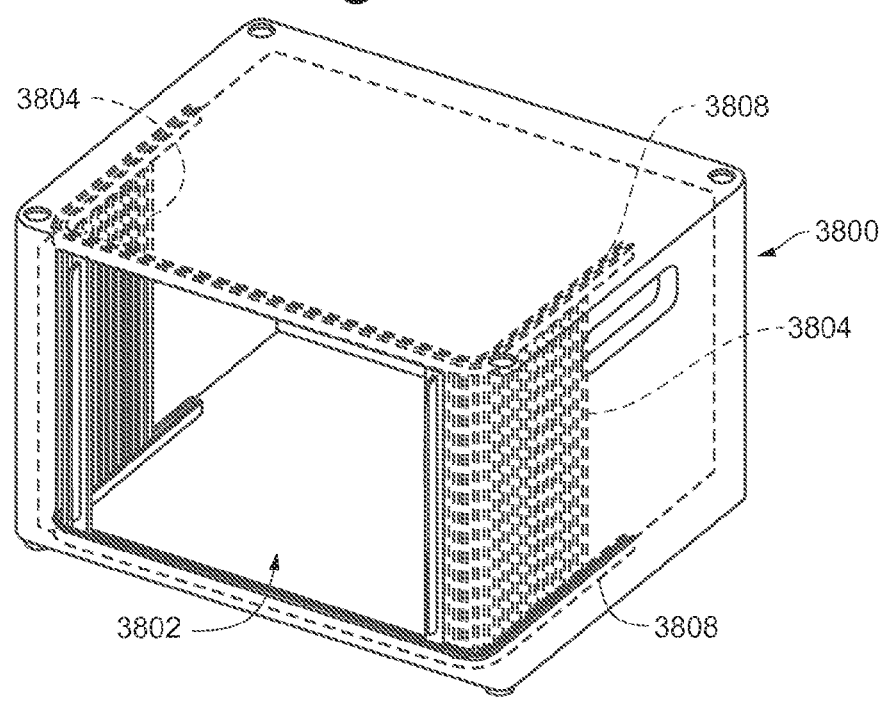

FIGS. 38A-38C are perspective views of a module 3800 that generally includes a module body provided by a top panel, several side panels, and a bottom panel to generally define an interior space 3802 for storing tablets. In this example the module 3800 includes two tambour doors 3804 that operate in a manner similar to roll-top doors, but in this case roll to the side. The doors 3804 include identical extrusions 3806 that tessellate together to form a flexible stowing door. In this embodiment, the tambour doors 3804 are adapted to articulate to the sides, following upper and lower door tracks 3808, such that the doors are stowed within the module body, along the sides of the module in the open position. Configuring the doors in this example, as well as in other examples, to stow inside the module can reduce the likelihood that the doors will interfere with access to the module interior space and can also help ensure that the footprint of the module does not increase when the doors are open and the module is in use.

As discussed elsewhere, some embodiments of a tablet cart include one or more slots within an interior space of a tablet storage module for receiving and storing one or more tablets. For example, a tablet cart may include a plurality of storage modules, each having a plurality of storage slots within an interior space of each module adapted to hold a portion of a plurality of tablets stored within the tablet cart.

Slots provided by a tablet cart can include any shape that is useful for holding a tablet and in many cases may have configurations and features generally similar to those described above with reference to the generally stationary tablet storage racks. For example, each slot in a tablet cart may be configured to receive and store one tablet or optionally two or more tablets depending upon the particular physical implementation. In some cases one or more slots may include one or more connectors for connecting to a tablet received within the slot(s) and thus the slots may be referred to as storage slots, connection slots, and/or storage and connection slots. Of course it should be appreciated that many variations of slot configurations can be utilized, including configurations in which none, one, some, or all of the slots in a tablet cart have connectors for connecting to a tablet received within a particular slot.

Storage and connection slots can be arranged in any suitable orientation with respect to a tablet cart and/or one or more tablet storage modules associated with the tablet cart. In some cases, slots can have a vertical orientation or a generally vertical or slightly angled from vertical orientation. For example, a tablet within such a slot can be positioned in similar orientation to tablets stored in a tablet storage rack. Slots can also be arranged in a horizontal orientation (for example, a tablet within such a slot can lie flat with the screen either facing up or down), and/or in a generally diagonal orientation (for example, a tablet within such a slot can be resting on both an edge and either the screen or the back plate), among other orientations. As described elsewhere, storage and/or connection slots in a tablet cart can also be grouped within one or more modules that each define an interior space for storing a plurality of tablets. In some cases slots may be included in modules that are configured as extendable drawers (see, e.g., FIG. 27). In cases like this, each of the drawers can be pulled out, and tablets can be removed from, or deposed into, vertically aligned slots within the drawers. The slots can be configured in rows and columns, and the orientation of the rows can either be lengthwise, or widthwise.

Of course, these are just some of the many number of possible types of configurations that may be useful for providing storage and/or connection slots in various embodiments of tablet carts (as well as tablet storage racks, where appropriate), and it should be appreciated that many other slot configurations and variations are possible. For example, U.S. patent application Ser. No. 13/025,782, entitled "Mobile Computing Device Charging and Networking System and Method," filed Feb. 11, 2011, which claims the benefit of U.S. Provisional Application Ser. No. 61/303,357, entitled "Laptop Computer Cart," filed Feb. 11, 2010, describes multiple examples of mobile computing device carts adapted to hold a plurality of mobile computing devices in a corresponding plurality of docking station slots. The disclosures of U.S. patent application Ser. No. 13/025,782, and U.S. Provisional Application Ser. No. 61/303,357 are each incorporated herein by reference in their entirety.

Figure 39:
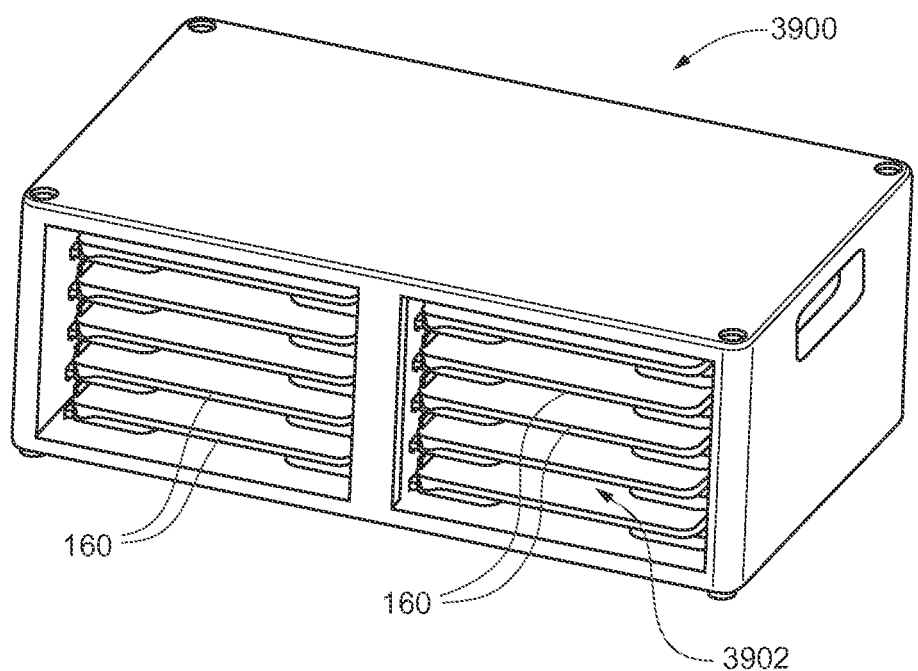
FIG. 39 is a front perspective view of a storage module in accordance with an embodiment.
Figure 40:
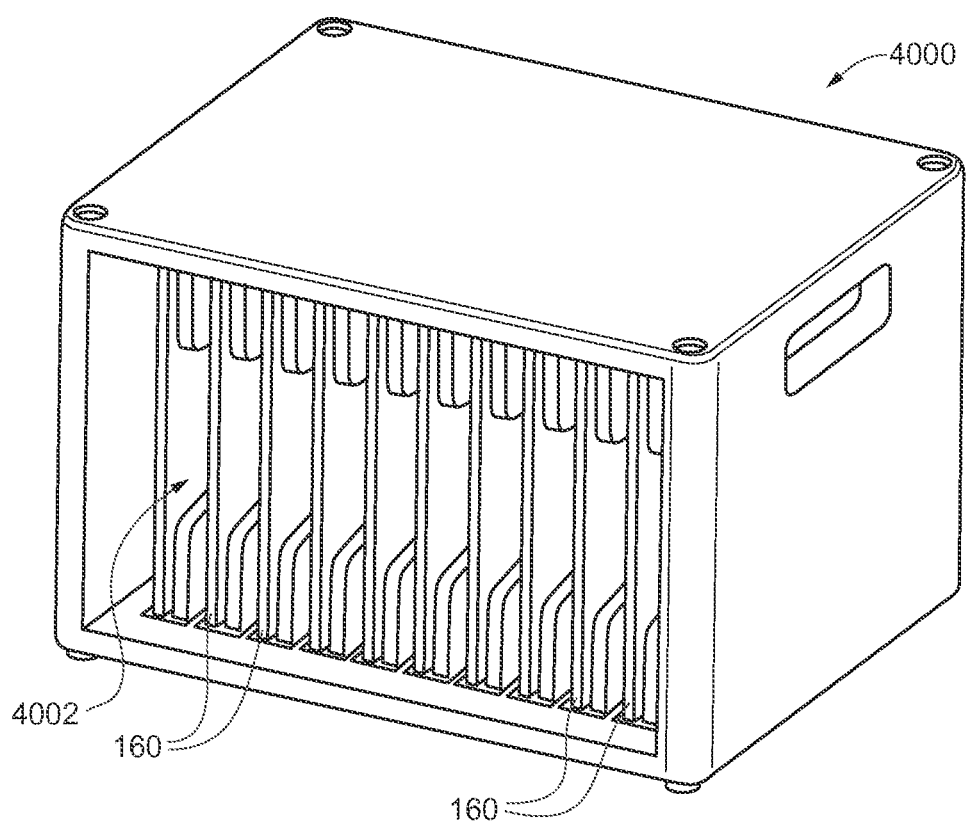
FIG. 40 is a front perspective view of a storage module in accordance with an embodiment.
Figure 41:
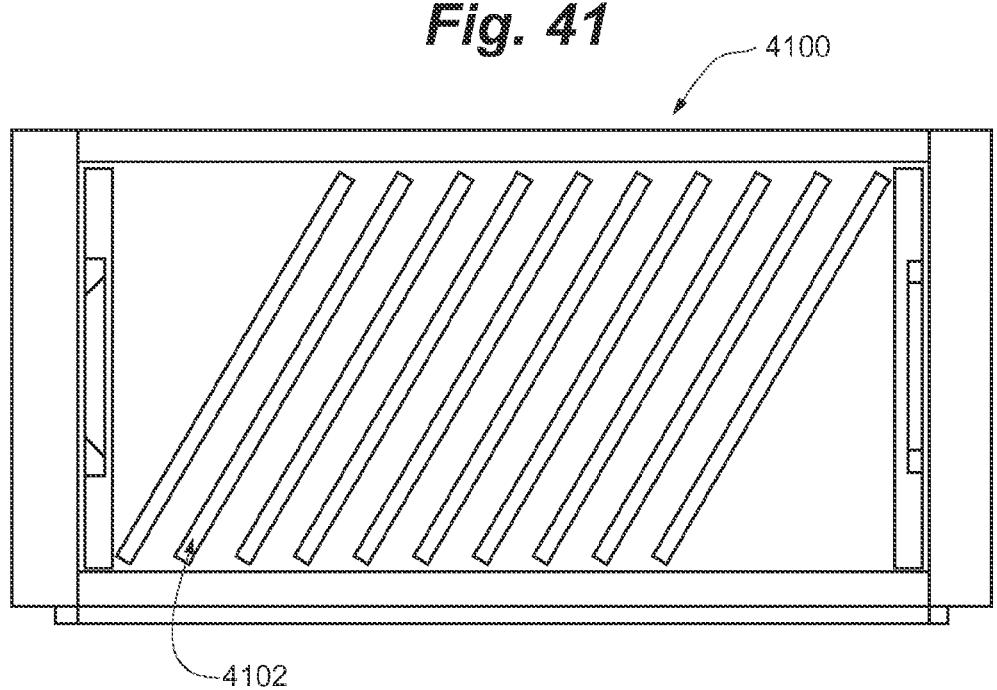
FIG. 41 is a front elevation view of a storage module in accordance with an embodiment.

FIGS. 39-41 show several embodiments of tablet cart storage modules that are adapted or configured to hold up to ten tablets. FIG. 39 shows a front perspective view of one such module 3900 with its doors open to expose a plurality of storage and connection slots 3902 arranged horizontally in a two-by-five array. Other horizontal arrangements of the slots 3902 that can hold more or fewer tablets are also possible, and can include more or fewer rows and/or more or fewer columns, depending on the width and height of each tablet and slot as well as the overall interior width and height of the module 3900. As depicted in FIGS. 40 and 41, other slot orientations are also possible. FIG. 40 is a perspective view of a storage module 4000 including several vertically-oriented slots 4002, while FIG. 41 depicts a storage module 4100 including diagonal slots 4102. In some cases, only a portion of a module may include slots for storing tablets. For example, in some embodiments, one or more modules may include at least a part that is free of slots, or the entire module can be substantially empty, for general storage if so desired.

As discussed above, one or more of the slots in a tablet cart can optionally have various types of connectors to connect a stored tablet to, e.g., a network connection system and/or to a power supply system. In some embodiments, one or more pigtail connection connectors and/or a docking station connectors may be provided. For example, a slot within a tablet cart storage module may include one or more pigtail connectors in a manner similar to slots of the tablet storage rack embodiments discussed above with respect to FIGS. 15-17. In some cases one or more slots of a tablet cart may have one or more docking station connectors in a manner similar to slots of the tablet storage rack embodiments discussed above with respect to FIGS. 18A-18B. Other connection systems are also possible, depending on need and these connection systems can be made through an existing network connector, or through a dedicated connector. As just one example, a dedicated connector and/or connection through an existing connector may be provided for a number of tablets to connect to a host computer that can be controlled by a user.

Figure 42:
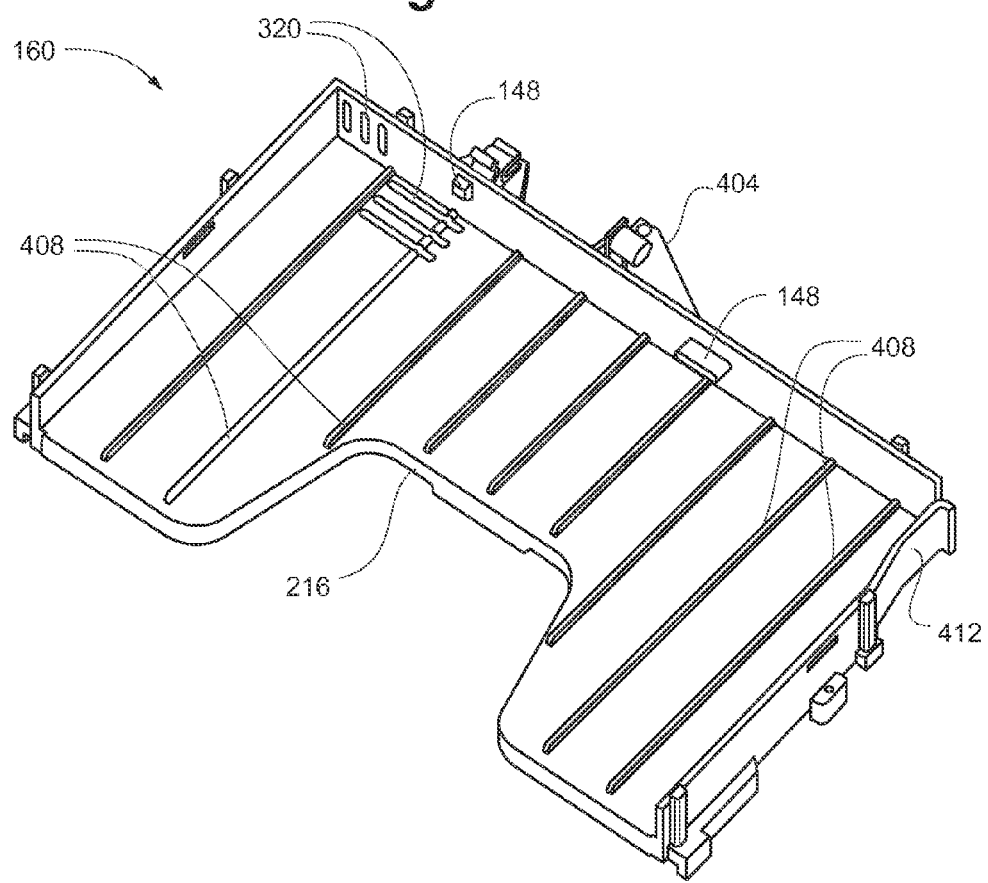
FIG. 42 is a top perspective view of a docking station in accordance with an embodiment.

Docking station connectors can be provided in any suitable format. FIGS. 39 and 40 illustrate embodiments in which docking station connectors are provided as part of a tray-like docking station 160 positioned within the slots 3902, 4002 of the modules 3900, 4000, respectively. FIG. 42 is a perspective view of the tray-shaped docking station 160 according to some embodiments. As shown, the docking station 160 has, in this case, two docking station connectors 148. The docking station connectors 148 can be connected to a network connection system and to a power supply system of a tablet cart through a printed circuit board assembly 404 which can be located at the back of the docking station 160. In some cases the docking station connectors 148 may alternately connect to some systems through electrical cables. The docking station 160 includes ridges 408 located on the tray's bottom surface, and vents 320 located in the tray's bottom and side surfaces to facilitate air circulation throughout the module and the tablet received in the docking station 160 in order to more effectively cool tablets within the cart.

Docking stations, such as the docking station 160 in FIG. 42, can be provided with any shape useful for automatically connecting one or more of a tablet's ports with one or more docking station connectors as the tablet is entering into docking engagement with the docking station. In some embodiments, the docking station has a shape adapted to conform to the tablet; in other embodiments, the docking station is adapted to support two tablet surfaces, and thus control the orientation of a tablet in order to establish correct tablet alignment of the ports with the docking station connectors. For example, a docking station that is diagonally oriented may engage one side surface and either the bottom or top surface of a tablet to ensure correct alignment. As another example, a docking station may be adapted to engage with a one or more asymmetrical features of a tablet, as discussed above with respect to FIG. 2. Referring again to FIG. 42, in some embodiments a docking station can use one or more spring biased pressure tabs 412 to ensure correct tablet alignment of a tablet within the docking station. Thus, a docking station can be configured to hold a tablet in a desired position or orientation.

According to some embodiments, one or more docking stations (and included connectors) may be removable from tablet storage slots. Referring to FIG. 40, for example, in some cases one or more of the docking stations 160 can be removed from the slots 4002 and replaced with another docking station (not shown). Such functionality can be useful when particular docking stations are only compatible with certain types or brands of tablets. In a similar manner, a pigtail connection connector that is adapted for a proprietary connector and pin arrangement may be removable so that it can be removed and replaced by another pigtail connection connector that is adapted for use with another tablet. Such interchangeability is useful in cases where one brand of tablets are being phased out and are being replaced by another tablet brand.

Figure 43:
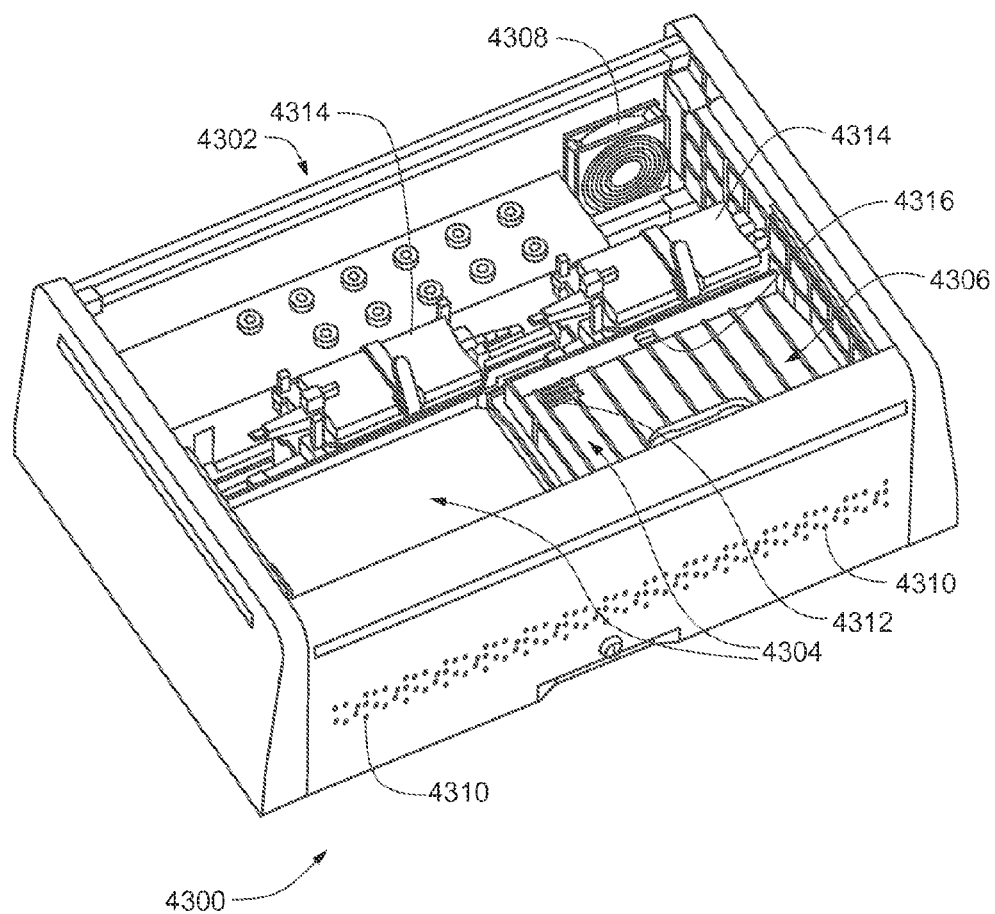
FIG. 43 is a rear perspective cutaway view of a storage module in accordance with an embodiment.
Figure 44:
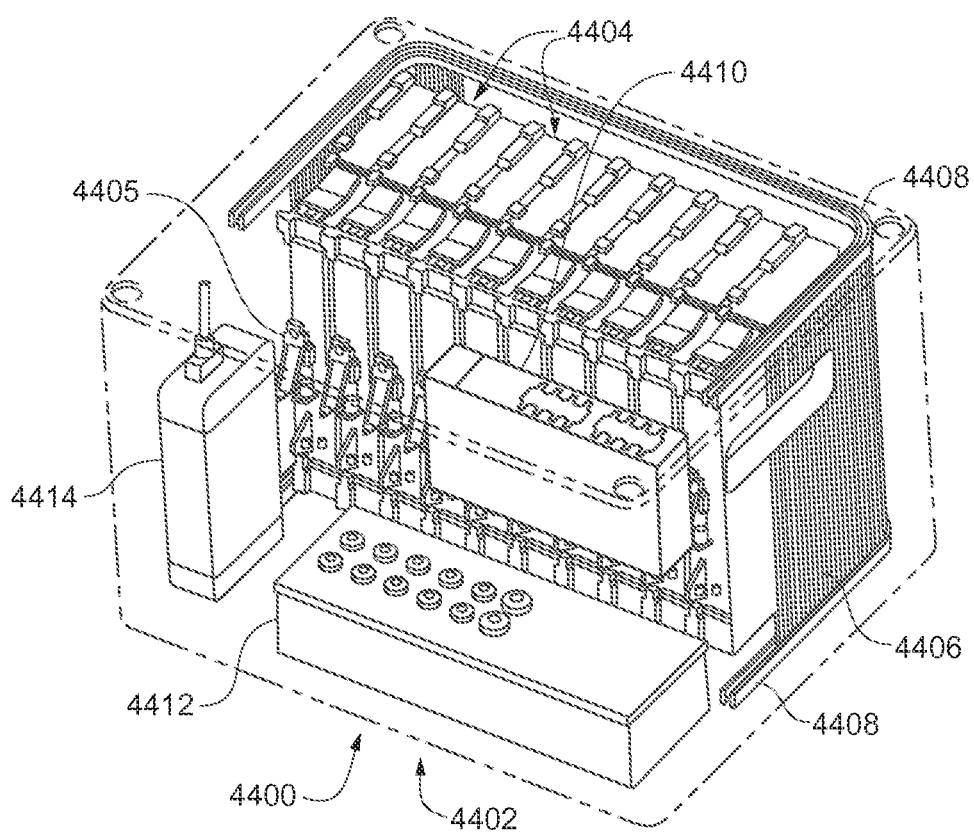
FIG. 44 is a top perspective cutaway view of a storage module equipment bay in accordance with an embodiment.

FIGS. 43 and 44 provide interior or cut-away views of modules illustrating additional aspects of the electronics of some tablet storage modules according to some embodiments. FIG. 43 shows one embodiment of a module 4300 that includes a module equipment bay 4302 that occupies some of the interior space within a module 4300. In this embodiment, the equipment bay 4302 occupies the rear portion of the module 4300 as viewed, and is positioned behind the tablet slots 4304 and corresponding docking stations 4306, which are positioned in the front of the module 4300 in a manner similar to the arrangement of slots in the module 3900 illustrated in FIG. 39. The bay 4302 generally houses electronics and other equipment that supports operation of the tablet cart, its modules, slots, and/or docking stations. In some cases the equipment within a particular module equipment bay may communicate and work together with equipment in other modules and/or within an internal compartment of the tablet cart, such as is depicted and described above with respect to FIGS. 30-31.

Returning to FIG. 43, in this embodiment the equipment bay 4302 includes a fan 4308, which is disposed in an outer surface of the module 4300 to facilitate air exchange between the interior and the exterior of the module. The bay 4302 can also have one or more vents 4310 that can be provided in the module body to facilitate air circulation into, and out of, the module. Vents can also be provided in the wall structure of the storage and connection slot 4304, and as described above, vents 4312 can also be located in docking stations 4306 to help promote air circulation within the module. FIG. 43 also illustrates transformers 4314 within the module bay 4302 and the tablet connectors 4316 on the docking station 4306.

FIG. 44 shows another embodiment of a module 4400 that illustrates both another configuration of the equipment within a module bay, as well as an alternate layout of the bay within the module 4400. The module 4400 includes a module equipment bay 4402 that occupies some of the interior space within a module 4400. In this embodiment, the equipment bay 4402 occupies the rear portion of the module 4400 as viewed, and is positioned behind the tablet slots 4404 and corresponding docking stations within the slots, which are positioned in the front of the module 4400 in a vertical orientation similar to the arrangement of slots in the module 4000 illustrated in FIG. 40. Circuit board assemblies 4405 of each docking station can be seen at the back of the slots 4404. In this case the module 4400 also includes doors 4406 and tracks 4408 similar to the module embodiment shown in FIGS. 38A-38C.

Returning to FIG. 44, the module bay 4402 includes a wired router 4410 that is included as part of a network connection system. The bay 4402 can also house a combined power supply 4412 (and one or more transformer(s) 4414, if required), or a plurality of individual power supplies (not shown). The individual power supplies and the combined power supply (as well as any provided smart charging logic), function as has been described earlier in this disclosure.

Of course, many other configurations for module equipment bays are also possible and it should be appreciated that the scope of this disclosure is not limited to any particular equipment configuration. As just a few examples, various configurations of power supply equipment and/or network connection equipment can be provided within a module equipment bay.

Turning to FIGS. 45-47, schematic views of three possible embodiments of connector arrangements between storage modules 4500 and a tablet cart frame 4502 are shown. FIG. 45 shows one embodiment in which cart connectors can be pigtail-type connectors 4504 extending from internal compartment 4505 within the frame 4502. As can be appreciated, the location of the internal compartment 4505 in FIG. 45 (as well as in FIGS. 46-47) is only shown schematically, and it can be physically located in the generally horizontal portion of the cart, so as to be compatible with a cart frame that includes a wheeled base. The connectors 4504 are connected to ports 4506 on each module 4500. For this configuration, room is sometimes needed between the cart frame 4502 and the modules 4500, so that a user can reach in between the two in order to make the connection. Thus, in some cases a service loop of cable extending from connectors 4504 may be included so that connectors 4504 can reach ports 4506 while the modules are set back far enough for a user to reach in.

In the embodiment shown in FIG. 46, docking style connectors are used as the cart connectors 4604. In this embodiment, docking style connectors 4604 are electrically connected with associated electrical equipment within internal compartment 4605 and extend horizontally from the vertical portion 4603 of the frame 4602 in order to meet with ports 4606 which can include a cavity to receive the connector. Ports can be positioned on modules 4600 such that a port is aligned with a corresponding connector when the module 4600 is located on the cart. The connectors 4604 are configured to connect automatically with a module port 4606 when the docking connector is positioned in the port (for example, when a module is translated towards the vertical portion 4603). In this embodiment, the ports 4606 can be connected with the connectors 4604 as the modules are placed into the frame 4602 and moved closer to the vertical portion 4603, for example, as explained above using the movable tray and as depicted in FIGS. 26A-26C. (Of course, the embodiments depicted in FIGS. 26A-26C could also use pigtail-type connectors.)

In the embodiment shown in FIG. 47, docking style connectors are used as the cart connectors 4704. In this embodiment, the modules 4700 are placed one on top of another and on top of the cart frame 4702, and in so doing, the port 4706 of one module can be docked with the corresponding docking connector 4704 of another module. For this embodiment, the network connection system, the power supply system, and any additional electronic distribution network that is in use, can also be adapted to include a feed-through portion. For example, some of the electrical power and electronic signals that are transmitted through the connection from the cart to module "A" includes a feed-through portion. The feed-through portion is then transmitted through the connection from module "A" to module "B," while the remainder portion of the electrical power and electronic signals that are transmitted through the connection from the cart to module "A" is used for the tablets within module "A." Likewise, some of the electrical power and electronic signals that are transmitted through the connection from module "A" to module "B" also includes a feed-through portion. The feed-through portion is then transmitted through the connection from module "B" to module "C," while the remainder portion of the electrical power and electronic signals that are transmitted through the connection from module "A" to module "B" is used for the tablets within module "B." FIGS. 30 and 31 illustrate one example of a docking style cart connector 3002 on the wheeled base 280. The connector 3002 is formed as a type of plug that could be received within a corresponding socket or port on the bottom of a storage module in the manner depicted in FIG. 47.

To complement the adjustable configuration of multiple modules as depicted in the examples in FIGS. 45-47, in some embodiments, a tablet cart may include a network connection system, a power supply system, and other electronic distribution network components that are configured to dynamically adapt to a changing number of modules on a cart. For example, if less than three modules, or more than three modules are placed on the cart, the systems could function equally well to supply tablets within each of the modules that are stacked on the cart.

Figure 48:
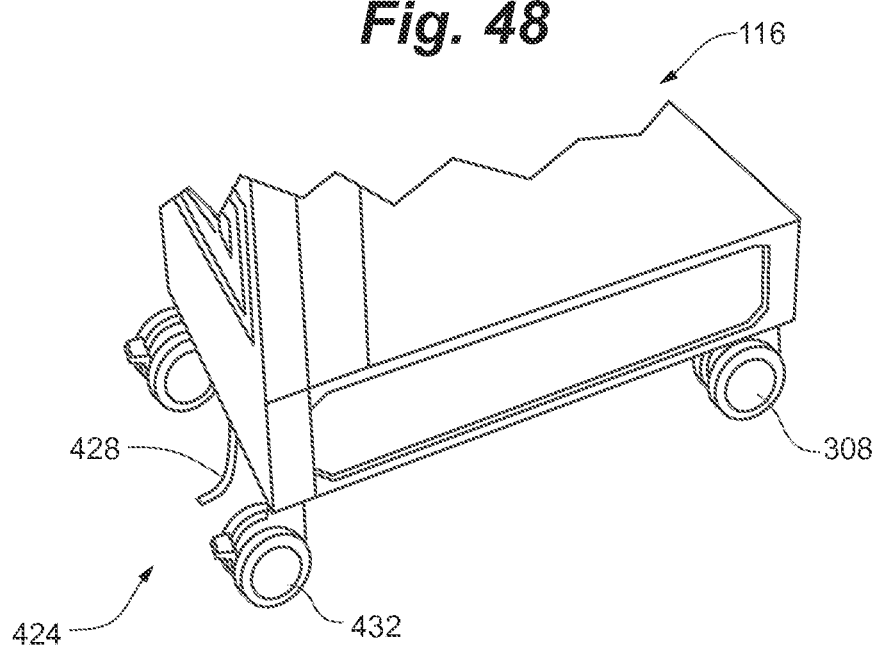
FIG. 48 is a rear perspective view of a tablet cart with a grounding system in accordance with an embodiment.

According to some embodiments, a tablet cart may be provided with a grounding system in order to ground the electrical system of the cart and reduce the risk of unwanted electrical charge build-up. FIG. 48 illustrates a cart 116 with a grounding system 424 in accordance with one possible embodiment. In this case, the cart 116 includes a grounding strap 428 attached to the lower portion of the cart and adapted to contact the ground as the cart is moved. The grounding strap 428 can be positioned in any of a number of locations along the bottom of the cart, though it may preferably be in a location that will not interfere with a user moving the cart and still maintain electrical contact with the ground. Grounding strap 428 can have any of a number of friction reducing or wear reducing features (e.g. integrated metal wheels within the strap, or a wear plate) such that the strap can maintain electrical contact with the ground while maximizing its service life.

Continuing with reference to FIG. 48, other embodiments of a grounding system can include a grounding ring 432, which can be electrically connected to the grounding system and located along the contact surface of one or more of the cart wheels 308. The electrical grounding system 424 can be electrically connected to the cart 116 as well as to any module(s) thereon and can thus provide an electrical grounding path which can reduce the likelihood of shock. The electrical grounding system 424 can have electrical connections to any desirable electrical components within the tablet cart 116, including a cart handle, a display housing, and/or through the module connectors to the modules. Within the modules, the electrical grounding system 424 can be electrically connected to the module door assembly, the module handles, the module slots, and/or to docking stations within the slots. Accordingly, the grounding system 424 can provide a means to dissipate stray electrical charges that may have accumulated, and provide for convenient discharge of static electricity that may have built up on either a user or the cart.

As mentioned above, in some embodiments a tablet cart may have one or more tablet storage modules with an optional, built-in locking mechanism that allows one or more doors of the storage module to be secured when closed, thus securing any tablets that are stored within the module. Examples of locking doors are illustrated in the tablet cart embodiments depicted in FIGS. 28 and 32A-33B, though it should be appreciated that any tablet storage module with one or more closable doors may include a locking mechanism. A keyed locking mechanism is shown in the embodiments depicted in FIGS. 28 and 32A-33B, however, it should be appreciated that any suitable type of locking mechanism known in the art may be used to securely close one or more doors on a tablet cart storage module.

Turning to FIGS. 49A-51D, some embodiments may also or instead include locking mechanisms for locking one or more storage modules to a tablet cart frame. In some cases the locking mechanisms may be provided as a central locking mechanism and/or as a locking mechanism integrated within individual modules.

FIGS. 49A-49B illustrate one possible example of a central locking mechanism for securing tablet storage modules. As shown, a central locking mechanism 4900 is used, which can move from an open position, as depicted in FIG. 49A, to a closed position, as depicted in FIG. 49B. The central locking mechanism 4900 can be provided in the vertical portion 4902 of the cart frame and can include a combination of latches 4904 (for example, three), one for each module, that can engage with a keeper 4906 (sometimes also called a strike) that can be provided on each module. All the latches can be operated in unison by a cable system, or by rigid linkages, so that each latch engages with, or disengages from, a mating keeper at approximately the same time. In other embodiments, each latch can be individually controlled, again by cables or rigid linkages. The central mechanism can be provided with a lock such that once the latches are engaged with keepers, the lock can be used to prevent unauthorized users from moving the mechanism to the open position.

Figure 50A:
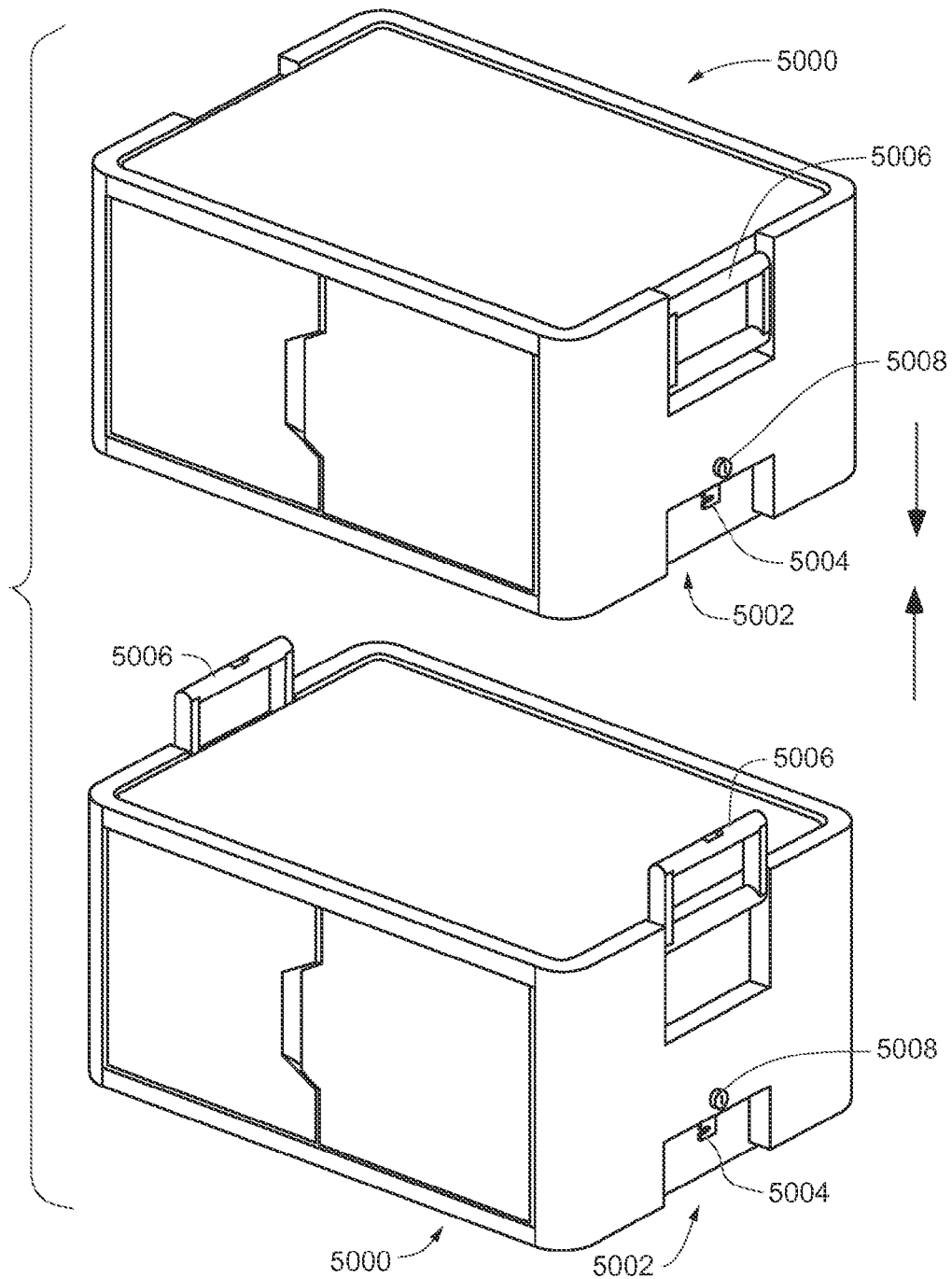
FIGS. 50A-50B are front perspective views of a locking arrangement for storage modules in accordance with an embodiment.
Figure 50B:
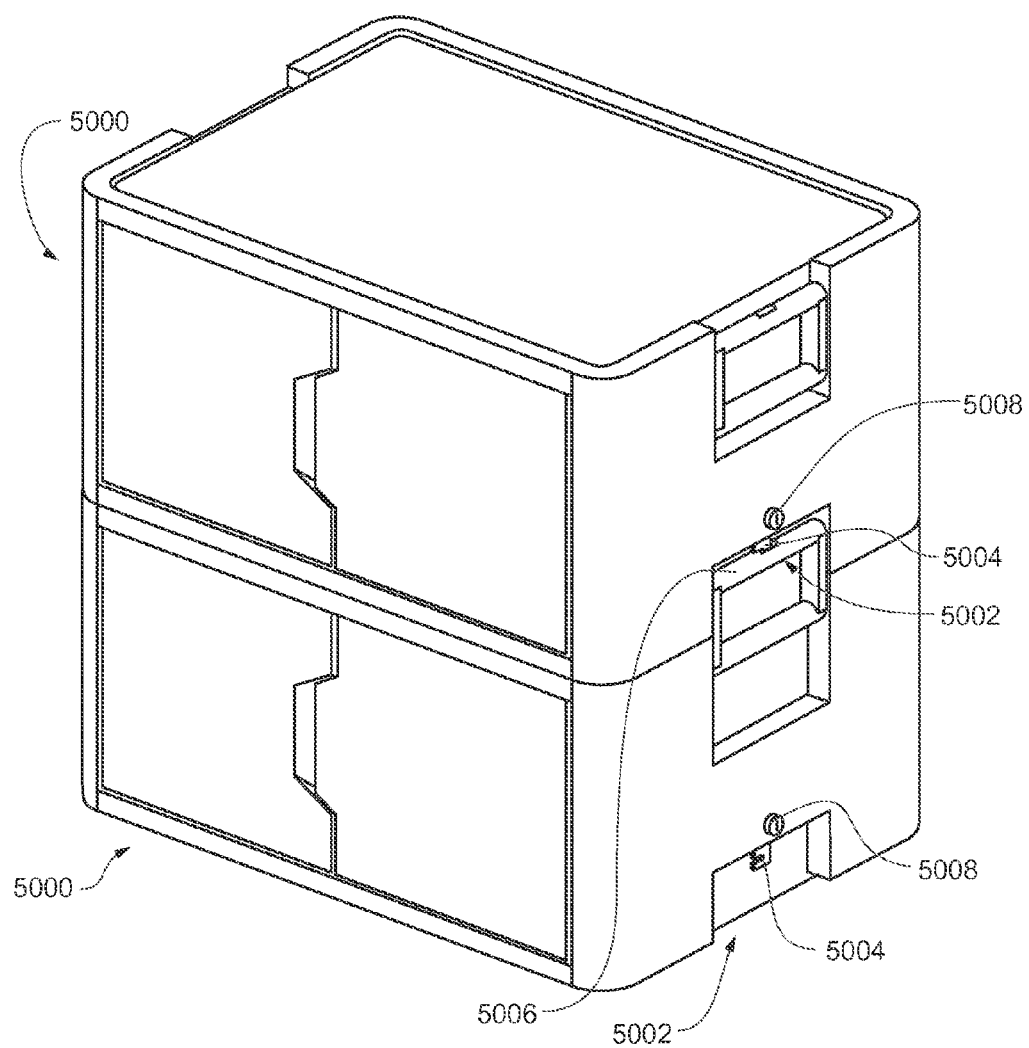
Figure 51A:
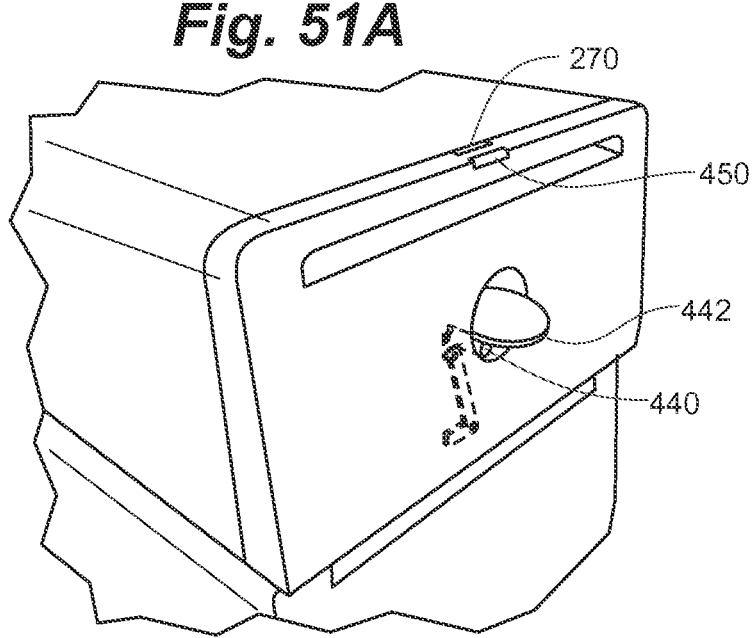
FIG. 51A is a front perspective cutaway view of a locking arrangement for a tablet cart in accordance with an embodiment.
Figure 51B:
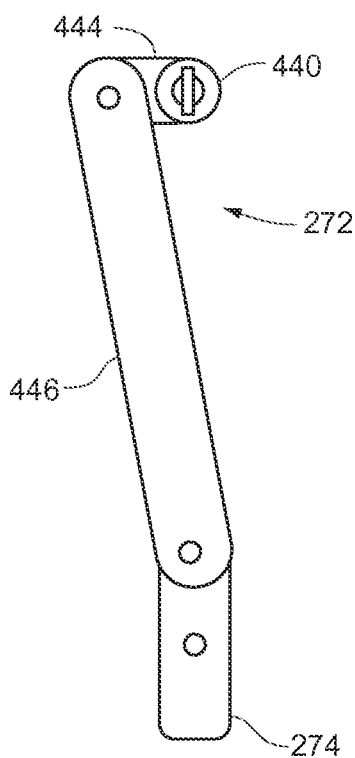
FIGS. 51B-51C are side views of a locking mechanism of the locking arrangement of FIG. 51A in accordance with an embodiment.
Figure 51C:
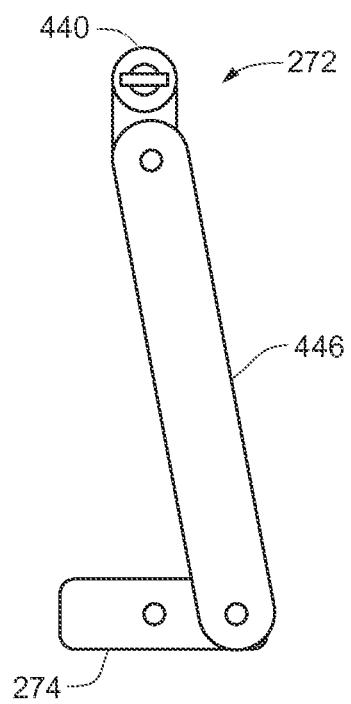
Figure 51D:
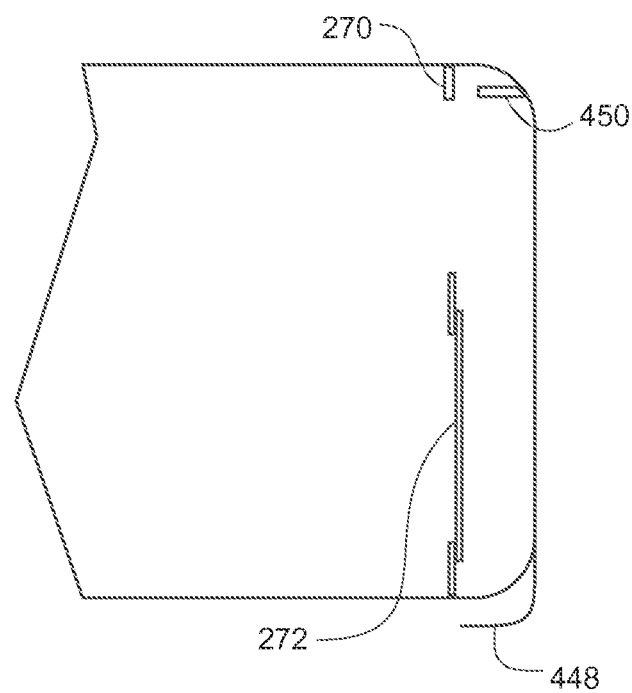
FIG. 51D is a side cross-sectional view of the locking arrangement of FIG. 51A in accordance with an embodiment.

FIGS. 50A-50B illustrate one possible example of a localized locking mechanism for securing tablet storage modules. As shown in FIG. 50A, each of modules 5000 include a locking mechanism 5002 that includes a latch 5004. Each module 5000 also includes a cooperating handle 5006 that includes a receptacle for receiving the latch 5004 from an adjacent module. Module handles 5006 can rotate up to engage a locking mechanism 5002 located in an adjacent module as depicted in FIGS. 50A-50B. A keyed lock 5008 or other type of lock can be used to secure the latch 5004 in an open or closed position. According to some embodiments, tablet carts that use this type of locking mechanism can include a cooperating structure on the cart frame (e.g., on the horizontal portion) that engages with the bottom-most storage module in a similar manner.

FIGS. 51A-51D illustrate another example of a localized locking mechanism including a locking bar mechanism for securing tablet storage modules. In this embodiment, a catch 448 of a first module engages with a slot 450 of a second module (or of the cart frame in the case of a bottom-most module directly adjacent the cart frame), when the first module is translationally placed on top of the second module. A locking mechanism 272 can be provided with a keyed portion 440 located behind a rotating panel 442. As can be seen from FIGS. 51B-51C, when the keyed portion 440 is rotated counter clockwise, the first connecting linkage 444 also rotates counter clockwise from a horizontal position to a vertical position. This movement causes the second connecting linkage 446 to extend further downwards, which causes the latch to rotate from a vertical (or closed) position to a horizontal (or open) position. When in the vertical (or closed) position, the latch 274 can engage with a keeper 270 of the second module (or of the cart frame) located below. The combination of the engagement of both the latch 274 and the catch 448 prevents the first module from moving relative to the second module (or of the cart frame). This is because the catch prevents the first module from being lifted, and the latch prevents the module from being translated relative to the second module (or of the cart frame).

Thus, some embodiments of the invention are disclosed. Although the invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A tablet storage device for mounting to a vertical surface, the device comprising:
   a frame having a surface to attach to the vertical surface, the frame having a plurality of slots, at least one of the plurality of slots adapted to hold a tablet such that the frame is adapted to hold at least one tablet, the at least one of the plurality of slots having a surface that is at an angle between about 10 degrees and about 35 degrees relative to the vertical surface;
   at least one door attached to the frame, the at least one door having an open position and a closed position, the at least one door having a door surface that is parallel to the vertical surface when in the closed position;
   a power supply system for charging the at least one tablet; and
   a network connection system for providing a network connection to the at least one tablet.

2. The tablet storage device of claim 1, wherein:
   the plurality of slots are arranged in a plurality of rows and at least two columns; and
   the frame has at least one door that can be moved from an open position to a closed position, the at least one door being adapted to retain each tablet held within a row of slots when the door is in the closed position.

3. The tablet storage device of claim 1, wherein a docking station is disposed in at least one slot, the docking station having a connector, the docking station configured to align a tablet as the tablet is positioned in the slot such that a corresponding port in the tablet aligns with, and connects to, the connector.

4. The tablet storage device of claim 1, wherein:
   a first docking station is disposed in at least one slot, the first docking station having a connector, the first docking station configured to align a first tablet as the first tablet is positioned in the slot such that a corresponding port in the first tablet aligns with and connects to the connector; and
   wherein the at least one slot is further adapted such that the first docking station can be replaced by a second docking station, the second docking station adapted for use with a second tablet not compatible with the first docking station.

5. The tablet storage device of claim 1, wherein the vertical surface is a wall.

6. The tablet storage device of claim 1, wherein the vertical surface is a column.

7. The tablet storage device of claim 1, wherein the vertical surface is a post.

8. A tablet storage device for mounting to a vertical surface, the device comprising:
   a frame having a surface to attach to the vertical surface, the frame having a plurality of slots,
   at least one of the plurality of slots adapted to hold a tablet such that the frame is adapted to hold at least one tablet, the at least one of the plurality of slots having a surface that is at an angle between about 10 degrees and about 35 degrees relative to the vertical surface, the frame having at least one door that can be moved from an open position to a closed position,
   the at least one door adapted to retain at least one tablet within at least one of the plurality of slots when the door is in the closed position,
   the at least one door further adapted to permit a portion of the at least one tablet to be visible to a user when the at least one door is in the closed position;
   at least one door attached to the frame, the at least one door having an open position and a closed position, the at least one door having a door surface that is parallel to the vertical surface when in the closed position;
   a power supply system for charging at least one tablet; and
   a network connection system for providing a network connection to at least one tablet.

9. The tablet storage device of claim 8, wherein the network connection system includes a wireless transmitter.

10. The tablet storage device of claim 8, wherein:
    at least one slot is further adapted to hold a small electronic device; and
    the at least one door is further adapted to retain the small electronic device within the at least one slot when the door is in the closed position.

11. The tablet storage device of claim 8, wherein the surface of the frame is a planar surface that is adapted to be mounted to an upright planar surface.

12. The tablet storage device of claim 8, wherein at least one slot has a notched portion to facilitate positioning and removal of at least one tablet.

13. The tablet storage device of claim 8, wherein the frame has a front compartment positioned under the plurality of slots, the front compartment permitting access to components of the network connection system and components of the power supply system.

14. The tablet storage device of claim 8, wherein the at least one door is adapted to be locked.

15. The tablet storage device of claim 8, wherein the vertical surface is a wall.

16. The tablet storage device of claim 8, wherein the vertical surface is a column.

17. The tablet storage device of claim 8, wherein the vertical surface is a post.

* * * * *